US011550853B2

(12) United States Patent
Leite Goldner et al.

(10) Patent No.: US 11,550,853 B2
(45) Date of Patent: Jan. 10, 2023

(54) USING NATURAL LANGUAGE EXPRESSIONS TO DEFINE DATA VISUALIZATION CALCULATIONS THAT SPAN ACROSS MULTIPLE ROWS OF DATA FROM A DATABASE

(71) Applicant: Tableau Software, Inc., Seattle, WA (US)

(72) Inventors: Eliana Leite Goldner, Vancouver (CA); Jeffrey Ericson, Menlo Park, CA (US); Alex Djalali, Los Gatos, CA (US); Vidya Raghavan Setlur, Portola Valley, CA (US); Suyang Duan, Vancouver (CA)

(73) Assignee: TABLEAU SOFTWARE, INC., Seattle, WA (US)

( * ) Notice: Subject to any disclaimer, the term of this patent is extended or adjusted under 35 U.S.C. 154(b) by 374 days.

(21) Appl. No.: 16/681,754

(22) Filed: Nov. 12, 2019

(65) Prior Publication Data

US 2021/0073279 A1 Mar. 11, 2021

Related U.S. Application Data

(60) Provisional application No. 62/897,187, filed on Sep. 6, 2019.

(51) Int. Cl.
*G06F 16/90* (2019.01)
*G06F 16/904* (2019.01)
(Continued)

(52) U.S. Cl.
CPC .......... *G06F 16/904* (2019.01); *G06F 16/243* (2019.01); *G06F 16/248* (2019.01);
(Continued)

(58) Field of Classification Search
CPC ..... G06F 16/904; G06F 16/234; G06F 16/287
See application file for complete search history.

(56) References Cited

U.S. PATENT DOCUMENTS 7,019,749 B2 3/2006 Guo
7,089,266 B2 8/2006 Stolte et al.
(Continued)

FOREIGN PATENT DOCUMENTS

WO WO2018/204696 A1 11/2018

OTHER PUBLICATIONS

Allen, J. Recognizing Intentions from Natural Language Utterances. In Computational Models of Discourse, M. Brady, Ed. M.I.T. Press, Cambridge, Massachusetts, 1982, 12 pgs.
(Continued)

*Primary Examiner* — Loc Tran
(74) *Attorney, Agent, or Firm* — Morgan, Lewis & Bockius LLP

(57) ABSTRACT

A method executes at a computing device that includes a display, one or more processors, and memory. The method includes receiving user input to specify a data source. The method includes receiving a first user input in a first region of a graphical user interface to specify a natural language command related to the data source. The device determines, based on the first user input, that the natural language command includes a table calculation expression. In accordance with the determination, the method identifies a second data field in the data source, Values of the first data field are aggregated for each of the time periods in a range of dates according to the second data field. A respective difference between the aggregated values for each consecutive pair of time periods is computed. A data visualization is generated and displayed.

17 Claims, 57 Drawing Sheets

(51) Int. Cl.

| | |
|---|---|
| ***G06F 40/30*** | (2020.01) |
| ***G06N 5/04*** | (2006.01) |
| ***G06F 40/253*** | (2020.01) |
| ***G06F 40/211*** | (2020.01) |
| ***G06F 16/242*** | (2019.01) |
| ***G06F 16/28*** | (2019.01) |
| ***G06F 16/26*** | (2019.01) |
| ***G06F 16/248*** | (2019.01) |
| ***G06F 40/279*** | (2020.01) |

(52) U.S. Cl.

CPC ............ *G06F 16/26* (2019.01); *G06F 16/287* (2019.01); *G06F 40/211* (2020.01); *G06F 40/253* (2020.01); *G06F 40/279* (2020.01); *G06F 40/30* (2020.01); *G06N 5/04* (2013.01)

(56) References Cited

U.S. PATENT DOCUMENTS

| | | | | |
|---|---|---|---|---|
| 7,391,421 | B2 | 6/2008 | Guo et al. | |
| 7,606,714 | B2 | 10/2009 | Williams | |
| 7,716,173 | B2 | 5/2010 | Stolte et al. | |
| 8,321,465 | B2 | 11/2012 | Farber et al. | |
| 8,489,641 | B1 | 7/2013 | Seefeld et al. | |
| 8,713,072 | B2 | 4/2014 | Stolte et al. | |
| 8,972,457 | B2 | 3/2015 | Stolte et al. | |
| 9,183,235 | B2 | 11/2015 | Stolte | |
| 9,244,971 | B1 | 1/2016 | Kalki | |
| 9,477,752 | B1 | 10/2016 | Romano | |
| 9,501,585 | B1 | 11/2016 | Gautam et al. | |
| 9,575,720 | B2 | 2/2017 | Faaborg et al. | |
| 9,794,613 | B2 | 10/2017 | Jang et al. | |
| 9,858,292 | B1 | 1/2018 | Setlur et al. | |
| 9,953,645 | B2 | 4/2018 | Bak et al. | |
| 11,132,492 | B2 * | 9/2021 | Bouton | G06F 16/3329 |
| 2004/0030741 | A1 | 2/2004 | Wolton et al. | |
| 2004/0039564 | A1 | 2/2004 | Mueller | |
| 2004/0073565 | A1 | 4/2004 | Kaufman et al. | |
| 2004/0114258 | A1 | 6/2004 | Harris, III et al. | |
| 2005/0015364 | A1 | 1/2005 | Gupta et al. | |
| 2006/0218140 | A1 | 9/2006 | Whitney et al. | |
| 2006/0259394 | A1 | 11/2006 | Cushing et al. | |
| 2006/0259775 | A2 | 11/2006 | Oliphant | |
| 2007/0174350 | A1 | 7/2007 | Pell et al. | |
| 2007/0179939 | A1 | 8/2007 | O'Neil et al. | |
| 2008/0046462 | A1 | 2/2008 | Kaufman et al. | |
| 2009/0171924 | A1 | 7/2009 | Nash et al. | |
| 2009/0299990 | A1 | 12/2009 | Setlur et al. | |
| 2009/0313576 | A1 | 12/2009 | Neumann et al. | |
| 2010/0030552 | A1 | 2/2010 | Chen et al. | |
| 2010/0110076 | A1 | 5/2010 | Hao et al. | |
| 2010/0313164 | A1 | 12/2010 | Louch et al. | |
| 2011/0066972 | A1 | 3/2011 | Sugiura | |
| 2011/0191303 | A1 | 8/2011 | Kaufman et al. | |
| 2012/0047134 | A1 | 2/2012 | Hansson et al. | |
| 2012/0179713 | A1 | 7/2012 | Stolte et al. | |
| 2013/0031126 | A1 | 1/2013 | Setlur | |
| 2013/0055097 | A1 | 2/2013 | Soroca et al. | |
| 2014/0189548 | A1 | 7/2014 | Werner | |
| 2014/0192140 | A1 | 7/2014 | Peevers et al. | |
| 2015/0019216 | A1 | 1/2015 | Singh et al. | |
| 2015/0026153 | A1 | 1/2015 | Gupta et al. | |
| 2015/0026609 | A1 | 1/2015 | Kim | |
| 2015/0058318 | A1 | 2/2015 | Blackwell et al. | |
| 2015/0095365 | A1 | 4/2015 | Olenick et al. | |
| 2015/0123999 | A1 | 5/2015 | Ofstad et al. | |
| 2015/0269175 | A1 | 9/2015 | Espenshade et al. | |
| 2015/0310855 | A1 | 10/2015 | Bak et al. | |
| 2015/0379989 | A1 | 12/2015 | Balasubramanian et al. | |
| 2016/0070430 | A1 * | 3/2016 | Kim | G06T 11/206 715/769 |
| 2016/0070451 | A1 * | 3/2016 | Kim | G06Q 30/00 715/765 |
| 2016/0103886 | A1 | 4/2016 | Prophete et al. | |
| 2016/0188539 | A1 | 6/2016 | Parker et al. | |
| 2016/0261675 | A1 | 9/2016 | Block et al. | |
| 2016/0283588 | A1 | 9/2016 | Katae | |
| 2016/0335180 | A1 | 11/2016 | Teodorescu et al. | |
| 2016/0378725 | A1 | 12/2016 | Marchsreiter | |
| 2017/0083615 | A1 | 3/2017 | Boguraev et al. | |
| 2017/0285931 | A1 | 10/2017 | Duhon et al. | |
| 2017/0357625 | A1 | 12/2017 | Carpenter et al. | |
| 2018/0108359 | A9 | 4/2018 | Gunn et al. | |
| 2018/0114190 | A1 * | 4/2018 | Borrel | G06N 20/00 |
| 2018/0121618 | A1 | 5/2018 | Smith et al. | |
| 2018/0181608 | A1 | 6/2018 | Wu et al. | |
| 2019/0034429 | A1 | 1/2019 | Das et al. | |
| 2019/0065456 | A1 | 2/2019 | Platow | |
| 2019/0205442 | A1 | 7/2019 | Vasudev et al. | |
| 2019/0272296 | A1 | 9/2019 | Prakash et al. | |
| 2019/0362009 | A1 | 11/2019 | Miseldine et al. | |
| 2020/0012638 | A1 | 1/2020 | Lou et al. | |
| 2020/0065769 | A1 | 2/2020 | Gupta et al. | |
| 2020/0089700 | A1 | 3/2020 | Ericson et al. | |
| 2020/0089760 | A1 | 3/2020 | Ericson et al. | |
| 2020/0097494 | A1 * | 3/2020 | Vertsel | G06N 5/025 |
| 2020/0274841 | A1 | 8/2020 | Lee et al. | |
| 2020/0293167 | A1 | 9/2020 | Blyumen | |
| 2020/0301916 | A1 | 9/2020 | Nguyen et al. | |
| 2021/0042308 | A1 * | 2/2021 | Mustafi | G06F 7/00 |
| 2021/0279805 | A1 | 9/2021 | Elkan et al. | |

OTHER PUBLICATIONS

Androutsopoulos, I., Ritchie, G. D., and Thanisch, P. Natural language interfaces to databases—an introduction. Natural Language Engineering 1, Mar. 16, 1995, 50 pgs.

Aurisano, J., Kumar, A., Gonzales, A., Reda, K., Leigh, J., Di Eugenio, B., and Johnson, A. Show me data? observational study of a conversational interface in visual data exploration. In Poster at IEEE VIS 2015, IEEE (2015), 2 pgs.

Bostock, M., Ogievetsky, V., and Heer, J. D3: Data-driven documents. IEEE Transactions on Visualization & Computer Graphics (Proc. InfoVis), Oct. 23, 2011, 9 pgs.

Carbonell, J. G., Boggs, W. M., Mauldin, M. L., and Anick, P. G. The xcalibur project, a natural language interface to expert systems and data bases, 1985, 5 pgs.

Cover, T. M., and Thomas, J. A. Elements of Information Theory. Wiley-Interscience, New York, NY, USA, 1991, 36 pgs.

Cox, K., Grinter, R. E., Hibino, S. L., Jagadeesan, L. J., and Mantilla, D. A multi-modal natural language interface to an information visualization environment. International Journal of Speech Technology 4, 3 (2001), 18 pgs.

Egenhofer, M. Spatial sql: A query and presentation language. IEEE Transactions on Knowledge and Data Engineering 6, 1 (1994), 12 pgs.

Finin, T., Joshi, A. K., and Webber, B. Natural language interactions with artificial experts. Proceedings of the IEEE 74, 7 (Jun. 1986), 19 pgs.

Frank, A. U., and Mark, D. M. Language issues for geographical information systems. In Geographical Information Systems: Principles and Applications, vol. 1, D. Maguire, M. Goodchild, and D. Rhind, Eds. Longman, London, 1991, 26 pgs.

Gao, T., Dontcheva, M., Adar, E., Liu, Z., and Karahalios, K. G. Datatone: Managing ambiguity in natural language interfaces for data visualization. In Proceedings of the 28th Annual ACM Symposium on User Interface Software Technology, UIST '15, ACM (New York, NY, USA, 2015), 12 pgs.

Grammel, L., Tory, M., and Storey, M. A. How information visualization novices construct visualizations. IEEE Transactions on Visualization and Computer/Graphics 16, 6 (Nov. 2010), 10 pgs.

IBM Watson Analytics. http://www.ibm.com/analytics/watson-analytics/, downloaded on May 9, 2017, 6 pgs.

Kumar et al., "Towards a Dialogue System that Supports Rich Visualizations of Data," Proceeding of the Sigdual 2016 Conference, LA, USA, ACL, Sep. 13, 2016, pp. 304-209, Xp055496498.

Lawson, I-want-to-go moments: From search to store. https://www.thinkwithgoogle.com/articles/i-want-to-go-micro-moments.html, Apr. 2015, 7 pgs.

(56) References Cited

OTHER PUBLICATIONS

Li, F., and Jagadish, H. V. Constructing an interactive natural language interface for relational databases. Proc. VLDB Endow. 8, 1 (Sep. 2014), 12 pgs.
Microsoft Q & A. https://powerbi.microsoft.com/en-us/documentation/powerbi-service-q-and-a/, Mar. 14, 2017, 5 pgs.
Montello, D., Goodchild, M., Gottsegen, J., and Fohl, P. Where's downtown? behavioral methods for determining referents for vague spatial queries. Spatial Cognition and Computation 3,. 2&3 (2003), 20 pgs.
NarrativeScience, Turn your data into better decisions with Quill, https://www.narrativescience.com/quill, downloaded on May 9, 2017, 12 pgs.
Node.js®. https://nodeis.org/, downloaded on May 10, 2017, 1 pg.
Oviatt, S., and Cohen, P. Perceptual user interfaces: Multimodal interfaces that process what comes naturally. Commun. ACM 43, 3 (Mar. 2000), 9 pgs.
Parr, T. The Definitive ANTLR 4 Reference, 2nd ed. Pragmatic Bookshelf, 2013, 322 pgs.
Pedersen, T., Patwardhan, S., and Michelizzi, J. Wordnet::similarity: Measuring the relatedness of concepts. In Demonstration Papers at HLT-NAACL 2004, HLT-NAACL—Demonstrations '04, Association for Computational Linguistics (Stroudsburg, PA, USA, 2004), 2 pgs.
Popescu, A.-M., Etzioni, O., and Kautz, H. Towards a theory of natural language interfaces to databases. In Proceedings of the 8th International Conference on Intelligent User Interfaces, IUI '03, ACM (New York, NY, USA, 2003), 9 pgs.
Pustejovsky, J., Castaño, J., Ingria, R., Saurí, R., Gaizauskas, R., Setzer, A., and Katz, G. Timeml: Robust specification of vvent and temporal expressions in text. In in Fifth International Workshop on Computational Semantics (IWCS-5 (2003), 7 pgs.
Reinhart, T. Pragmatics and Linguistics: An Analysis of Sentence Topics. IU Linguistics Club publications. Reproduced by the Indiana University Linguistics Club, 1982, 5 pgs.
Setlur, Pre-Interview First Office Action dated Jul. 5, 2018, received in U.S. Appl. No. 15/486,265, 5 pgs.
Setlur, First Action Interview Office Action dated Aug. 29, 2018, received in U.S. Appl. No. 15/486,265, 6 pgs.
Setlur, Final Office Action dated Apr. 25, 2019, received in U.S. Appl. No. 15/486,265, 15 pgs.
Setlur, Notice of Allowance dated Sep. 6, 2019, received in U.S. Appl. No. 15/486,265, 13 pgs.
Setlur, Pre-Interview First Office Action dated Sep. 6, 2019, received in U.S. Appl. No. 15/804,991, 4 pgs.
Setlur, First Action Interview Office Action dated Oct. 29, 2019, received in U.S. Appl. No. 15/804,991, 6 pgs.
Setkur et al., Eviza: A Natural Language Interface for Visual Analysis, ACM Oct. 16, 2016, 13 pgs.
Sun, Y., L. J. J. A., and Di Eugenio, B. Articulate: Creating meaningful visualizations from natural language. In Innovative Approaches of Data Visualization and Visual Analytics, IGI Global, Hershey, PA (2014), 20 pgs.
Tableau, Communication Pursuant to Rules 161(1) and 162, EP18729514.2, dated Jun. 17, 2019, 3pgs.
Tableau Software, Inc., International Searh Report and Written Opinion, PCT/US2018/030959, dated Sep. 14, 2018, 13 pgs.
Tableau Software, Inc., International Preliminary Report on Patentability, PCT/US2018/030959, dated Nov. 5, 2019, 11 pgs.
ThoughtSpot. Search-Driven Analytics for Humans, http://www.thoughtspot.com/, downloaded May 9, 2017, 9 pgs.
Turf: Advanced geospatial analysis for browsers and node. http://turfjs.org, downloaded May 9, 2017, 2 pgs.
Wikipedia, Extended Backus-Naur Form, https://en.wikipedia.org/wiki/Extended_Backus%E2%80%93Naur_Form, last edited on Jan. 7, 2017, 7 pgs.
Winograd, T. Procedures as a Representation for Data in a Computer Program for Understanding Natural Language. PhD thesis, Feb. 1971, 472 pgs.
WolframAlpha. Profesional-grade computational, https://www.wolframalpha.com/, downloaded May 9, 2017, 25 pgs.
Wu, Z., and Palmer, M. Verbs semantics and lexical selection. In Proceedings of the 32nd Annual Meeting on Association for Computational Linguistics, ACL '94, Association for Computational Linguistics (Stroudsburg, PA, USA, 1994), 6 pgs.
Arnold et al., On Suggesting Phrases vs. Predicting Words for Mobile Text Composition, UIST, 2016, pp. 603-608 (Year: 2016).
Atallah, Office Action, U.S. Appl. No. 17/063,663, dated Feb. 26, 2021, 19 pgs.
Atallah, Final Office Action, U.S. Appl. No. 17/063,663, dated Jul. 19, 2021, 20 pgs.
Atallah, Notice of Allowance, U.S. Appl. No. 17/063,663, dated Dec. 22, 2021, 11 pgs.
Ericson, Office Action, U.S. Appl. No. 16/680,431, dated Jan. 8, 2021, 18 pgs.
Ericson, Final Office Action, U.S. Appl. No. 16/680,431, dated May 19, 2021, 22 pgs.
Ericson, Office Action, U.S. Appl. No. 16/680,431, dated Nov. 10, 2021, 22 pgs.
Ericson, Office Action, U.S. Appl. No. 16/134,907, dated May 13, 2020, 9 pgs.
Ericson, Notice of Allowance, U.S. Appl. No. 16/134,907, dated Nov. 12, 2020, 10 pgs.
Ericson, Office Action, U.S. Appl. No. 16/134,892, dated May 15, 2020, 10 pgs.
Ericson, Final Office Action, U.S. Appl. No. 16/134,892, dated Nov. 24, 2020, 11 pgs.
Ericson, Notice of Allowance, U.S. Appl. No. 16/134,892, dated Mar. 9, 2021, 11 pgs.
Ericson, Office Action, U.S. Appl. No. 16/601,437, dated Jun. 24, 2021, 15 pgs.
Ericson, Final Office Action, U.S. Appl. No. 16/601,437, dated Nov. 12, 2021, 17 pgs.
Hoque, Enamul et al., "Applying Pragmatics Principles for Interaction with Visual Analytics," IEEE Transaction of Visualization and Computer Graphics, IEEE Service Center, Los Alamitos, CA, vol. 24, No. 1, Jan. 1, 2018, 10 pgs.
"Ng, H. T., and Zelle, J. Corpus-based approaches to semantic interpretation in natural language processing. AI Magazine Winter 1997, (1997), 20 pgs."
Setlur, Final Office Action dated Mar. 4, 2020, received in U.S. Appl. No. 15/804,991, 14 pgs.
Setlur, Notice of Allowance dated Jul. 1, 2020, received in U.S. Appl. No. 15/804,991, 15 pgs.
Setlur, Preinterview 1st Office Action, U.S. Appl. No. 15/978,062, dated Mar. 6, 2020, 4 pgs.
Setlur, Notice of Allowance, U.S. Appl. No. 15/978,062, dated May 29, 2020, 19 pgs.
Setlur, Office Action, U.S. Appl. No. 15/978,066, dated Mar. 18, 2020, 23 pgs.
Setlur, Final Office Action, U.S. Appl. No. 15/978,066, dated Aug. 19, 2020, 22 pgs.
Setlur, Office Action, U.S. Appl. No. 15/978,067, dated Feb. 21, 2020, 20 pgs.
Setlur, Final Office Action, U.S. Appl. No. 15/978,067, dated Aug. 5, 2020, 19 pgs.
Tableau, Extended European Search Report, EP18729514.2, dated Mar. 4, 2020, 4 pgs.
Tableau Software Inc., International Search Report and Written Opinion, PCT/US2019/047892, dated Mar. 4, 2020, 24 pgs.
Atallah, Office Action, U.S. Appl. No. 17/026,113, dated Aug. 18, 2022, 11 pgs.
Ericson, Notice of Allowance, U.S. Appl. No. 16/601,437, dated May 2, 2022, 10 pgs.

* cited by examiner

USING NATURAL LANGUAGE EXPRESSIONS TO DEFINE DATA VISUALIZATION CALCULATIONS THAT SPAN ACROSS MULTIPLE ROWS OF DATA FROM A DATABASE

RELATED APPLICATIONS

This application claims priority to U.S. Provisional Application Ser. No. 62/897,187, filed Sep. 6, 2019, entitled "Interface Defaults for Vague Modifiers in Natural Language Interfaces for Visual Analysis," which is incorporated by reference herein in its entirety.

This application is related to the following applications, each of which is incorporated by reference herein in its entirety: (i) U.S. patent application Ser. No. 15/486,265, filed Apr. 12, 2017, entitled "Systems and Methods of Using Natural Language Processing for Visual Analysis of a Data Set"; (ii) U.S. patent application Ser. No. 15/804,991, filed Nov. 6, 2017, entitled "Systems and Methods of Using Natural Language Processing for Visual Analysis of a Data Set"; (iii) U.S. patent application Ser. No. 15/978,062, filed May 11, 2018, entitled "Applying Natural Language Pragmatics in a Data Visualization User Interface"; (iv) U.S. patent application Ser. No. 16/219,406, filed Dec. 13, 2018, entitled "Identifying Intent in Visual Analytical Conversations"; (v) U.S. patent application Ser. No. 16/134,892, filed Sep. 18, 2018, entitled "Analyzing Natural Language Expressions in a Data Visualization User Interface"; (vi) U.S. patent application Ser. No. 15/978,066, filed May 11, 2018, entitled "Data Visualization User Interface Using Cohesion of Sequential Natural Language Commands"; (vii) U.S. patent application Ser. No. 15/978,067, filed May 11, 2018, entitled "Updating Displayed Data Visualizations According to Identified Conversation Centers in Natural Language Commands"; (viii) U.S. patent application Ser. No. 16/166,125, filed Oct. 21, 2018, entitled "Determining Levels of Detail for Data Visualizations Using Natural Language Constructs"; (ix) U.S. patent application Ser. No. 16/134,907, filed Sep. 18, 2018, entitled "Natural Language Interface for Building Data Visualizations, Including Cascading Edits to Filter Expressions"; (x) U.S. patent application Ser. No. 16/234,470, filed Dec. 27, 2018, entitled "Analyzing Underspecified Natural Language Utterances in a Data Visualization User Interface"; (xi) U.S. patent application Ser. No. 16/601,437, filed Oct. 14, 2019, titled "Incremental Updates to Natural Language Expressions in a Data Visualization User Interface"; (xii) U.S. patent application Ser. No. 16/680,431, filed Nov. 11, 2019, entitled "Using Refinement Widgets for Data Fields Referenced by Natural Language Expressions in a Data Visualization User Interface", and U.S. patent application Ser. No. 14/801,750, filed Jul. 16, 2015, entitled "Systems and Methods for using Multiple Aggregation Levels in a Single Data Visualization."

TECHNICAL FIELD

The disclosed implementations relate generally to data visualization and more specifically to systems, methods, and user interfaces that enable users to interact with data visualizations and analyze data using natural language expressions.

BACKGROUND

Data visualization applications enable a user to understand a data set visually. Visual analyses of data sets, including distribution, trends, outliers, and other factors are important to making business decisions. Some data sets are very large or complex, and include many data fields. Various tools can be used to help understand and analyze the data, including dashboards that have multiple data visualizations and natural language interfaces that help with visual analytical tasks.

SUMMARY

The use of natural language expressions to generate data visualizations provides a user with greater accessibility to data visualization features, including updating the fields and changing how the data is filtered. A natural language interface enables a user to develop valuable data visualizations with little or no training.

There is a need for improved systems and methods that support and refine natural language interactions with visual analytical systems. The present disclosure describes data visualization platforms that improve the effectiveness of natural language interfaces by resolving natural language utterances that include table calculation expressions. The data visualization application uses syntactic and semantic constraints imposed by an intermediate language, also referred to herein as ArkLang, to resolve natural language utterances. The intermediate language translates natural language utterances into queries that are processed by a data visualization application to generate useful data visualizations. Thus, the intermediate language reduces the cognitive burden on a user and produces a more efficient human-machine interface. The present disclosure also describes data visualization applications that enable users to update existing data visualizations using conversational operations and refinement widgets. Accordingly, such methods and interfaces reduce the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages may be apparent to those skilled in the art in light of the descriptions and drawings in this specification.

In accordance with some implementations, a method executes at a computing device that includes a display. The computing device includes one or more processors, and memory. The memory stores one or more programs configured for execution by the one or more processors. The method includes receiving user input to specify a data source. The method includes receiving a first user input in a first region of a graphical user interface to specify a natural language command related to the data source. The device determines, based on the first user input, that the natural language command includes a table calculation expression. The table calculation expression specifies a change in aggregated values of a first data field from the data source over consecutive time periods. Each of the time periods represents a same amount of time. In accordance with the determination, the device identifies a second data field in the data source. The second data field is distinct from the first data field. The second data field spans a range of dates that includes the time periods. The device aggregates values of the first data field for each of the time periods in the range of dates according to the second data field. The device computes a respective difference between the aggregated values for each consecutive pair of time periods. The device generates a data visualization that includes a plurality of data marks. Each of the data marks corresponds to one of the computed differences for each of the time periods over the range of dates. The device also displays the data visualization.

In some implementations, the time periods are: year, quarter, month, week, or day.

In some implementations, the method further comprises displaying field names from the data source in the graphical user interface.

In some implementations, computing a respective difference between the aggregated values for each consecutive pair of time periods includes computing an absolute difference between the aggregated values. In some implementations, computing a respective difference between the aggregated values for each consecutive pair of time periods includes computing a percentage difference between the aggregated values.

In some instances, absolute difference and percentage difference are displayed as user-selectable options in the graphical user interface.

In some implementations, the first data field is a measure.

In some implementations, determining that the natural language command includes a table calculation expression comprises: parsing the natural language command and forming an intermediate expression according to a context-free grammar, including identifying in the natural language command a calculation type.

In some instances, the intermediate expression includes the calculation type (e.g., "year over year difference" or "year over year percentage difference"), an aggregation expression (e.g., "sum of Profit"), and an addressing field from the data source.

In some instances, the method further comprises: in accordance with a determination that the intermediate expression omits sufficient information for generating the data visualization, inferring the omitted information associated with the data source using one or more inferencing rules based on syntactic and semantic constraints imposed by the context-free grammar.

In some instances, the second data field is the addressing field.

In some instances, the method further comprises: receiving a second user input modifying the consecutive time periods from a first time period (e.g., "year over year") to a second time period (e.g., "month over month"). Each of the first time periods represents a same first amount of time (e.g., year) and each of the second time periods represents a same second amount of time (e.g., month). In response to the second user input: for each of the second time periods, the device aggregates values of the first data field for the second amount of time. The device computes a respective first difference between the aggregated values for consecutive pairs of second time periods. The device also generates a second data visualization that includes a plurality of second data marks. Each of the second data marks corresponds to the computed first differences for each of the second time periods over the range of dates. The device further displays the second data visualization In some instances, the second user input includes a user command to replace the time period from the first amount of time to the second amount of time. The method further comprises: receiving the second user input in the first region of the graphical user interface.

In some instances, the second user input comprises user selection of the first amount of time at a second region of the graphical user interface, distinct from the first region.

In some implementations, the method further comprises: receiving a third user input in the first region to specify a natural language command related to partitioning the data visualization with a third data field. The third data field is a dimension. In response to the third user input, the device sorts the data values of the first data field by the third data field. For each distinct value of the third data field, the device aggregates corresponding values of the first data field. The device computes a difference between the aggregated values for each consecutive pair of time periods. The device generates an updated data visualization that includes a plurality of third data marks. Each of the third data marks is based on a respective computed difference. The device further displays the updated data visualization In some instances, the data visualization has a first visualization type (e.g., a line chart). The updated data visualization includes a plurality of visualizations, each having the first visualization type.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus methods, systems, and graphical user interfaces are disclosed that enable users to easily interact with data visualizations and analyze data using natural language expressions.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details

DESCRIPTION OF IMPLEMENTATIONS

The various methods and devices disclosed in the present specification improve the effectiveness of natural language interfaces on data visualization platforms by resolving table calculation expressions directed to a data source. As described in U.S. patent application Ser. No. 16/234,470, filed Dec. 27, 2018, entitled "Analyzing Underspecified Natural Language Utterances in a Data Visualization User Interface," which is incorporated by reference herein in its entirety, an intermediate language, also referred herein as ArkLang, is designed to resolve natural language inputs into formal queries that can be executed against a database. The present disclosure describes the use of ArkLang to resolve natural language inputs directed to table calculations (e.g., table calculation expressions). The various methods and devices disclosed in the present specification further improve upon data visualization methods by performing conversational operations on table calculation expressions. The conversational operations add, remove, and/or replace phrases that define an existing data visualization and create modified data visualizations. Such methods and devices improve user interaction with the natural language interface by providing quicker and easier incremental updates to natural language expressions in a data visualization.

Figure 1:
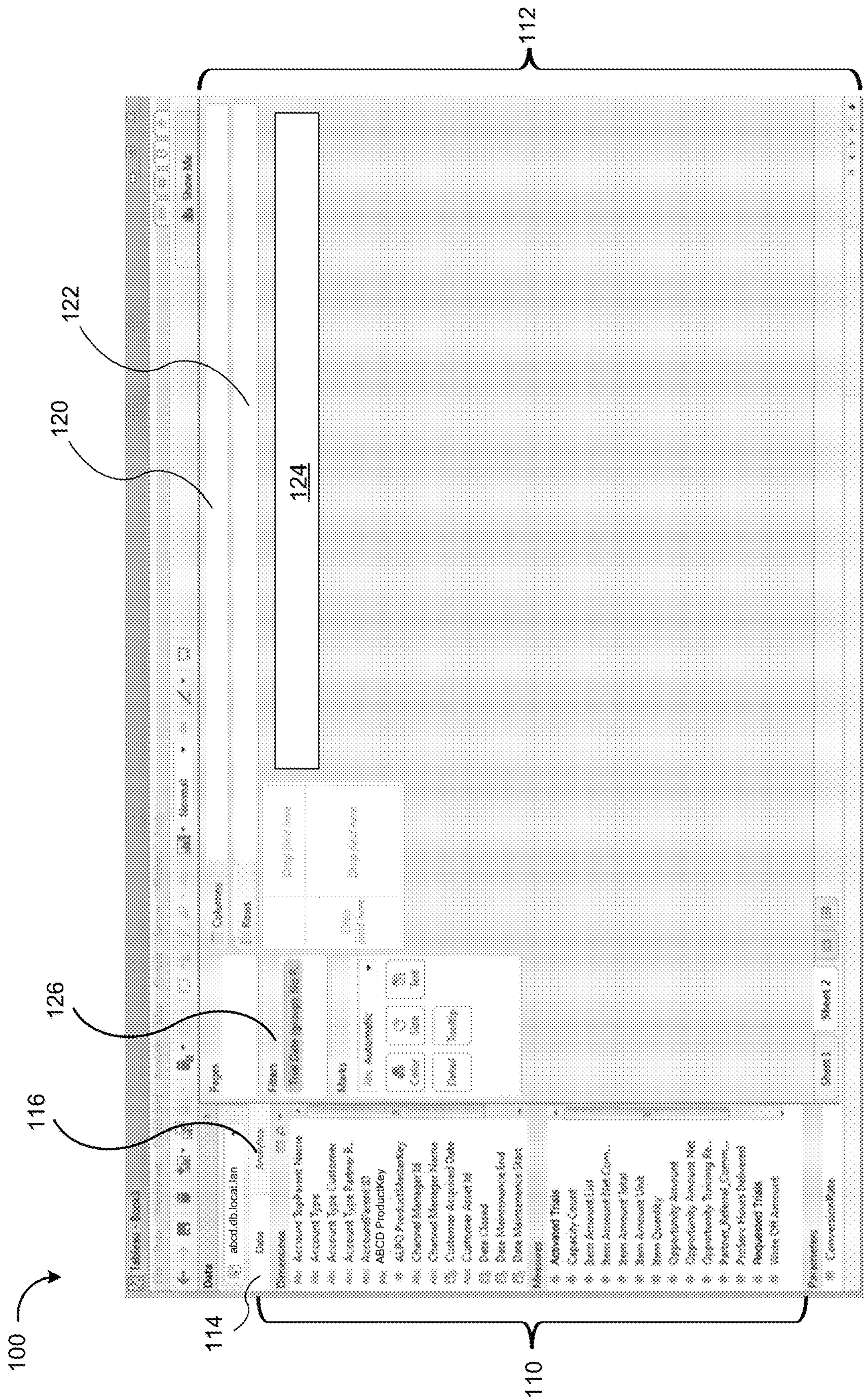
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 2A:
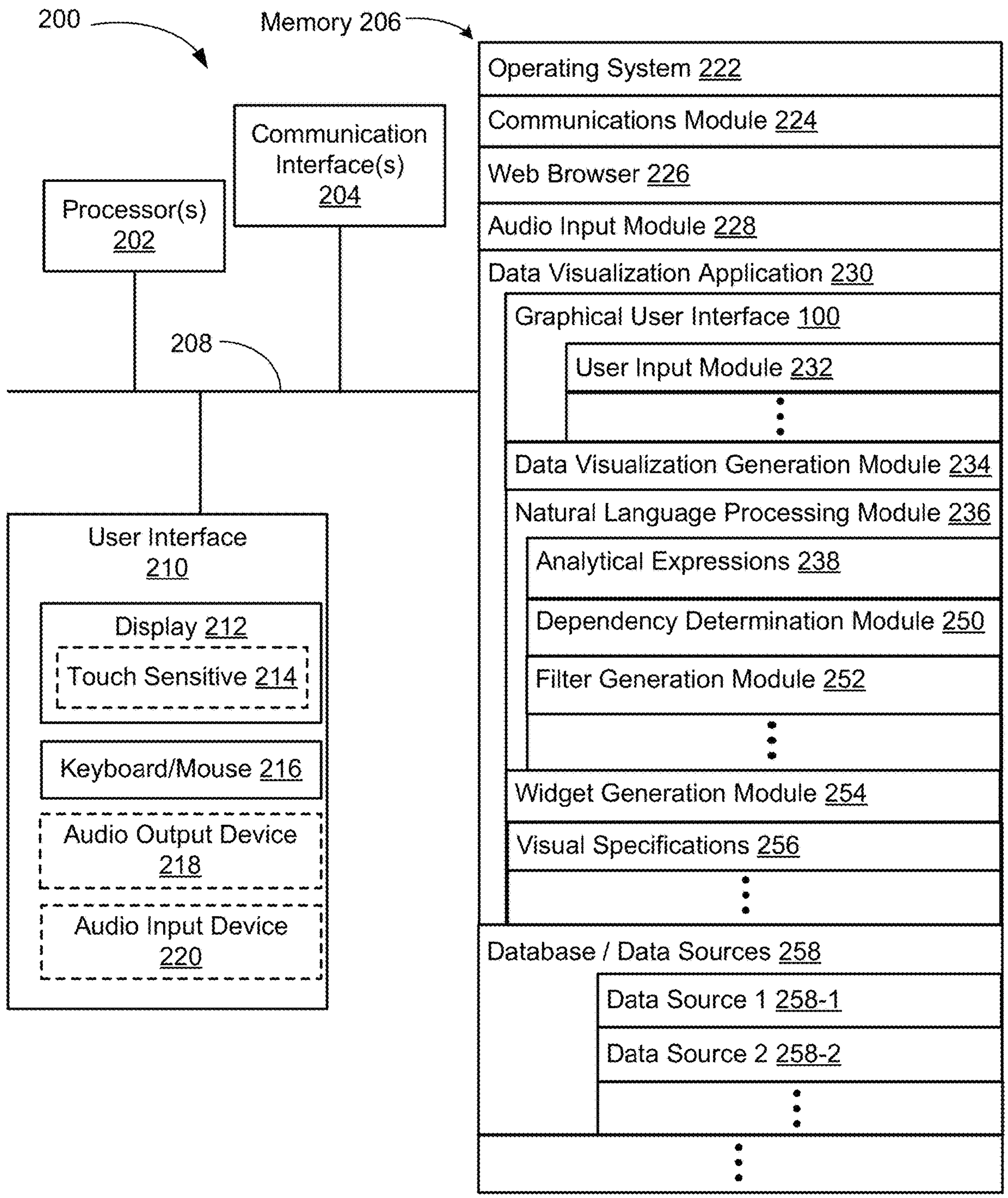
FIGS. 2A and 2B are block diagrams of a computing device according to some implementations.

FIG. 2A is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. The communication buses 208 optionally include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternatively the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230 or the natural language processing module 236);
- a data visualization application 230, which generates data visualizations and related features. In some implementations, the data visualization application 230 includes:
  - a graphical user interface 100 for a user to construct visual graphics. In some implementations, the graphical user interface includes a user input module 232 for receiving user input through the natural language box 124. For example, a user inputs a natural language command or expression into the natural language box 124 identifying one or more data sources 258 (which may be stored on the computing device 200 or stored remotely) and/or data fields from the data source(s). In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a standalone application (e.g., a desktop application). In some implementations, the data visualization application 230 executes within the web browser 226 or another application using web pages provided by a web server;
  - a data visualization generation module 234, which automatically generates and displays a corresponding visual graphic (also referred to as a "data visualization" or a "data viz") using the user input (e.g., the natural language input);
  - a natural language processing module 236, which receives and parses the natural language input provided by the user. In some implementations, the natural language processing module 236 may identify analytical expressions 238, such as aggregation expressions 240, group expressions 242, filter expressions 244, limit expressions 246, sort expressions 248, and table calculation expressions 249, as described in FIG. 2B;
  - the natural language processing module 236 may also include a dependency determination module 250, which looks up dependencies in a database 258 to determine how particular terms and/or phrases are related (e.g., dependent);
  - in some implementations, the natural language processing module 236 includes a filter generation module 252, which determines if one or more filters are related to a field that has been modified by a user. The filter generation module 252 generates the one or more filters based on a change to the field;
  - a widget generation module 254, which generates widgets that include user-selectable options. For example, a "sort" widget is generated in response to a user selecting (e.g., hovering) over a sort field (e.g., a natural language term identified to be a sort field). The sort widget includes user-selectable options such as "ascending," "descending," and/or "alphabetical," so that the user can easily select, from the widget, how to sort the selected field; and
  - visual specifications 256, which are used to define characteristics of a desired data visualization. In some implementations, the information the user provides (e.g., user input) is stored as a visual specification. In some implementations, the visual specifications 256 includes previous natural language commands received from a user or properties specified by the user through natural language commands. In some implementations, the visual specification 256 includes two or more aggregations based on different levels of detail. Further information about levels of detail can be found in U.S. patent application Ser. No. 14/801,750, filed Jul. 16, 2015, entitled "Systems and Methods for using Multiple Aggregation Levels in a Single Data Visualization," and U.S. patent application Ser. No. 16/166,125, filed Oct. 21, 2018, entitled "Determining Levels of Detail for Data Visualizations Using Natural Language Constructs," each of which is incorporated by reference herein in its entirety; and
- zero or more databases or data sources 258 (e.g., a first data source 258-1 and a second data source 258-2), which are used by the data visualization application 230. In some implementations, the data sources are stored as spreadsheet files, CSV files, XML files, flat files, or JSON files, or stored in a relational database. For example, a user selects one or more databases or data sources 258 (which may be stored on the computing device 200 or stored remotely), selects data fields from the data source(s), and uses the selected fields to define a visual graphic.

Figure 2B:
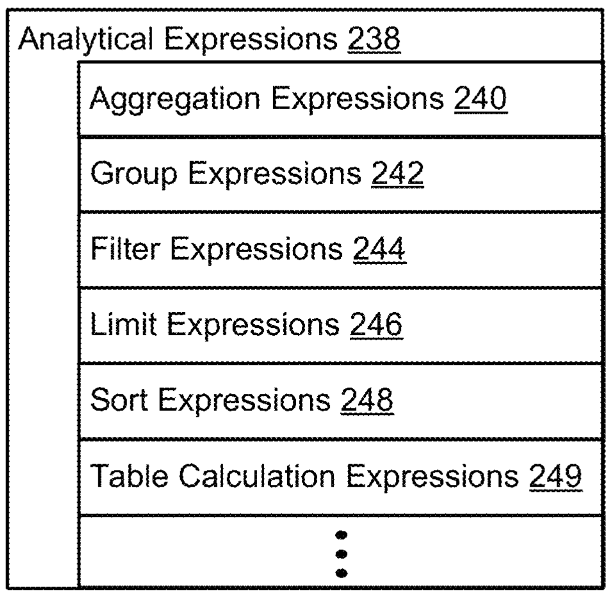

FIG. 2B is a block diagram illustrating components of analytical expressions 238 of the natural language processing module 236, in accordance with some implementations. In some implementations, the natural language processing module 236 may identify the analytical expressions 238 along with their canonical forms in a dialect of ArkLang, such as:

- aggregation expressions 240: these are in the canonical form [agg att], where agg ∈ Aggregations and att is an Attribute. An example of an aggregation expression is "average Sales" where "average" is agg and "Sales" is att;

- group expressions 242: these are in the canonical form [grp att], where grp ∈ Groups and att is an attribute. An example of a group expression is "by Region" where "by" is grp and "Region" is att;
- filter expressions 244: these are in the canonical form [att filter val], where att is an attribute, filter ∈ Filters, and val ∈ Values. An example of a filter expression is "Customer Name starts with John" where "Customer" is att, "starts with" is filter, and "John" is val;
- limit expressions 246: these are in the canonical form [limit val ge ae], where limit ∈ Limits, val ∈ Values, ge ∈ group expressions, and ae ∈ aggregation expressions. An example of a limit expression is "top 5 Wineries by sum of Sales" where "top" is limit, "5" is val, "Wineries" is the attribute to group by, and "sum of Sales" is the aggregation expression;
- sort expressions 248: these are in the canonical form [sort ge ae], where sort ∈ Sorts, ge ∈ group expressions, and ae ∈ aggregation expressions. An example of a sort expression is "sort Products in ascending order by sum of Profit" where "ascending order" is the sort, "Products" is the attribute to group by, and "sum of Profit" is the aggregation expression; and
- table calculation expressions 249. In some implementations, a table calculation expression in Arklang is defined as:

```
TableCalculationExp{
TableCalculation
AggregationExp
[ ]GroupExps
}
```

where "TableCalculation" refers to a table calculation type, "AggregationExp" refers to an aggregation expression component, and "[ ]GroupExps" refers to a slice of group expressions and represents addressing fields. In some implementations, the table calculation expression also includes a partitioning field. Table calculation expressions have the canonical template: {[period] [function (diff, % diff)] in [measure+aggregation] over [address field] by [partition fields]}. An example of a table calculation expression is "year over year difference in sum of sales over order date by region." In this example, "year over year" represents consecutive time periods, each of the time periods represents a same amount of time (e.g., year), "difference" (e.g., an absolute difference) is the "diff" function, "Sales" is the measure to compute the difference on, "sum" is the aggregate operation that is performed on the measure "Sales", "order date" is the addressing field and spans a range of dates that includes the time periods, and the "region" is the partitioning field.

In some implementations the computing device 200 also includes an inferencing module (not shown), which is used to resolve underspecified (e.g., omitted information) or ambiguous (e.g., vague) natural language commands (e.g., expressions or utterances) directed to the databases or data sources 258, using one or more inferencing rules. Further information about the inferencing module can be found in U.S. patent application Ser. No. 16/234,470, filed Dec. 27, 2018, entitled "Analyzing Underspecified Natural Language Utterances in a Data Visualization User Interface," which is incorporated by reference herein in its entirety.

In some implementations the computing device 200 further includes a grammar lexicon that is used to support formation of intermediate expressions, and zero or more data source lexicons, each of which is associated with a respective database or data source 258. The grammar lexicon and data source lexicons are described in U.S. patent application Ser. No. 16/234,470, filed Dec. 27, 2018, entitled "Analyzing Underspecified Natural Language Utterances in a Data Visualization User Interface," which is incorporated by reference herein in its entirety.

In some implementations, canonical representations are assigned to the analytical expressions 238 (e.g., by the natural language processing module 236) to address the problem of proliferation of ambiguous syntactic parses inherent to natural language querying. The canonical structures are unambiguous from the point of view of the parser and the natural language processing module 238 is able to choose quickly between multiple syntactic parses to form intermediate expressions. Further information about the canonical representations can be found in U.S. patent application Ser. No. 16/234,470, filed Dec. 27, 2018, entitled "Analyzing Underspecified Natural Language Utterances in a Data Visualization User Interface," which is incorporated by reference herein in its entirety.

In some implementations, the computing device 200 also includes other modules such as an autocomplete module, which displays a dropdown menu with a plurality of candidate options when the user starts typing into the input box 124, and an ambiguity module to resolve syntactic and semantic ambiguities between the natural language commands and data fields (not shown). Details of these sub-modules are described in U.S. patent application Ser. No. 16/134,892, entitled "Analyzing Natural Language Expressions in a Data Visualization User Interface," filed Sep. 18, 2018, which is incorporated by reference herein in its entirety.

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
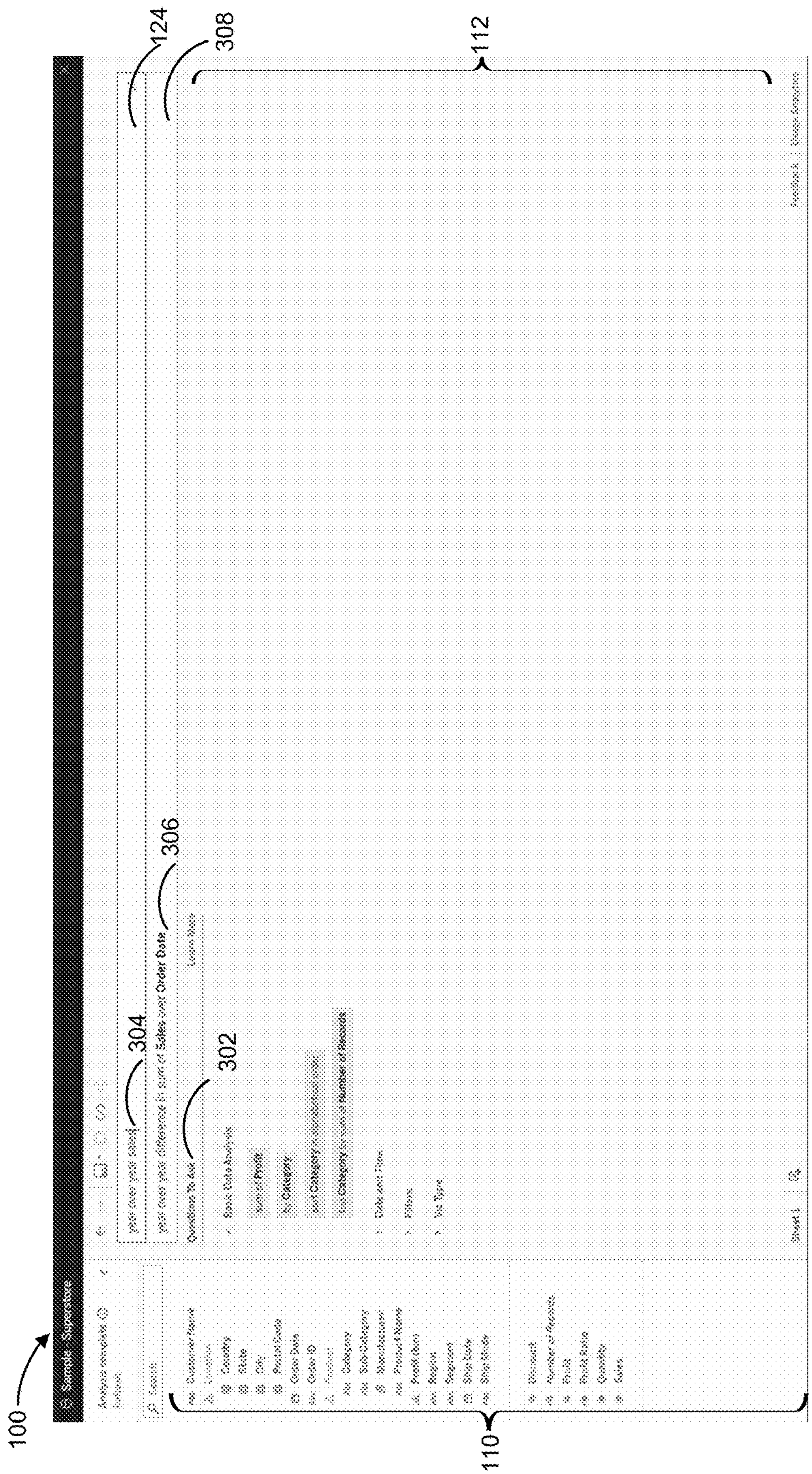
FIGS. 3A and 3B provide a series of screen shots for a graphical user interface according to some implementations.
Figure 3B:
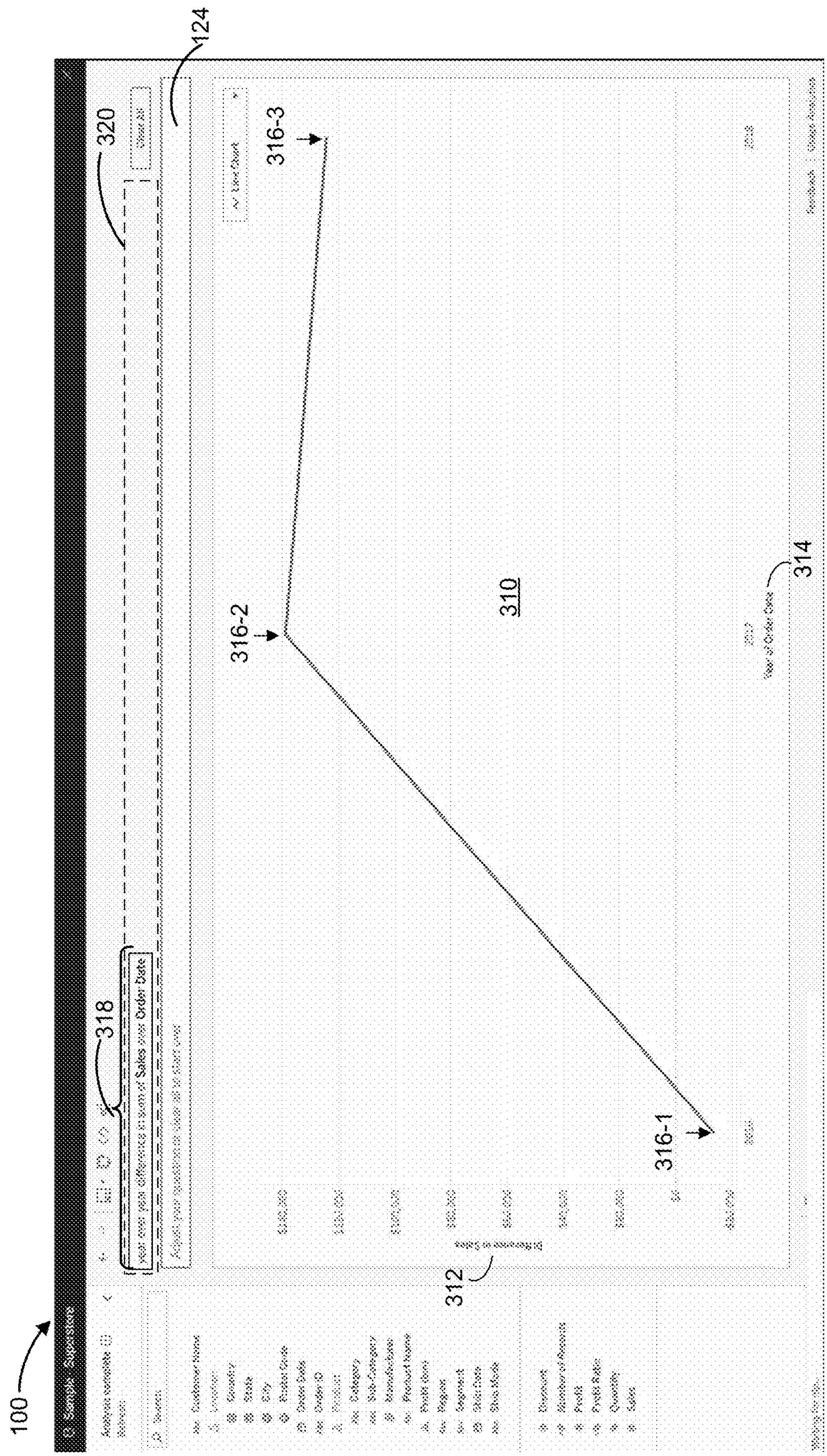

FIGS. 3A and 3B provide a series of screen shots for a graphical user interface 100 according to some implementations. In this example, a user is interacting with a data source (e.g., a database/date source 258). The schema information region 110 provides named data elements (e.g., field names) from the data source 258, which may be selected and used to build a data visualization.

In some implementations, and as illustrated in FIG. 3A, the data visualization region 112 displays guidelines 302 (e.g., tips or pointers) to assist the user in interacting with the data source. Further details about the guidelines 302 are described in U.S. patent application Ser. No. 16/601,437, filed Oct. 14, 2019, entitled "Incremental Updates to Natural Language Expressions in a Data Visualization User Interface," which is incorporated by reference herein in its entirely.

FIG. 3A illustrates a user interaction with the graphical user interface 100. In this example, the user inputs (e.g., enters or types) a natural language expression (e.g., a natural language command) 304 "year over year sales" in the command box 124. The user may also input the natural language expression by speech, which is then captured using an audio input device 220 (e.g. a microphone) coupled to the computing device 200. Typically, the natural language expression includes one or more terms that identify data fields from a data source 258. A term may be a dimension (e.g., categorical data) or a measure (e.g., a numerical quantity). As illustrated by the example, the natural language input typically includes one or more terms (e.g., the term "sales" identifies data fields from the data source).

In some implementations, parsing of a table calculation (e.g., table calculation expression) is triggered when the user inputs a table calculation type. In this example, the natural language command 304 includes the terms "year over year," which specifies a table calculation type.

In response to the natural language command 304, the graphical user interface 100 displays an interpretation 306 (also referred to as a proposed action) in a dropdown menu 308 of the graphical user interface 100. In some implementations, and as illustrated in FIG. 3A, the field names "Sales" and "Order Date" are displayed in a visually distinctive manner (e.g., in boldface) relative to other words included in the interpretation 306.

In some implementations, a table calculation expression is specified by a table calculation type (e.g., "year over year difference" or "year over year % difference"), a measure to compute the difference on (e.g., Sales), and an addressing field. In some implementations, the table calculation includes a partitioning field (e.g., a dimension, such as "Region" or "State").

In some implementations, the addressing field is limited to a date field (or a date/time field). The partitioning field includes dimension fields. Thus, the difference defined in the table calculation type (e.g., "year over year difference" or "year over year % difference") is always computed along dates (e.g., a range of dates) defined by the addressing field.

In some implementations, the user does not have to specify all of the components that define the table calculation expression. Missing components may be inferred (e.g., using the inferencing module as described in U.S. patent application Ser. No. 16/234,470, filed Dec. 27, 2018, entitled "Analyzing Underspecified Natural Language Utterances in a Data Visualization User Interface," which is incorporated by reference herein in its entirety). In this example the range of dates is not specified. Accordingly, the data visualization application infers a default date field "Order Date" in the interpretation 306.

FIG. 3B illustrates a data visualization 310 (e.g., a line chart) that is automatically generated and displayed in the graphical user interface 100 in response to user selection of the interpretation 306 "year over year difference in sum of Sales over Order Date" in FIG. 3A. In this example, the data visualization 310 is a line chart comprising "Difference in Sales" on the y-axis 312 and "Year of Order Date" on the x-axis 314. The data visualization 310 also includes data marks 316-1, 316-2, and 316-3. Each of the data marks 316 corresponds to a respective computed difference in absolute sum of sales for a consecutive pair of years. In this example, the data mark 316-1 represents the difference in sales (e.g., sum of sales) between the years 2016 and 2015, while the data mark 316-3 represents the difference in sum of sales between the years 2019 and 2018. In this example, the date field "Order Date" spans a range of dates that includes the years 2016, 2017, and 2018. That is, there is no data with an order date earlier than the year 2015, and orders in a future year 2020 have not occurred.

Figure 4A:
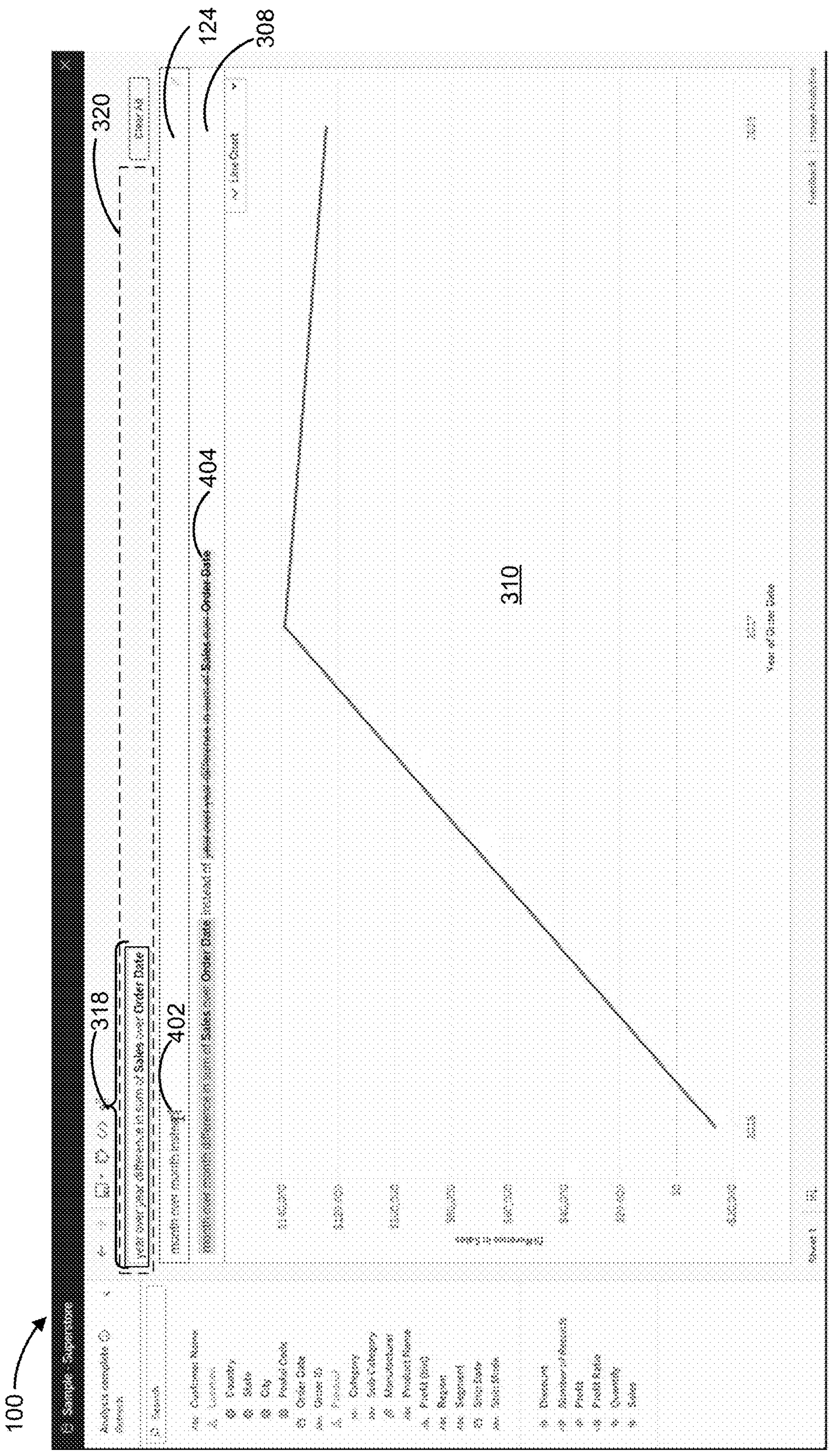
FIGS. 4A and 4B provide a series of screen shots for updating an existing data visualization according to some implementations.
Figure 4B:
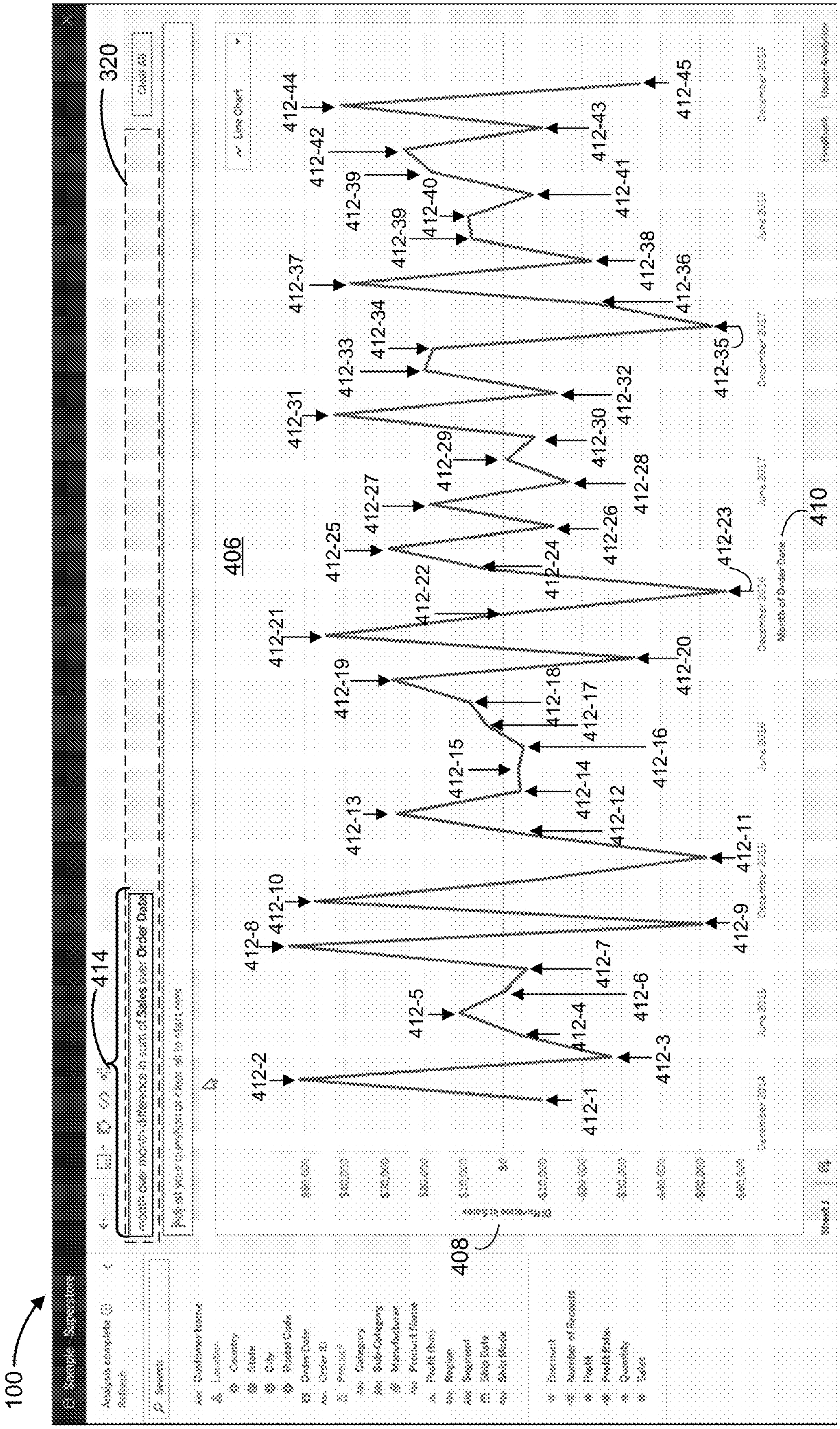

As further illustrated in FIG. 3B, the graphical user interface 100 also displays, in a region 320 that is distinct from (e.g., above) the command box 124, a phrase 318 "year over year difference in sum of Sales over Order Date" that defines the data visualization 310. In this example, the phrase 318 includes the terms "Sales" and "Order Date," which correspond to field names of data fields in the dataset. The terms are visually distinguished (e.g., in boldface) from other words included in the phrase 318. In some implementations, the phrase 318 is individually enclosed in boxes, as illustrated here In some implementations, and as described in U.S. patent application Ser. No. 16/601,437, filed Oct. 14, 2019, entitled "Incremental Updates to Natural Language Expressions in a Data Visualization User Interface," which is incorporated by reference herein in its entirety, conversational operations such as "add," "remove," and/or "replace" can be performed on existing data visualizations to create modified data visualizations. In some implementations, conversational operations can used to further refine an existing table calculation. FIGS. 4A and 4B illustrate this functionality.

FIGS. 4A and 4B provide a series of screen shots for updating an existing data visualization according to some implementations.

FIG. 4A illustrates a user interaction with the data visualization 310 shown in FIG. 3B. In this example, the user inputs the natural language command 402 "month over month instead" in the command box 124. In response to the natural language command 402, the graphical user interface 100 displays an interpretation 404 "month over month difference in sum of Sales over Order Date instead of" in the dropdown menu 308. The interpretation 404 corresponds to a proposed action to replace the existing table calculation type "year over year" with a different table calculation type "month over month."

FIG. 4B illustrates an updated data visualization 406 (a line chart) that is automatically generated and displayed in the graphical user interface 100 in response to the user selection of the interpretation 404 "month over month difference in sum of Sales over Order Date instead of." A comparison between the line chart 406 and the line chart 310 in FIG. 3B shows that both the line chart 406 and the line chart 310 comprise, on the y-axis, "Difference in Sales." However, the line chart 406 distinguishes from the line chart 310 in that it comprises, on the x-axis, "Month of Order Date" instead of "Year of Order Date." The difference arises because of the change in calculation type from "year over year" to "month over month."

As further illustrated in FIG. 4B, the data visualization 410 includes a greater number of data marks 412 (e.g., 412-1 to 412-45) compared to the number of data marks 316 in the line chart 310. Each of the data marks 412 corresponds to a respective computed difference in sum of sales (e.g., an absolute difference, in units of $) for a consecutive pair of months. FIG. 4B also illustrates that the updated phrase 414 that defines the data visualization 406 is "month over month difference in sum of Sales over Order Date."

FIGS. 5A-5E provide a series of screen shots for updating a data visualization according to some implementations.

Figure 5A:
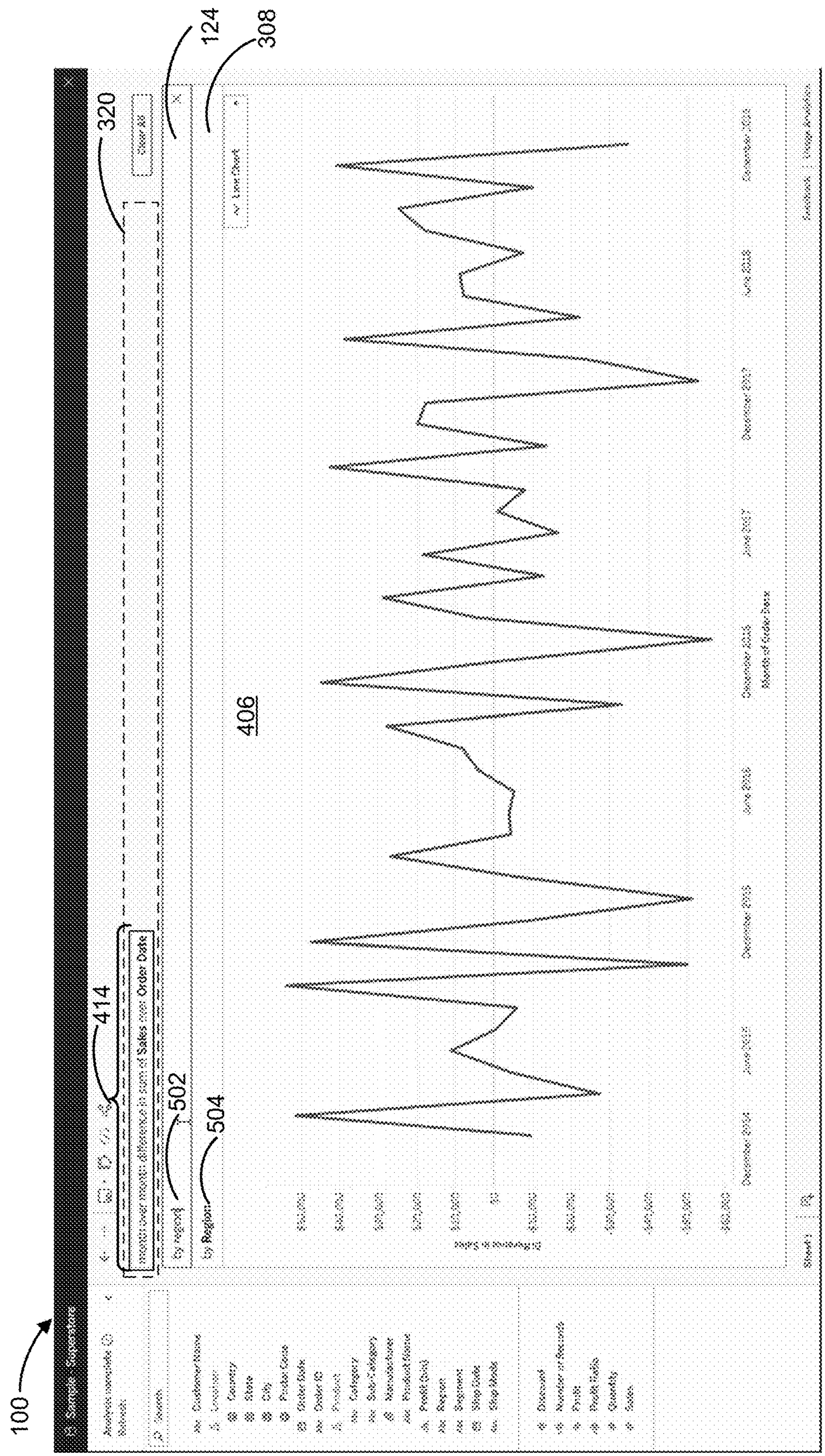
FIGS. 5A-5E provide a series of screen shots for updating a data visualization according to some implementations.

FIG. 5A illustrates a user interaction with the data visualization 406 shown in FIG. 4B. In some implementations, a user can further break down (e.g., partition) a table calculation across multiple dimensions (e.g., by "Region" or by "Category"). In this example, the user inputs the natural language command 502 "by region" in the command box 124. In response to the natural language command 502, the graphical user interface 100 displays an interpretation 504 "by Region." The interpretation 504 corresponds to a proposed action to partition and group values by the data field (e.g., dimension) Region.

Figure 5B:
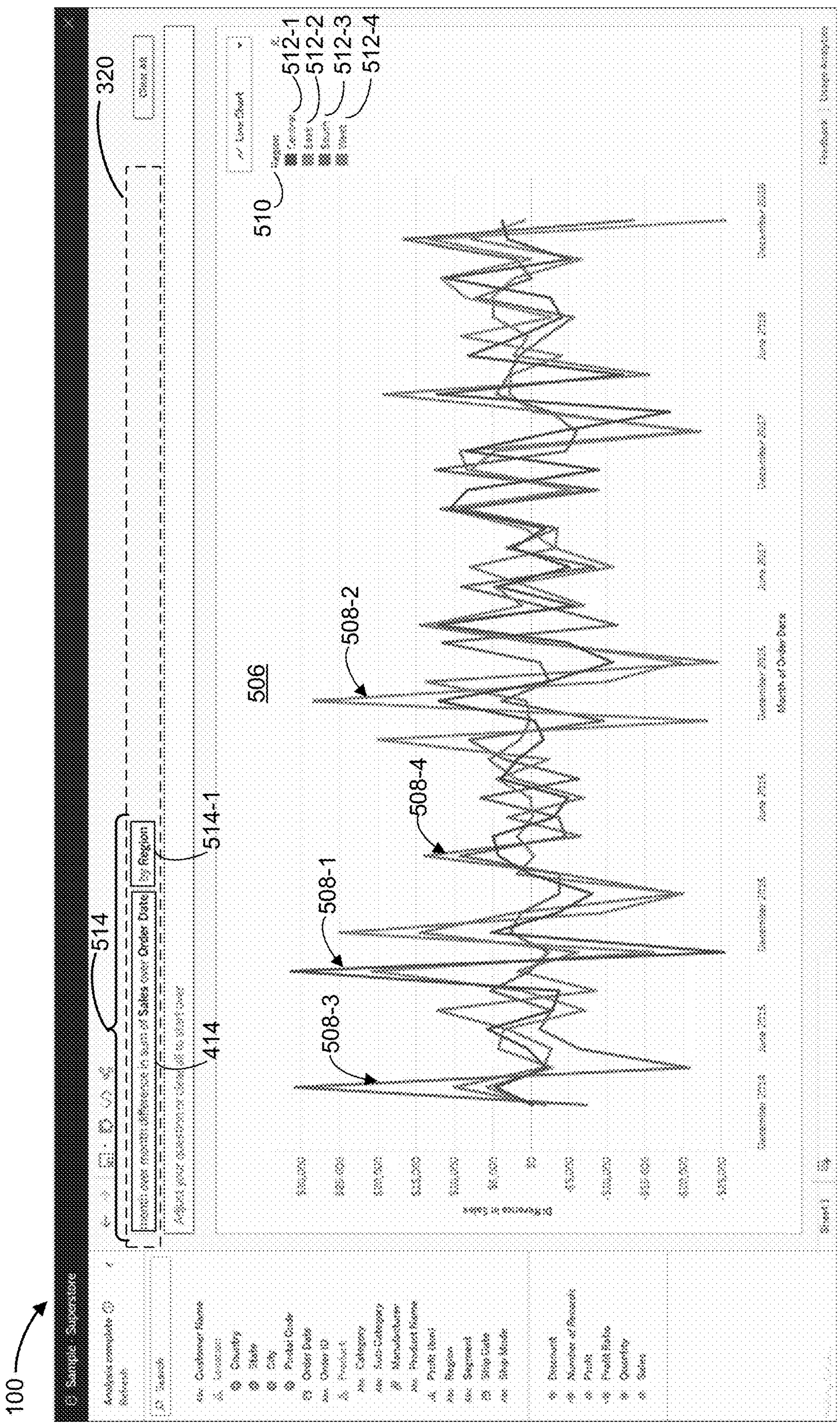

FIG. 5B illustrates an updated data visualization 506 that is automatically generated and displayed in the graphical user interface 100 in response to user selection of the interpretation 504 "by Region." In this example, the data visualization 506 includes four line charts 508-1, 508-2, 508-3, and 508-4, corresponding to, respectively, regions 512-1 "Central", 512-2 "East", 512-3 "South", and 512-4 "West", as depicted by the legend 510. Each of the line charts 508 represents the month over month difference in sum of Sales over Order Date for the respective region. In this example, "Order Date" is the addressing field and "Region" is the partitioning field. The partitioning field "Region" "breaks" data rows in the data source into different partitions (e.g., "East", "West", "Central", and "South"). Then, the table calculation is applied to data marks within each partition. Thus, for every pair of values from a partition (e.g., "East"), the difference of the aggregated sales is computed between each Order Date's month.

In FIG. 5B, the data visualization 506 is defined by updated phrases 514. The updated phrases 508 include the phrase 414 "month over month difference in sum of Sales over Order Date" and the phrase 514-1 "by Region."

In some implementations, each of the descriptors 512 in the legend 510 corresponds to a user-selectable option. User selection of a descriptor allows the visualization corresponding to be descriptor to be visually emphasized while other visualizations are de-emphasized. Thus, a user is able to identify the visualization intended by the user in a faster, simpler, and more efficient manner. This is illustrated in FIG. 5C.

Figure 5C:
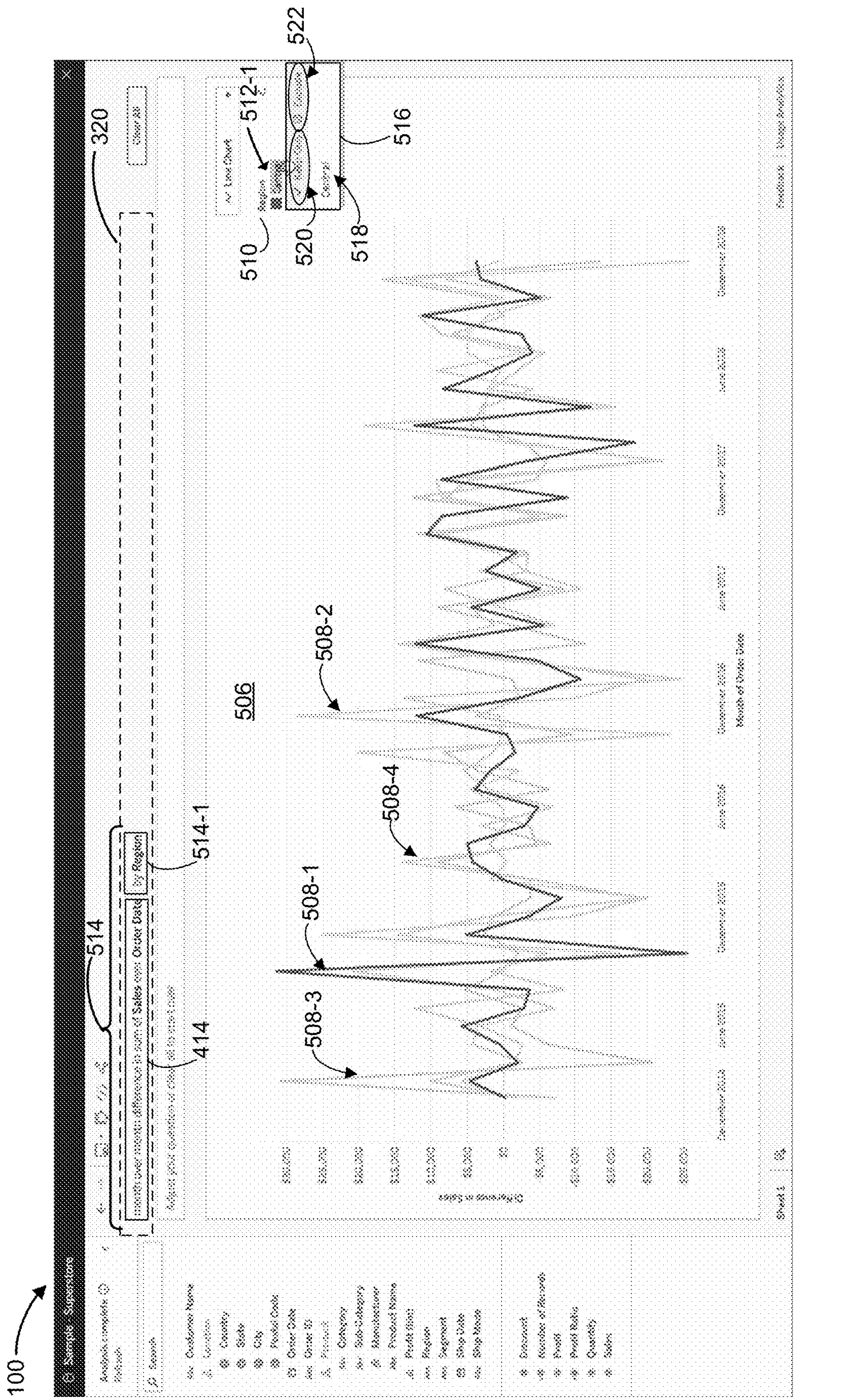

FIG. 5C illustrates a user interaction with the data visualization 506 in FIG. 5B. In this example, the user selects the descriptor 512-1 "Central" on the legend 510. In response to the user selection, the graphical user interface 100 highlights (e.g., visually emphasizes) the line chart 508-1 for the region "Central" and dims (e.g., visually deemphasizes) the line charts for other regions (e.g., "East", "West", and "South").

As further illustrated in FIG. 5C, the graphical user interface 100 also displays a window 516 in response to the user selection. The window 516 includes an identifier 518 corresponding to the descriptor "Central", an option 520 to select (e.g., keep only) the visualization corresponding to the descriptor "Central", and an option 522 to deselect (e.g., exclude) the visualization corresponding to the descriptor "Central".

Figure 5D:
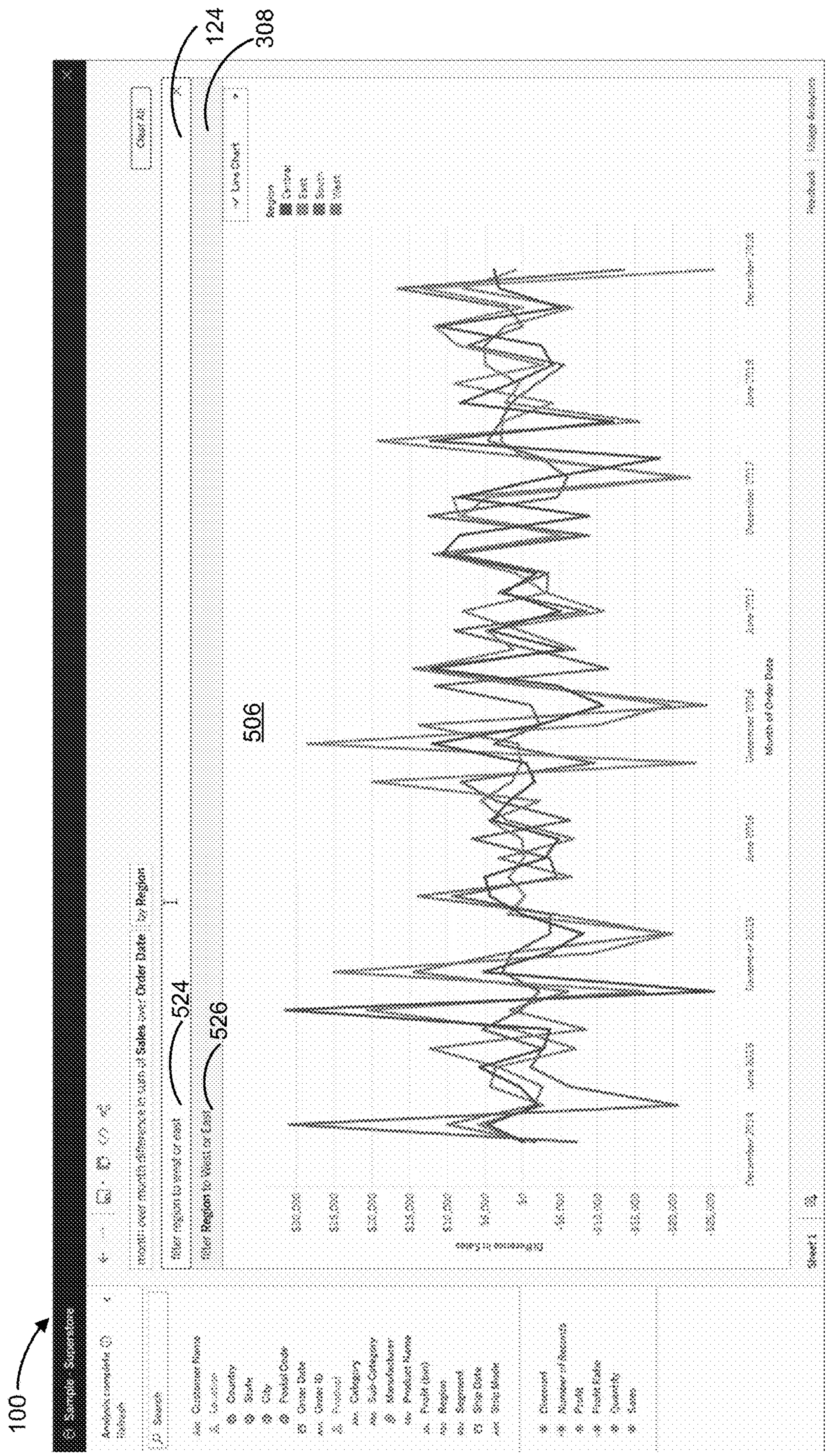

In some implementations, table calculation expressions can coexist with other analytical expressions 238. FIG. 5D illustrates another user interaction with the data visualization 506 in FIG. 5B. In this example, the user inputs the natural language command 524 "filter region to west or east" in the command box 124. The natural language command 524 is a filter expression 244. In response to the natural language command 524, the graphical user interface 100 displays an interpretation 526 "filter Region to West or East." The interpretation 504 corresponds to a proposed action to filter the attribute (e.g., dimension) Region to the values "West" or "East."

Figure 5E:
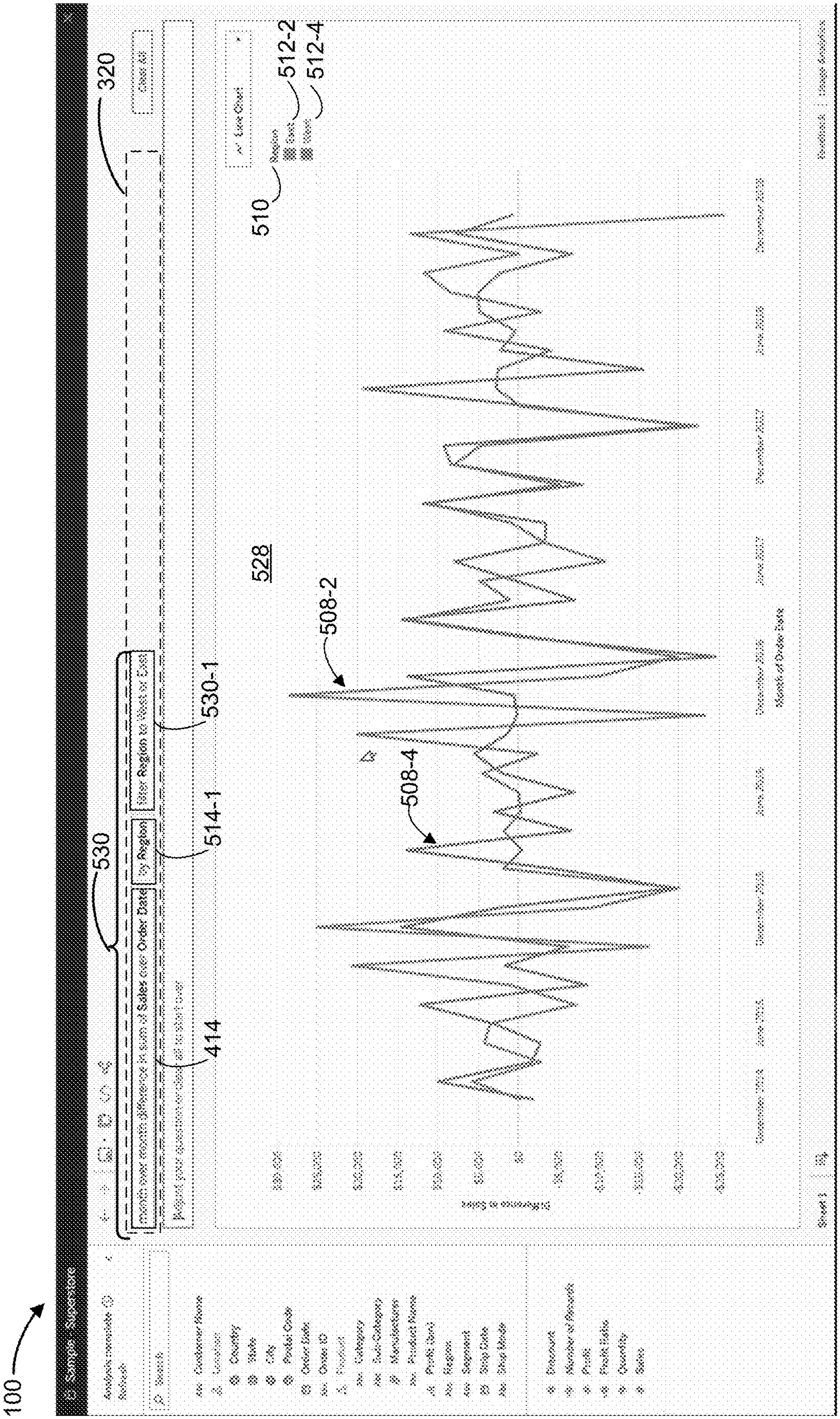

FIG. 5E illustrates an updated data visualization 528 that is automatically generated and displayed in the graphical user interface 100 in response to user selection of the interpretation 526 "filter Region to West or East." In this example, the updated data visualization 528 has two line charts 508-2 and 508-4, which represent the "month over month difference in sum of Sales over Order Date" for the regions East and West, respectively. The phrases 530 that define the data visualization 528 include the phrase 414 "month over month difference in sum of Sales over Order Date," the phrase 514-1 "by Region," and the phrase 530-1 "Filter Region to West or East."

In some implementations, and as illustrated in FIGS. 3 to 5, individual components of a table calculation expression (e.g., the table calculation type, the aggregation expression, and the addressing field) can be refined using conversational operations. In some implementations, a user can also replace one or more components with a natural language command. FIGS. 6A-6F illustrate this functionality.

FIGS. 6A-6F provide a series of screen shots for updating a data visualization using conversational operations according to some implementations.

Figure 6A:
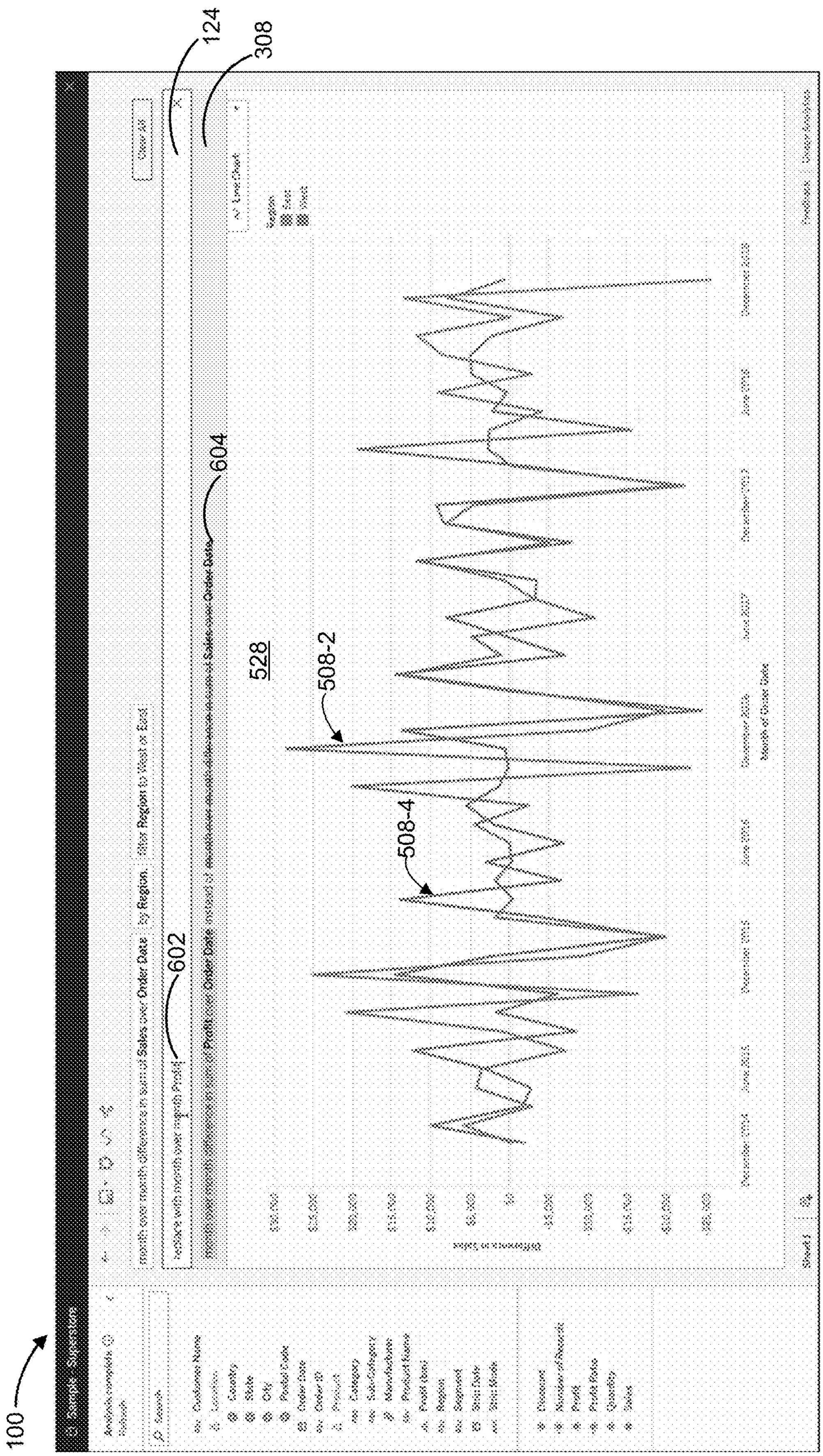
FIGS. 6A-6F provide a series of screen shots for updating a data visualization using conversational operations according to some implementations.

FIG. 6A illustrates a user interaction with the data visualization 528 shown in FIG. 5E. In this example, the user inputs the natural language command 602 "replace with month over month profit" in the command box 124. In response to the natural language command 602, the graphical user interface 100 displays an interpretation 604 "month over month difference in sum of Profit over Order Date instead of." The interpretation 604 corresponds to a proposed action to perform a table calculation of the type "month over month difference" (e.g., the same calculation type as the data visualization 528), using a new aggregated measure "sum of Profit" to compute the respective differences, over the range of dates defined by the date field "Order Date."

Figure 6B:
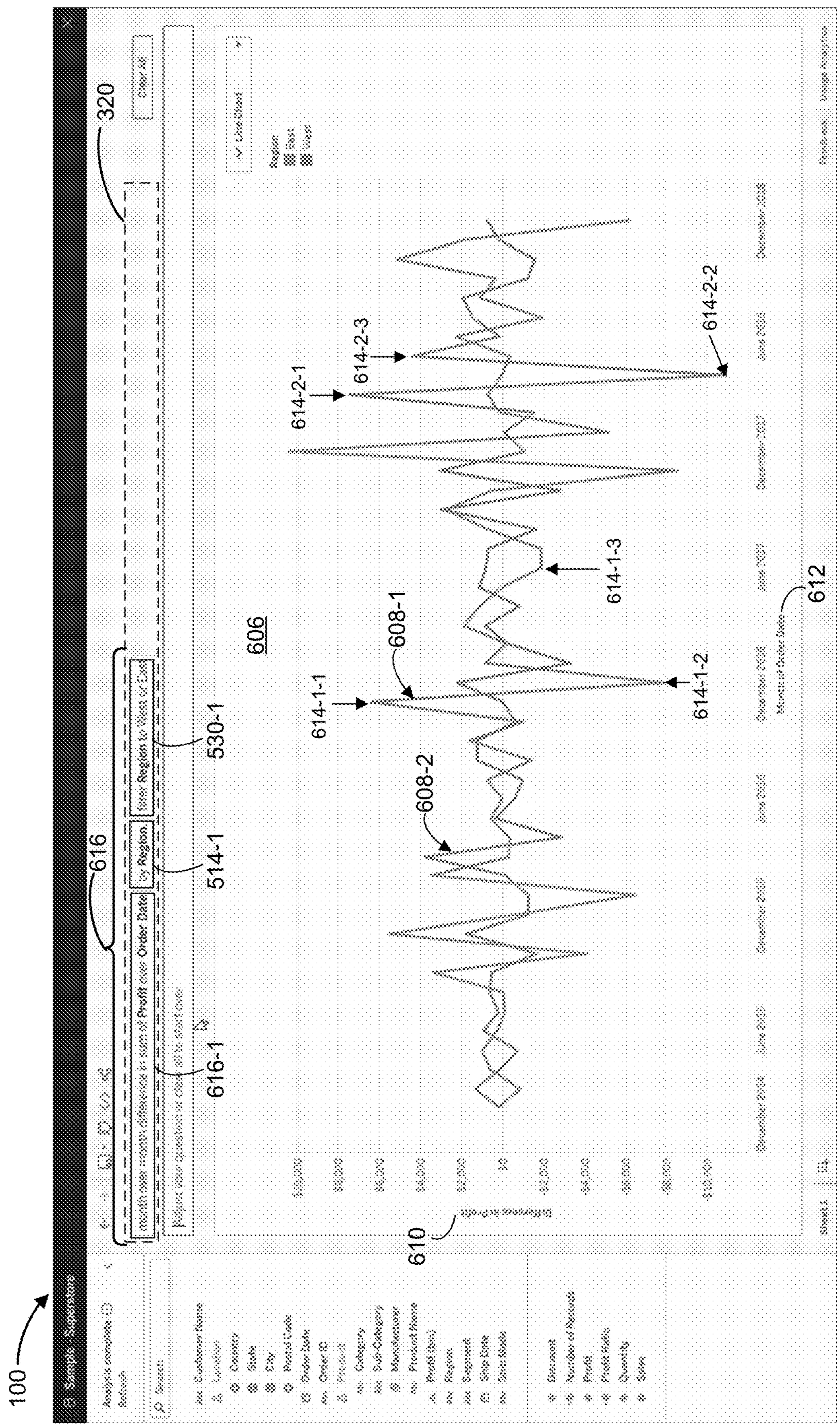

FIG. 6B illustrates an updated data visualization 606 that is automatically generated and displayed in the graphical user interface 100 in response to user selection of the interpretation 604. In this example, the data visualization 606 includes two line charts 608-1 and 608-2, corresponding to the regions "East" and "West" respectively. The updated data visualization 606 comprises, on the y-axis 610, "Difference in Profit" and comprises, on the x-axis 612 "Month of Order Date." Each of the data marks 614-1 corresponds to a respective computed difference in sum of profit for a consecutive pair of months for the region East. Each of the data marks 614-2 corresponds to a respective computed difference in sum of profit for a consecutive pair of months for the region West. (Note that in FIG. 6B, only a subset of the data marks 614-1 and 614-2 are labeled). The phrases 616 that define the updated data visualization 606 include the phrase 616-1 "month over month difference in sum of Profit over Order Date," the phrase 514-1 "by Region," and the phrase 530-1 "Filter Region to West or East."

Figure 6C:
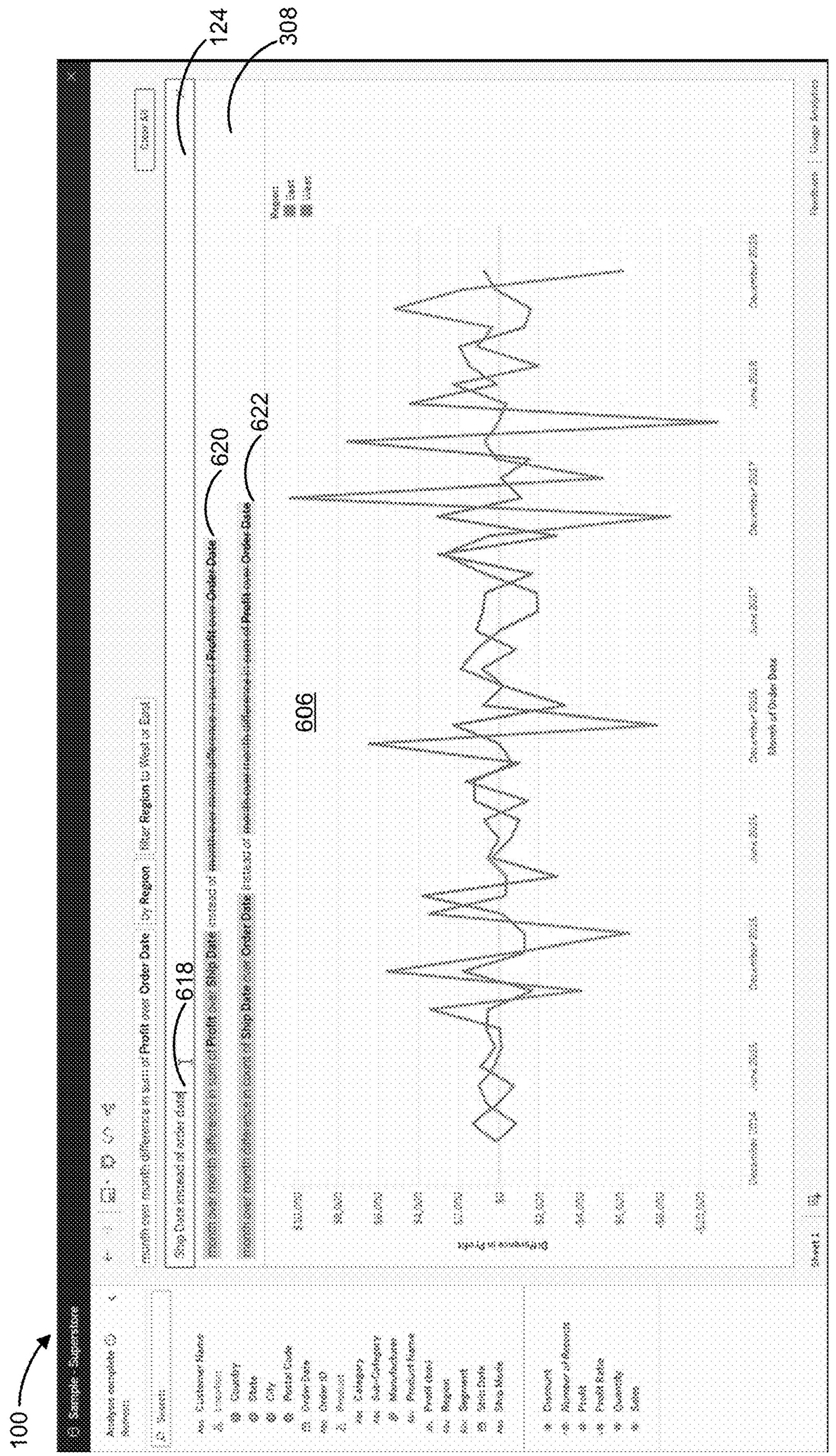

FIG. 6C illustrates a user interaction with the data visualization 606 shown in FIG. 6B. In this example, the user inputs the natural language command 618 "Ship Date instead of order date" in the command box 124. In response to the natural language command 618, the graphical user interface 100 displays an interpretation 620 "month over month difference in sum of Profit over Ship Date instead of" in the dropdown menu 308. The interpretation 620 corresponds to a proposed action to perform a table calculation having the same calculation type (e.g., "month over month difference") and the same aggregation expression (e.g., "sum of Profit"), over a range of dates defined by a new date field "Ship Date" instead of the date field "Order Date." In response to the natural language command 618, the graphical user interface 100 also displays an interpretation 622 "month over month difference in count of Ship Date over Order Date instead of" in the dropdown menu 308. The interpretation 622 corresponds to a proposed action to perform a table calculation having the same calculation type (e.g., month over month difference) and the same range of dates defined by the date field "Order Date," but using a different aggregation operator "count" on the field "Ship Date."

Figure 6D:
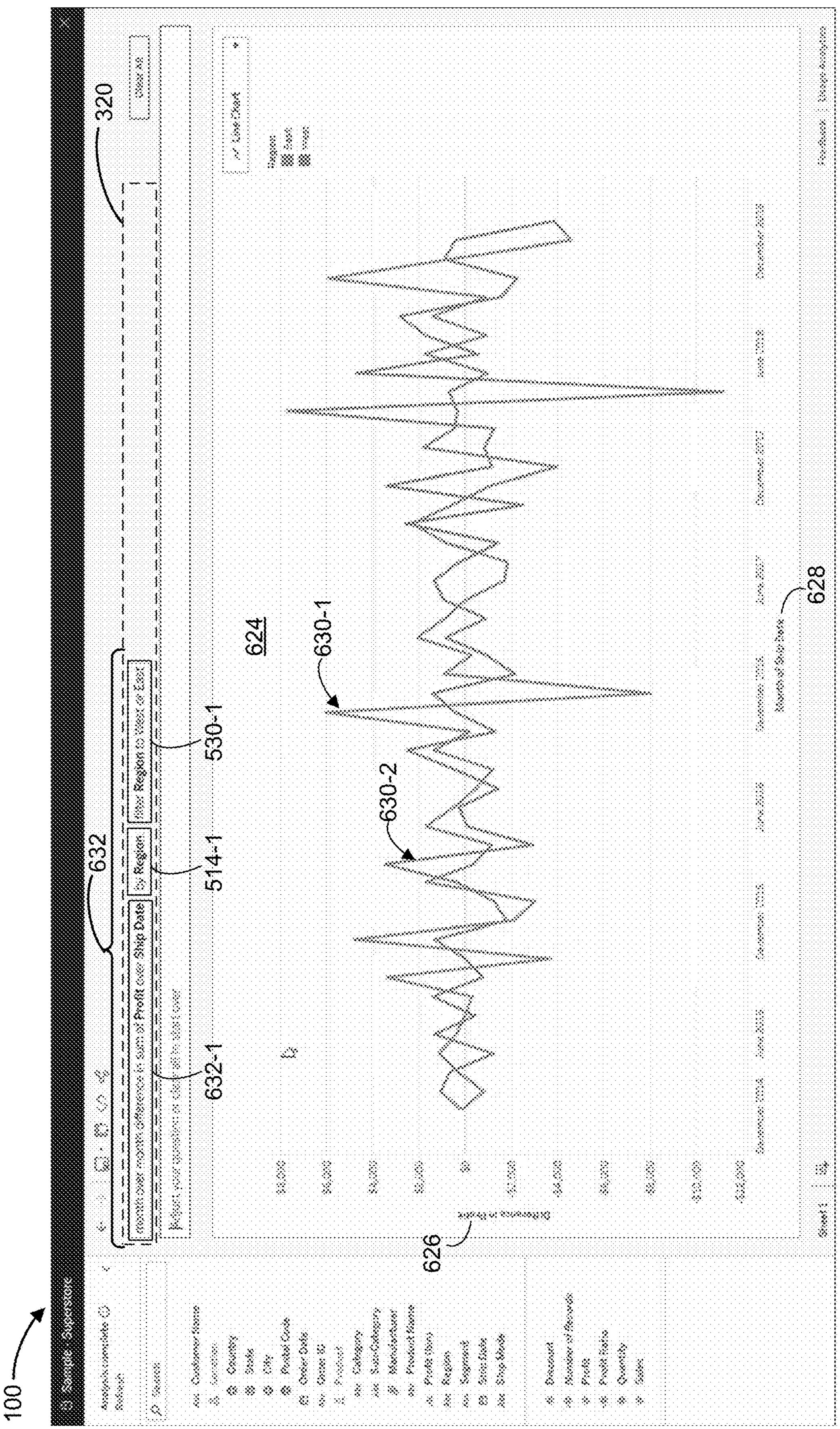

FIG. 6D illustrates an updated data visualization 624 that is automatically generated and displayed in the graphical user interface 100 in response to user selection of the interpretation 620 "month over month difference in sum of Profit over Ship Date instead of". The updated data visualization 624 comprises, on the y-axis 626, "Difference in Profit" and comprises, on the x-axis 628 "Month of Ship Date." The data visualization 624 includes two line charts 630-1 and 630-2 for the East and West regions, respectively. Each of the data marks of the line chart 630-1 represents a respective computed difference in sum of profit for a consecutive pair of months for the East region, over the range of dates defined by the Ship Date. Each of the data marks of the line chart 630-2 represents a respective computed difference in sum of profit for a consecutive pair of months for the West region, over the range of dates defined by the Ship Date. The phrases 632 that define the data visualization 528 include the phrase 632-1 "month over month difference in sum of Profit over Ship Date," the phrase 514-1 "by Region," and the phrase 530-1 "Filter Region to West or East."

Figure 6E:
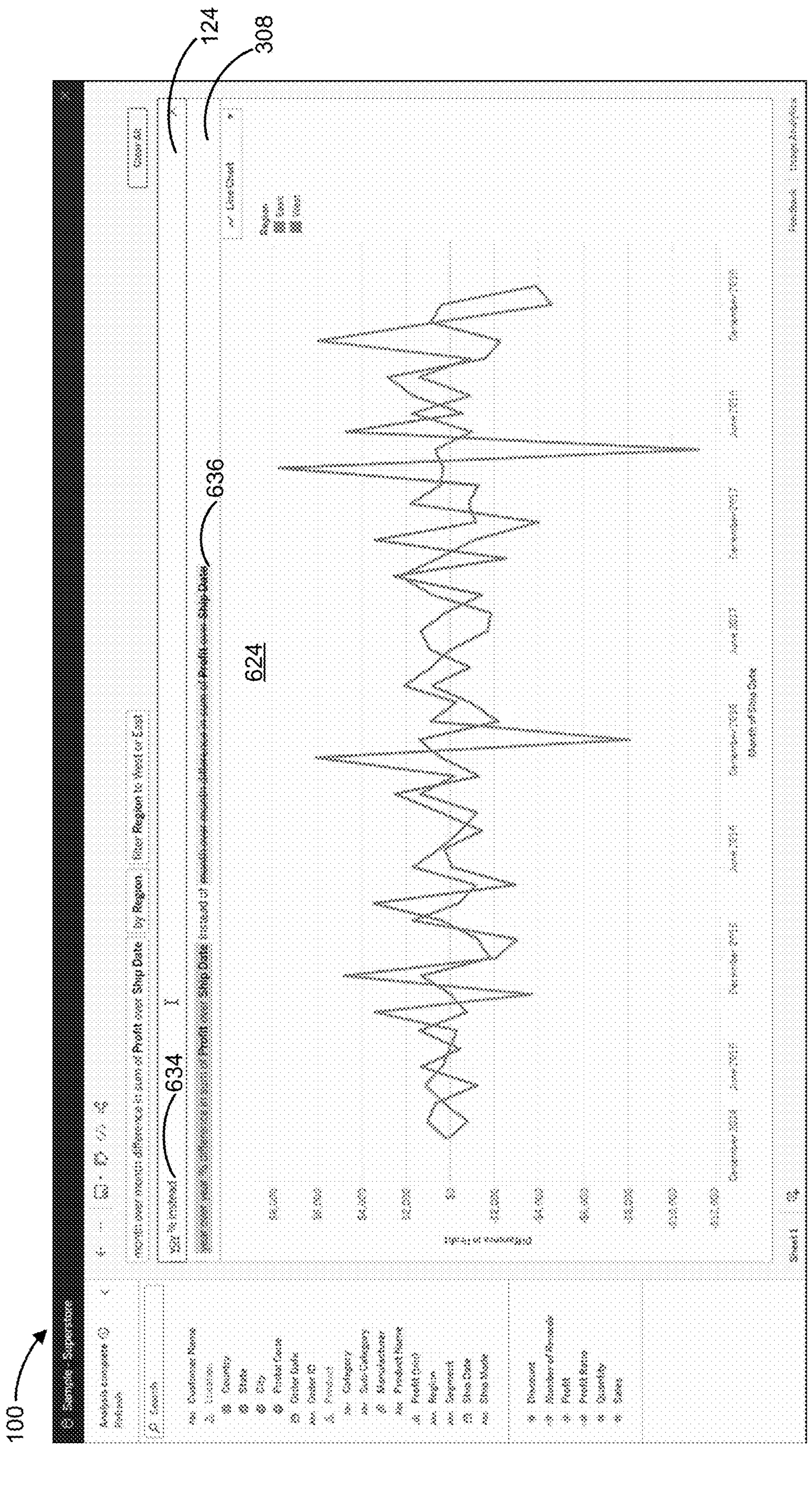

FIG. 6E illustrates a user interaction with the data visualization 624 shown in FIG. 6D. In this example, the user inputs the natural language command 634 "yoy % instead" in the command box 124. In response to the natural language command 634, the data visualization application infers (e.g., using the inferencing module and one or more of the grammar lexicon and data source lexicons that are described in U.S. patent application Ser. No. 16/234,470 filed Dec. 27, 2018, entitled "Analyzing Underspecified Natural Language Utterances in a Data Visualization User Interface) that "yoy" has the same meaning as "year over year." The graphical user interface 100 displays an interpretation 636 "year over year % difference in sum of Profit over Ship Date instead of" in the dropdown menu 308. The interpretation 636 corresponds to a proposed action to perform a table calculation with a different calculation type (e.g., "year over year % difference" instead of "month over month difference"), using the same aggregation expression (e.g., sum of Profit) and over the same range of dates defined by the addressing field "Ship Date."

Figure 6F:
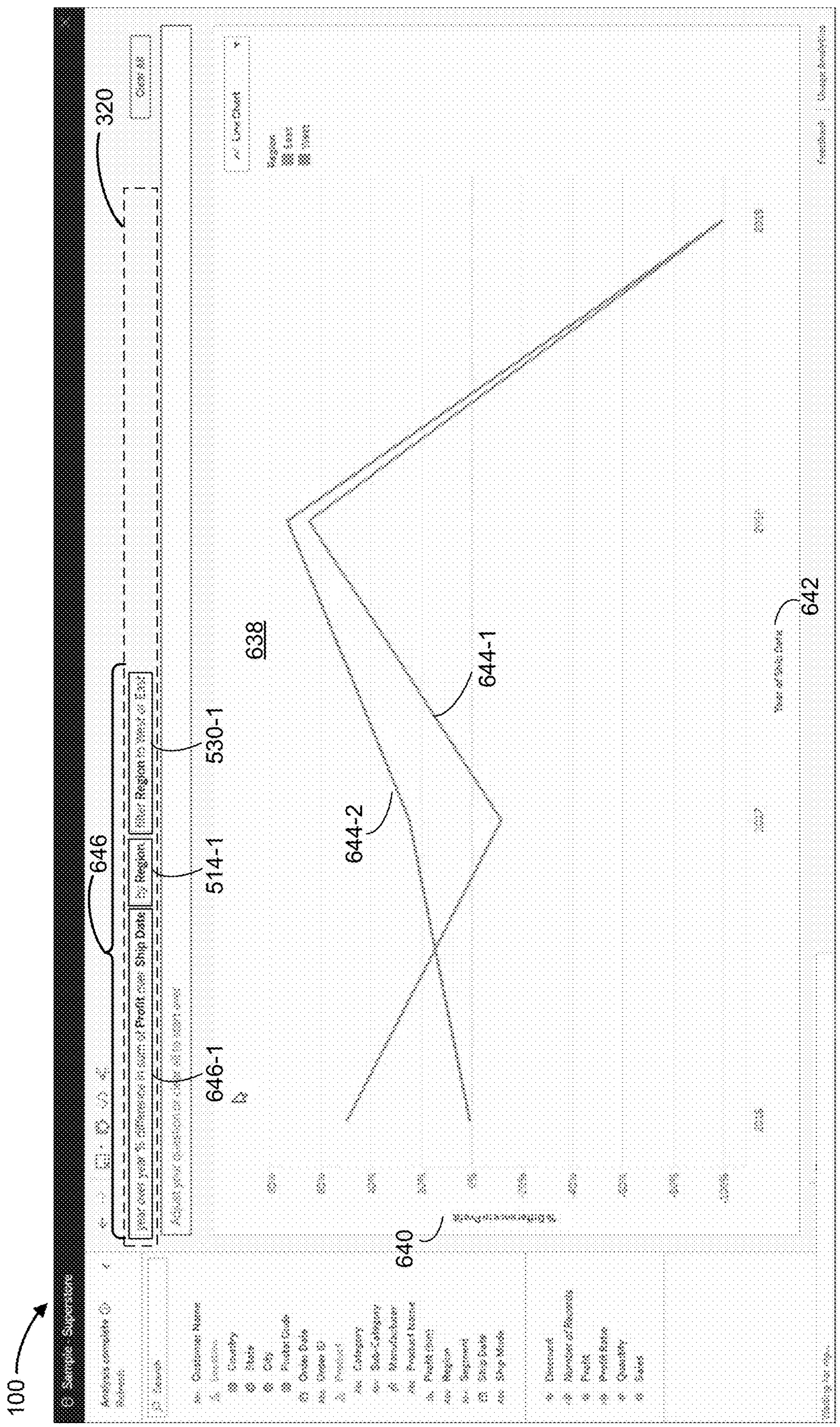

FIG. 6F illustrates an updated data visualization 638 that is automatically generated and displayed in the graphical user interface 100 in response to user selection of the interpretation 636. The data visualization 638 includes two line charts 644-1 and 644-2 for the East and West regions, respectively. Each of the data marks of the line chart 644-1 represents a respective computed percentage difference in sum of profit for a consecutive pair of years for the East region, over the range of years defined by the Ship Date. Each of the data marks of the line chart 644-2 represents a respective computed difference in sum of profit for a consecutive pair of months for the West region, over the range of years defined by the Ship Date.

As further illustrated in FIG. 6F, the updated data visualization 638 comprises, on the y-axis 640, "% Difference in Profit" and comprises, on the x-axis 642, "Year of Ship Date." The markers on the y-axis 640 in FIG. 6F are in percentage values (e.g., %) and the markers on the x-axis 642 are in years, consistent with the calculation type "year over year percentage difference" that is in the selected proposed action 636. The phrases 646 that define the data visualization 638 include the phrase 646-1 "year over year % difference in sum of Profit over Ship Date," the phrase 514-1 "by Region," and the phrase 530-1 "Filter Region to West or East."

In some implementations, in addition to utilizing conversational operations to refine components of a table calculation, as illustrated in FIGS. 4-6, a user can also interact directly with the components via refinement widgets. FIGS. 7A-7J illustrate this functionality.

FIGS. 7A-7J provide a series of screen shots for updating a data visualization using refinement widgets according to some implementations.

Figure 7A:
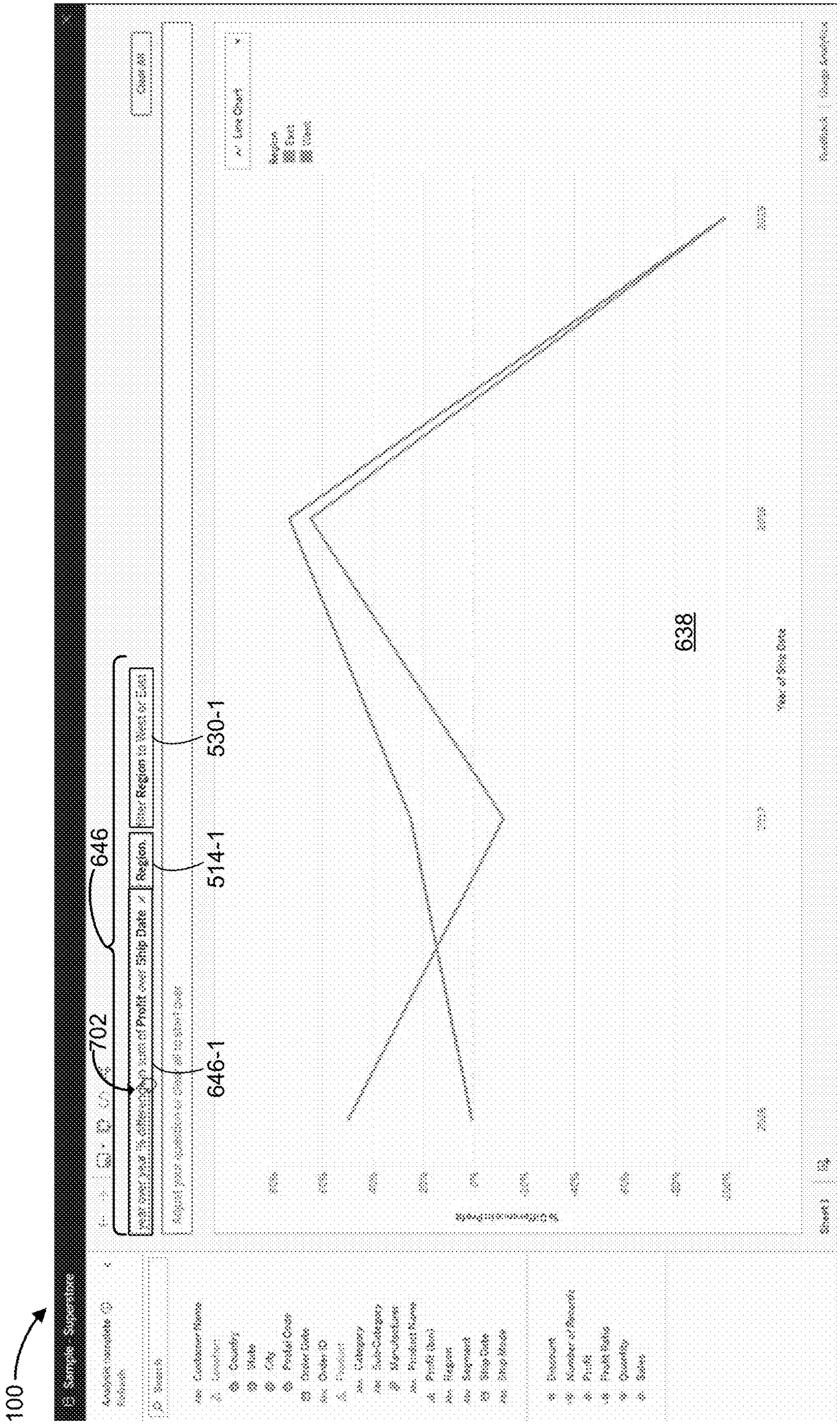
FIGS. 7A-7J provide a series of screen shots for updating a data visualization using refinement widgets according to some implementations.

FIG. 7A illustrates a user interaction with the data visualization 638 shown in FIG. 6F. In some instances, a user selects (e.g., via a mouse click, hover, or other input) a first term in a phrase of the phrases that define a data visualization. For example, FIG. 7A illustrates a user hovering over the term 702 (e.g., the calculation type component) "year over year % difference" in the phrase 646-1 "year over year % difference in sum of Profit over Ship Date". In some implementations, in response to the user selection, the term is visually distinguished within the natural language input. For example, the selected term 702 "year over year % difference" is underlined in response to the user hovering over the term.

Figure 7B:
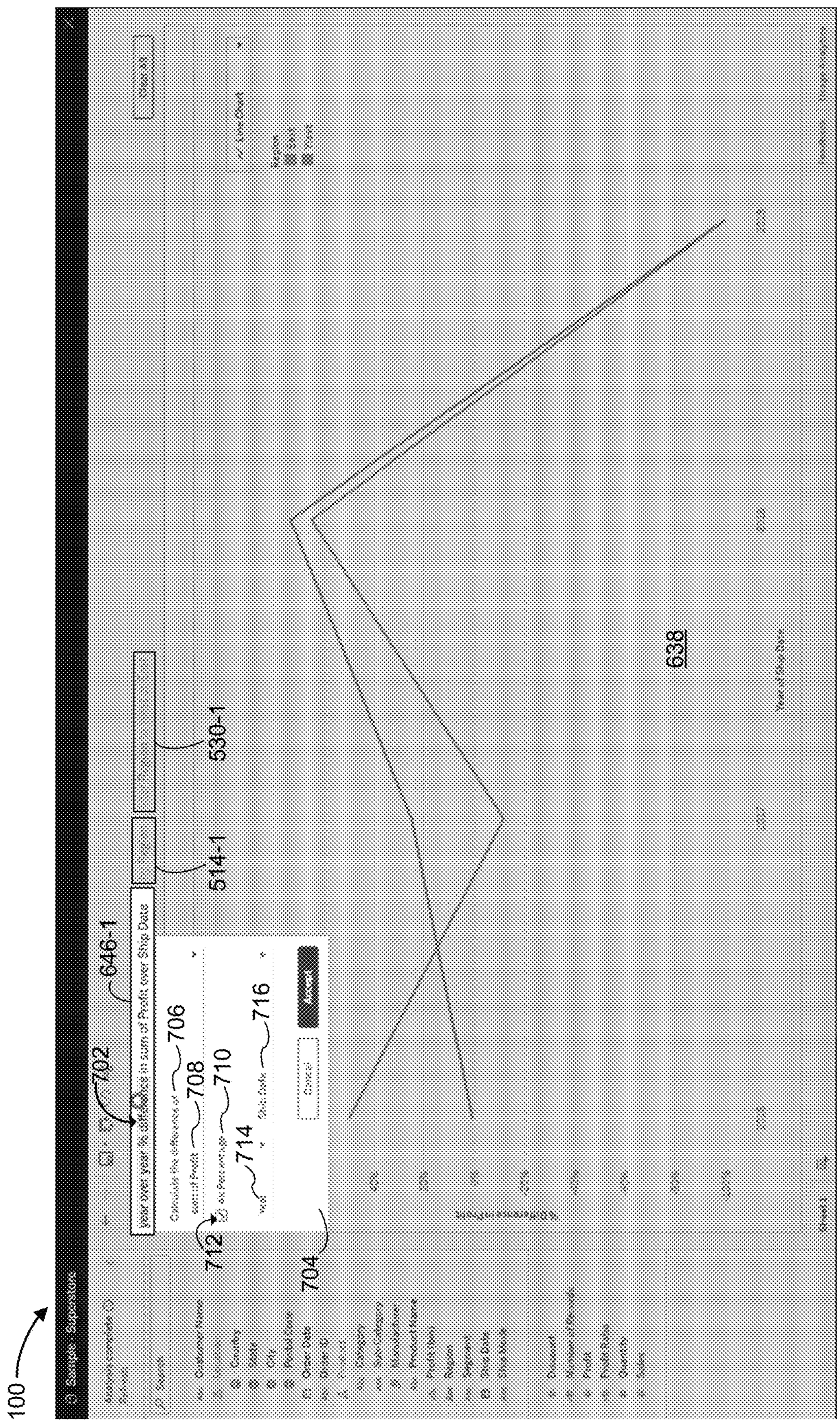

In some implementations, in response to the user selection of a term (e.g., a term that includes the table calculation type), a widget 704 is generated (e.g., using the widget generation module 254) and displayed in the graphical user interface 100, as illustrated in FIG. 7B. In some instances, the widget 704 is also referred to as a refinement widget or a table calculation refinement widget.

In FIG. 7B, the widget 704 displays the components that define a table calculation expression, including the table calculation type, the aggregation expression, and the addressing field. In this example, the current table calculation type "year over year % difference" can be ascertained from the widget 704 using a combination of the label 706 "Calculate the difference of," the label 710 "As Percentage," and a user-selectable time period 714, which is currently set to "Year." The tick mark in the box 712 next to the label 710 indicates that the label 710 is currently selected. A user can toggle between "% difference" (e.g., a percentage difference) and "difference" (e.g., an absolute difference) by selecting or unselecting the box 712. That is to say, when the box 712 is not selected (e.g., when there is no tick mark in it), the calculation type in this example becomes "year by year difference." The aggregation expression is determined from the user-selectable aggregation expression field 708, which is currently set to "sum of Profit." The addressing field is determined from the user-selectable addressing field 716, which is currently set to "Ship Date."

Figure 7C:
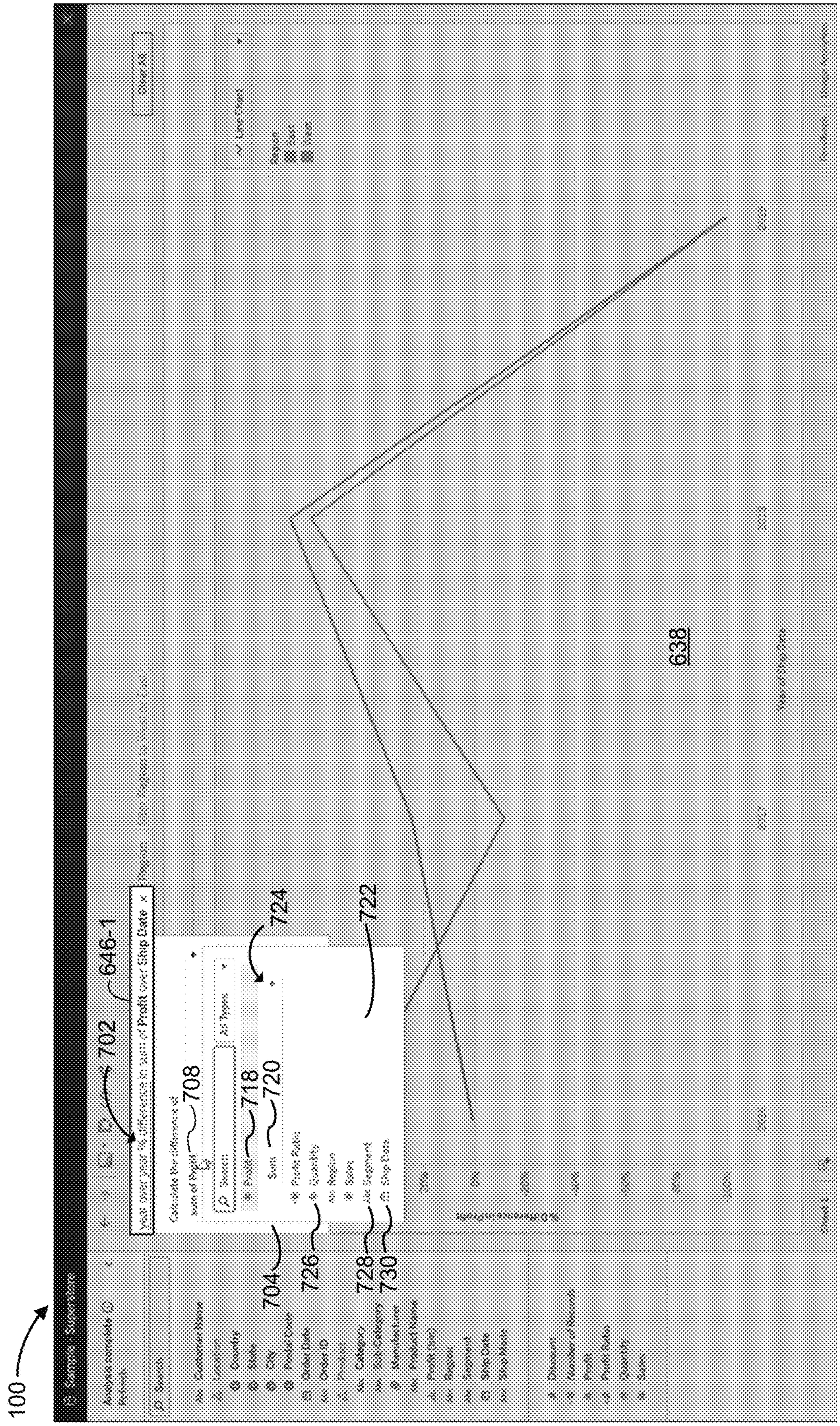

FIG. 7C illustrates a user interaction with the aggregation expression field 708 "sum of Profit" (e.g., by clicking on the field 708). In response to the user interaction, the widget 704 displays a menu 722 that includes a partial view of field names from the data source (e.g., "Profit Ratio", "Quantity", "Region", "Sales", "Segment" and "Ship Date"). The widget 704 also displays, next to each of the field names, an icon that indicates the field type. For example, the hash icon 726 (e.g., "#") next to the field "Quantity" indicates that "Quantity" is a measure (e.g., a numerical quantity). The "Abc" icon 728 next to the field "Segment" indicates that "Segment" is a dimension (e.g., categorical data). The calendar icon 730 next to the field "Ship Date" indicates that "Ship Date" is a date field (e.g., date/time field). The widget 704 further displays the field 718 "Profit" and the aggregation type 720 "Sum" that define the aggregation expression "sum of Profit."

Figure 7D:
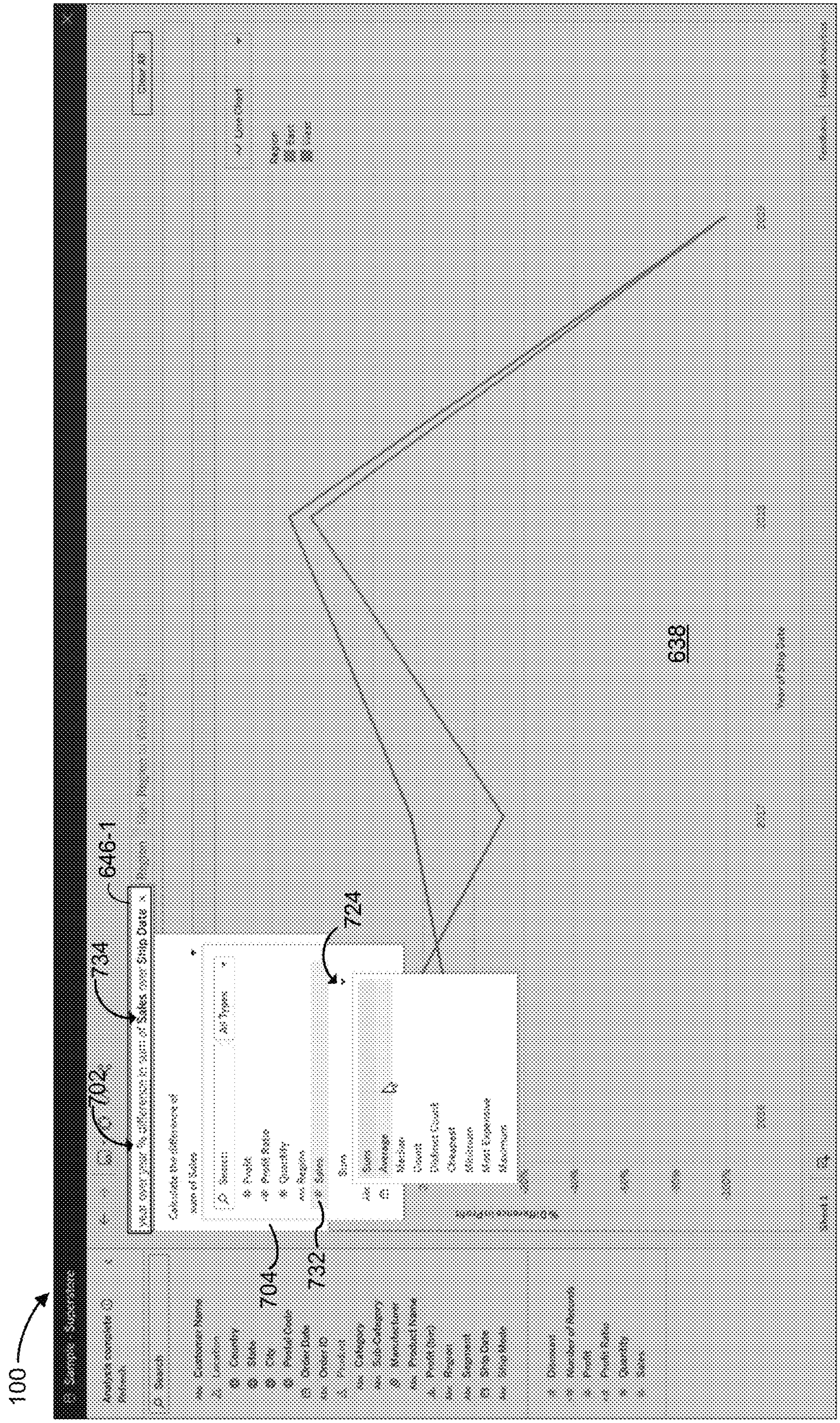

FIG. 7D illustrates a user interaction to change the field to be aggregated from "Profit" to "Sales" 732. In response to the user interaction, the computing device automatically updates the aggregation component 734 of the phrase 646-1 to "sum of Sales." Note that the change is reflected in the phrase(s) but the data visualization 638 is not yet updated in FIG. 7D, because the change has not yet been committed. It is only when the user clicks "Accept" that the change(s) will be applied to the visualization.

FIG. 7D also illustrates user selection of the dropdown icon 724 corresponding to the aggregation type (e.g., "Sum"). In response to the user selection, the widget 704 displays a list of available aggregation types (e.g., operators), including "Sum," "Average," "Median," "Count," "Distinct Count," "Cheapest," "Minimum," "Most expensive," and "Maximum."

Figure 7E:
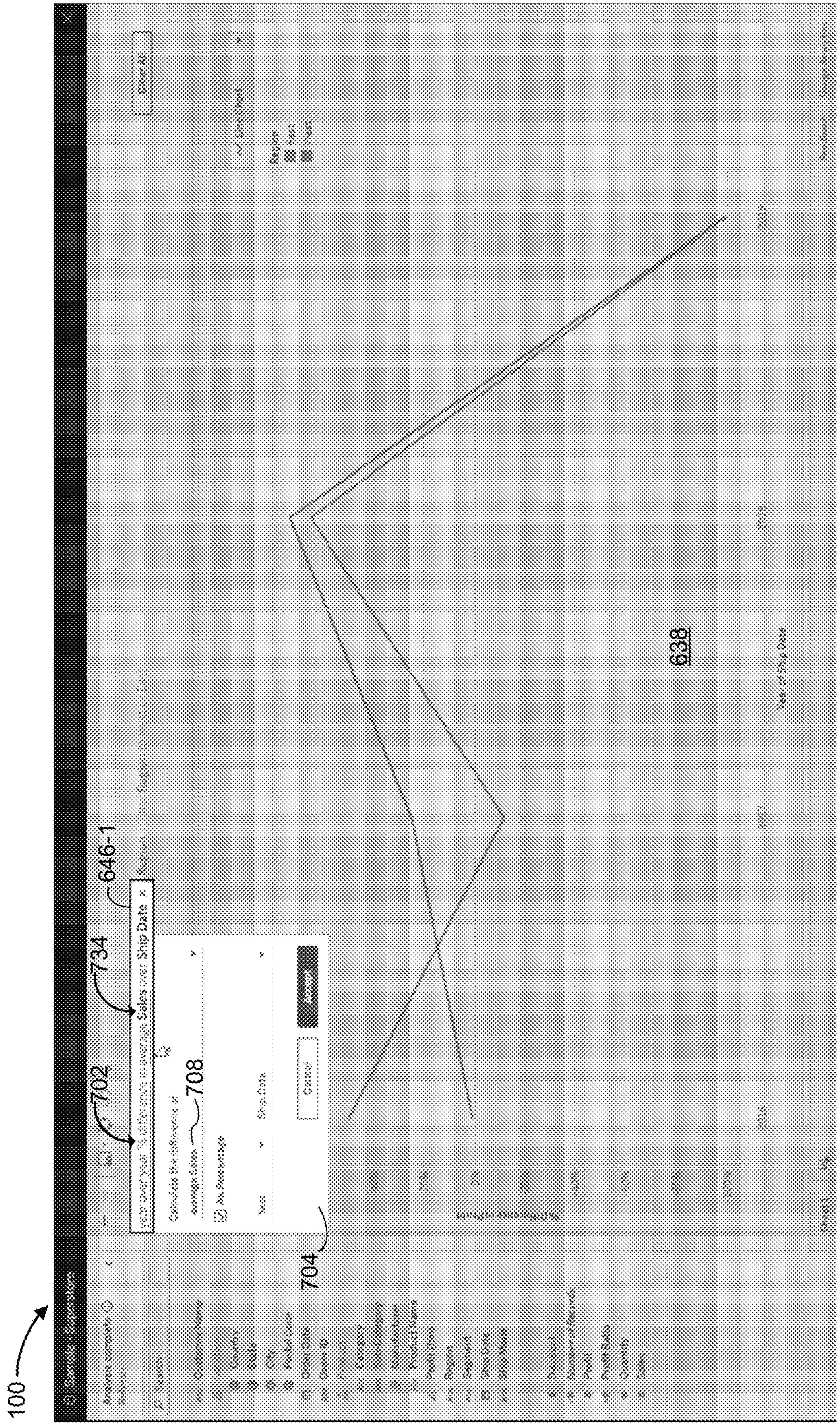
Figure 7F:
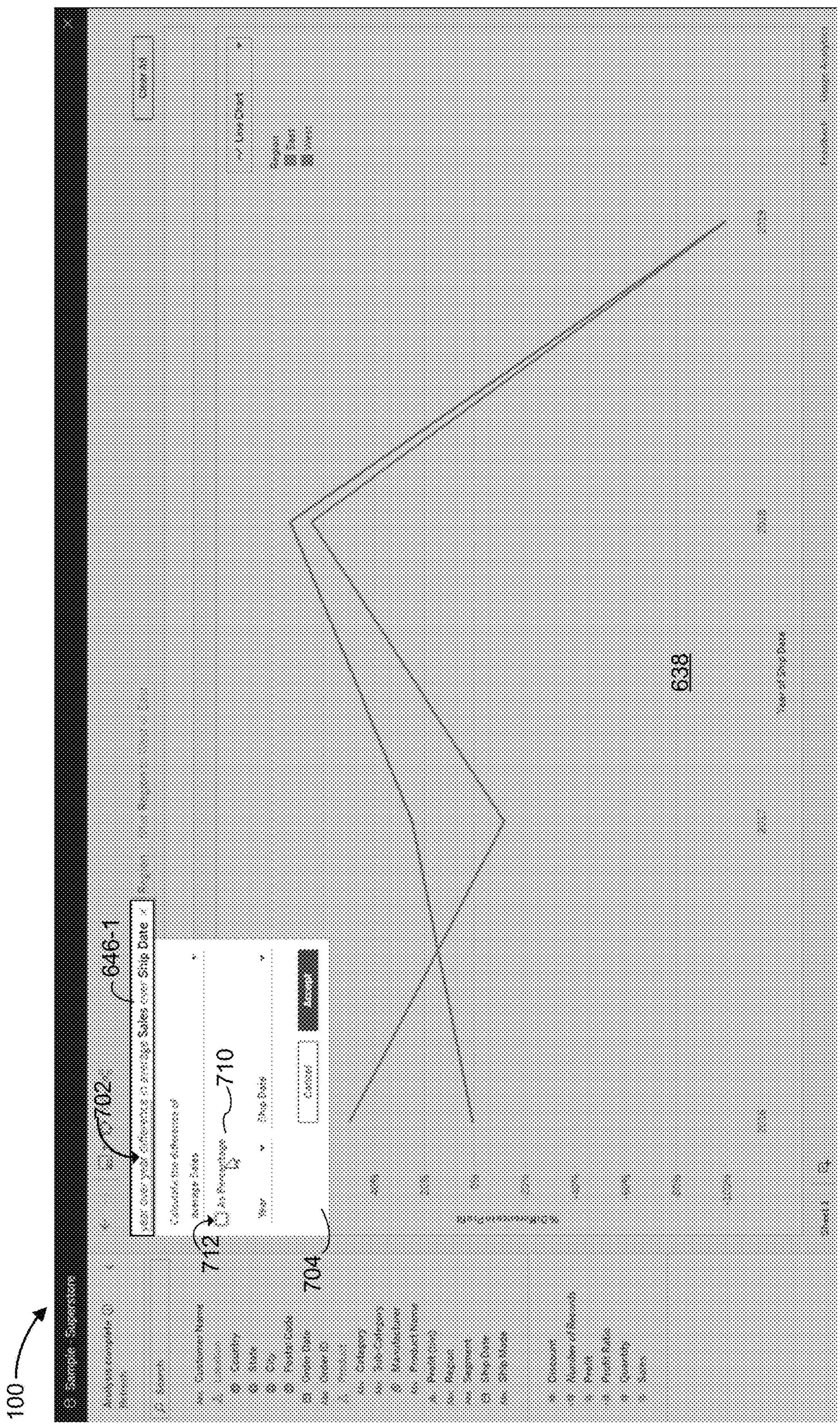

FIG. 7E illustrates in response to user selection of the aggregation type "Average" in FIG. 7F, the computing device automatically updates the term 734 (e.g., the aggregation component) of the phrase 646-1 to "average Sales." The computing device also automatically updates the aggregation expression field 708 to "average Sales."

FIG. 7F illustrates a user input un-selecting the box 712 next to the label 710 "As Percentage" (e.g., by removing the mark from the tick box). In response to the user input, the computing device automatically updates the term 702 in the phrase 646-1 to "year over year difference."

Figure 7G:
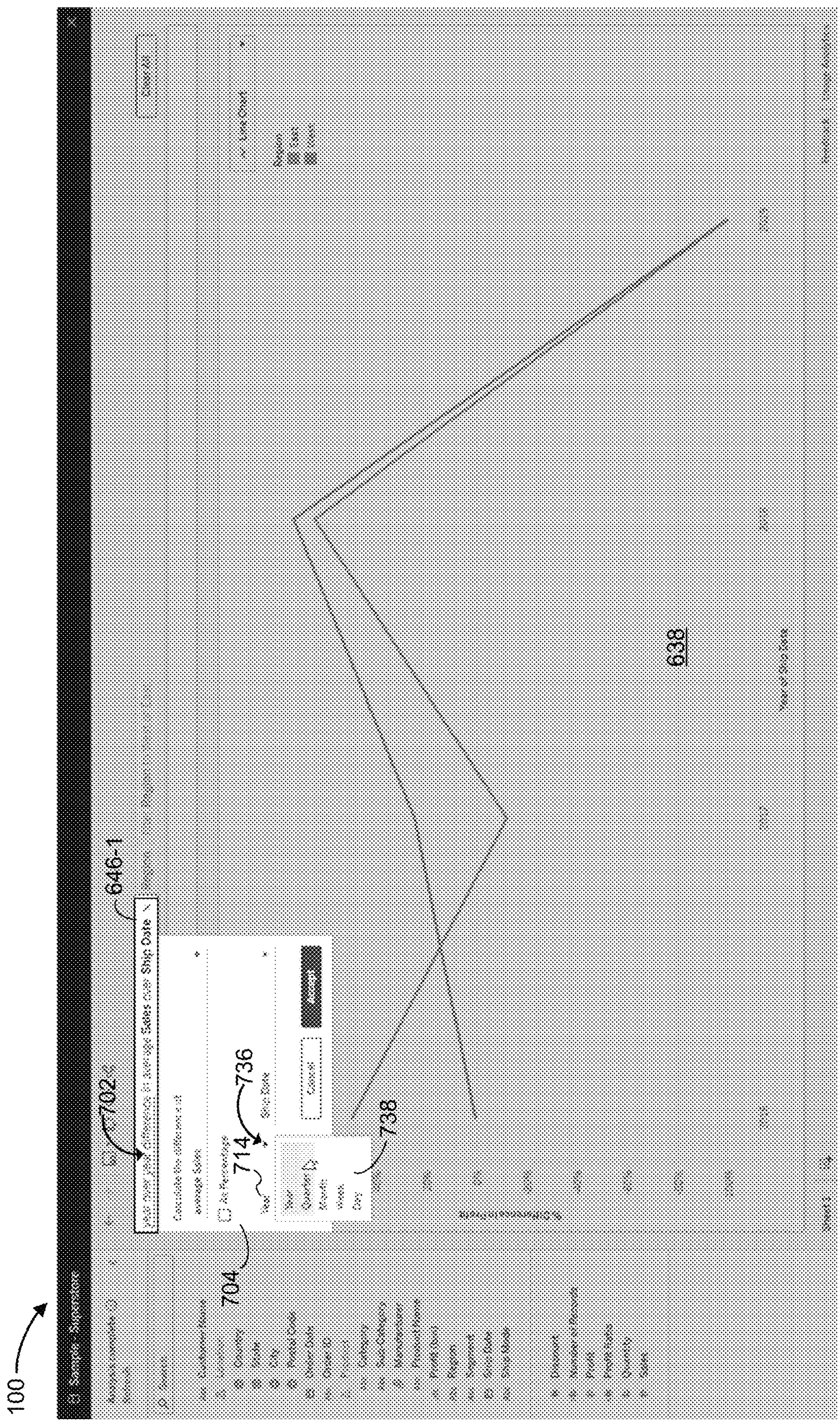

FIG. 7G illustrates user selection of the dropdown icon 736 next to the time period selection 714. In response to the user selection, the widget 704 displays a list 738 of user-selectable options for time periods, including "Year," "Quarter," "Month," "Week," and "Day."

Figure 7H:
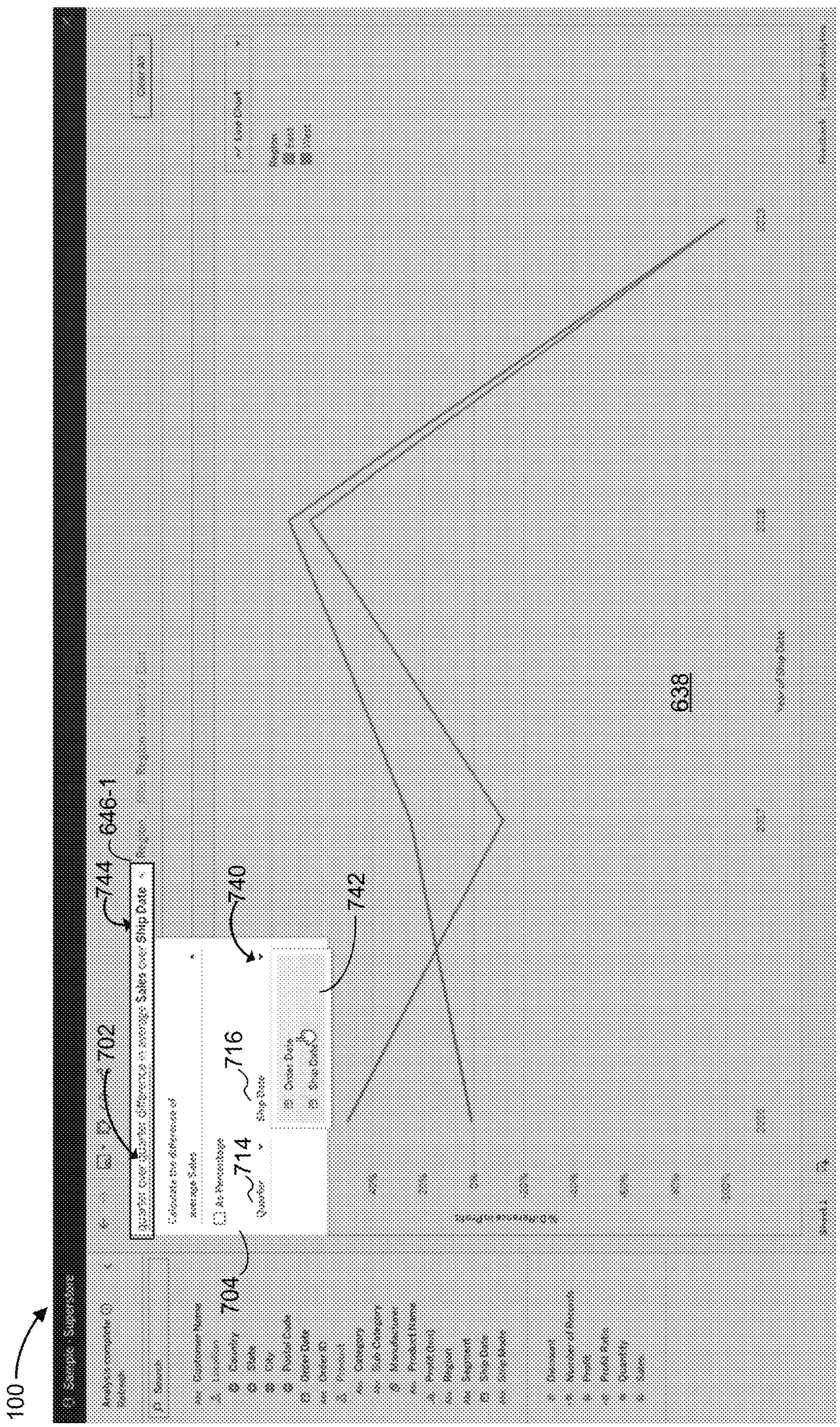

FIG. 7H illustrates in response to user selection of the time period "Quarter" in FIG. 7G, the computing device automatically updates the term 702 in the phrase 646-1 to "quarter over quarter difference".

FIG. 7H also illustrates user selection of the dropdown icon 740 next to the addressing field 716. In response to the user selection, the widget 704 displays a list 742 of possible addressing fields (e.g., date fields or date/time fields), such as "Order Date" and "Ship Date."

Figure 7I:
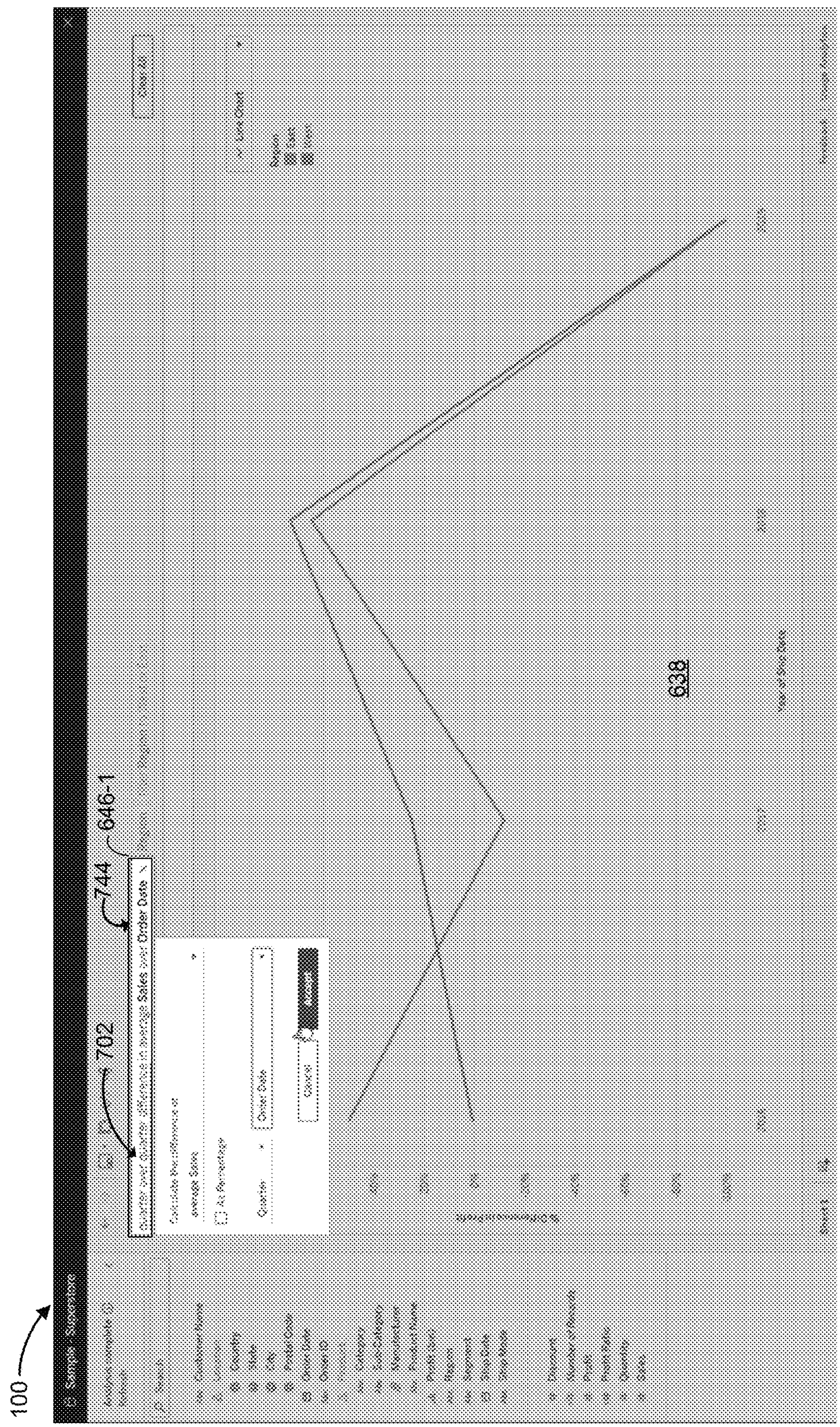

FIG. 7I illustrates in response to user selection of the field "Order Date" in FIG. 7H, the computing device automatically updates the term 744 (e.g., the addressing field) in the phrase 646-1 to "Order Date".

Figure 7J:
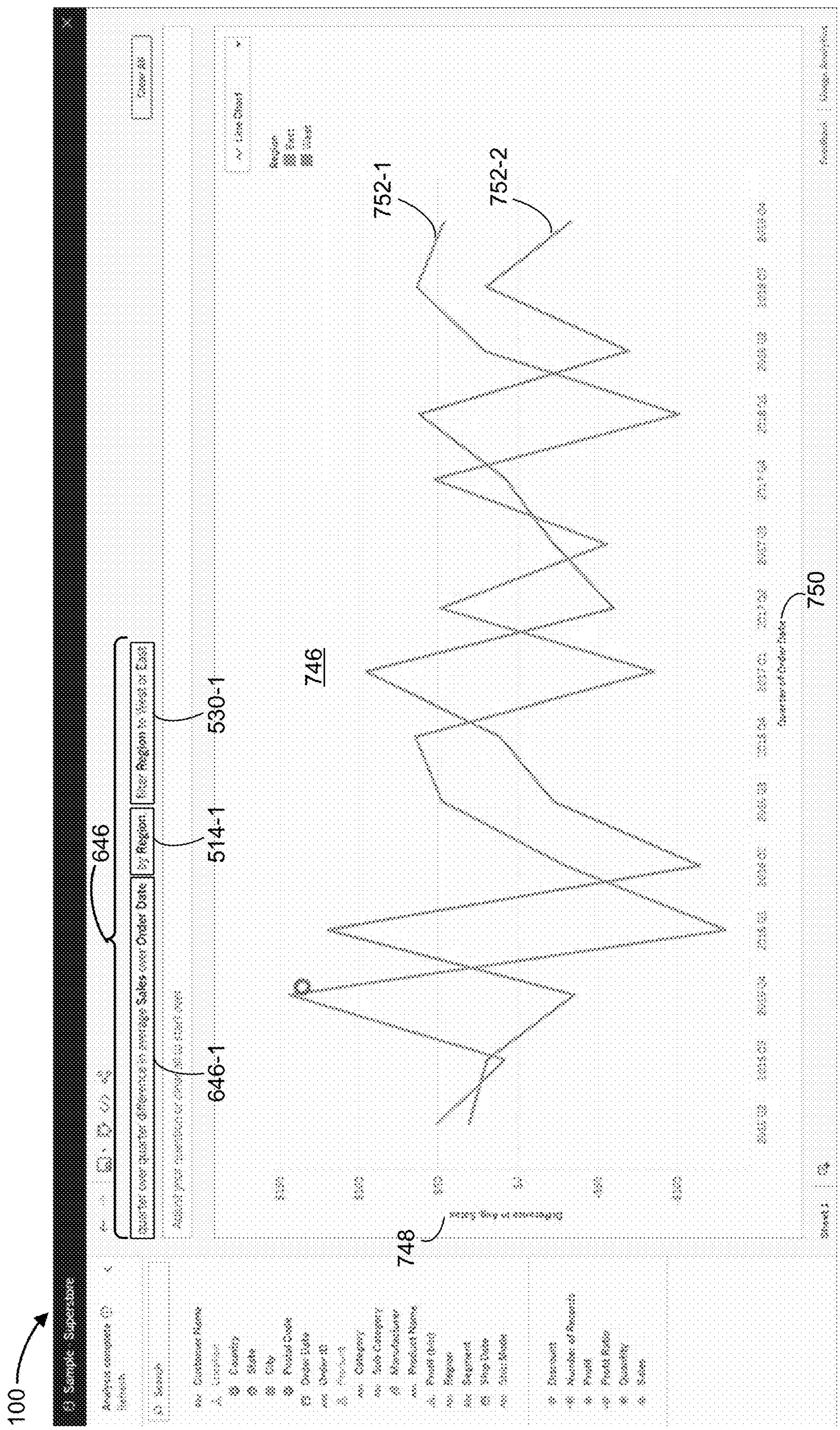

FIG. 7J illustrates an updated data visualization 746 that is automatically generated and displayed in the graphical user interface 100 in response to user commitment to the changes (e.g., the user clicks the "Accept" button in FIG. 7I). The data visualization 746 comprises, on the y-axis 748, "Difference in Avg. Sales" and comprises, on the x-axis 750, "Quarter of Order Date." The data visualization 746 includes two line charts 752-1 and 752-2, for the East and West regions respectively. Each of the data marks of the line chart 752-1 represents a respective computed difference (e.g., absolute difference) in average sales in the East region, for a consecutive pair of quarters, over the range of quarters defined by the Order Date. Each of the data marks of the line chart 752-2 represents a respective computed difference in average sales in the West region, for a consecutive pair of quarters, over the range of quarters defined by the Order Date. The phrases 646 that define the data visualization 528 include the updated phrase 646-1 "quarter over quarter difference in average Sales over Order Date," the phrase 514-1 "by Region," and the phrase 530-1 "Filter Region to West or East."

As illustrated in FIG. 7J, the terms corresponding to the aggregation expression and the addressing field can be refined from the table calculation widget (e.g., the widget 704), by clicking the term 702 corresponding to the table calculation type. In some implementations, the terms corresponding to the aggregation expression and the addressing field can also be refined via their respective field widgets which are triggered by clicking their own terms in the phrase 646-1. FIG. 8 illustrates this functionality.

Figure 8A:
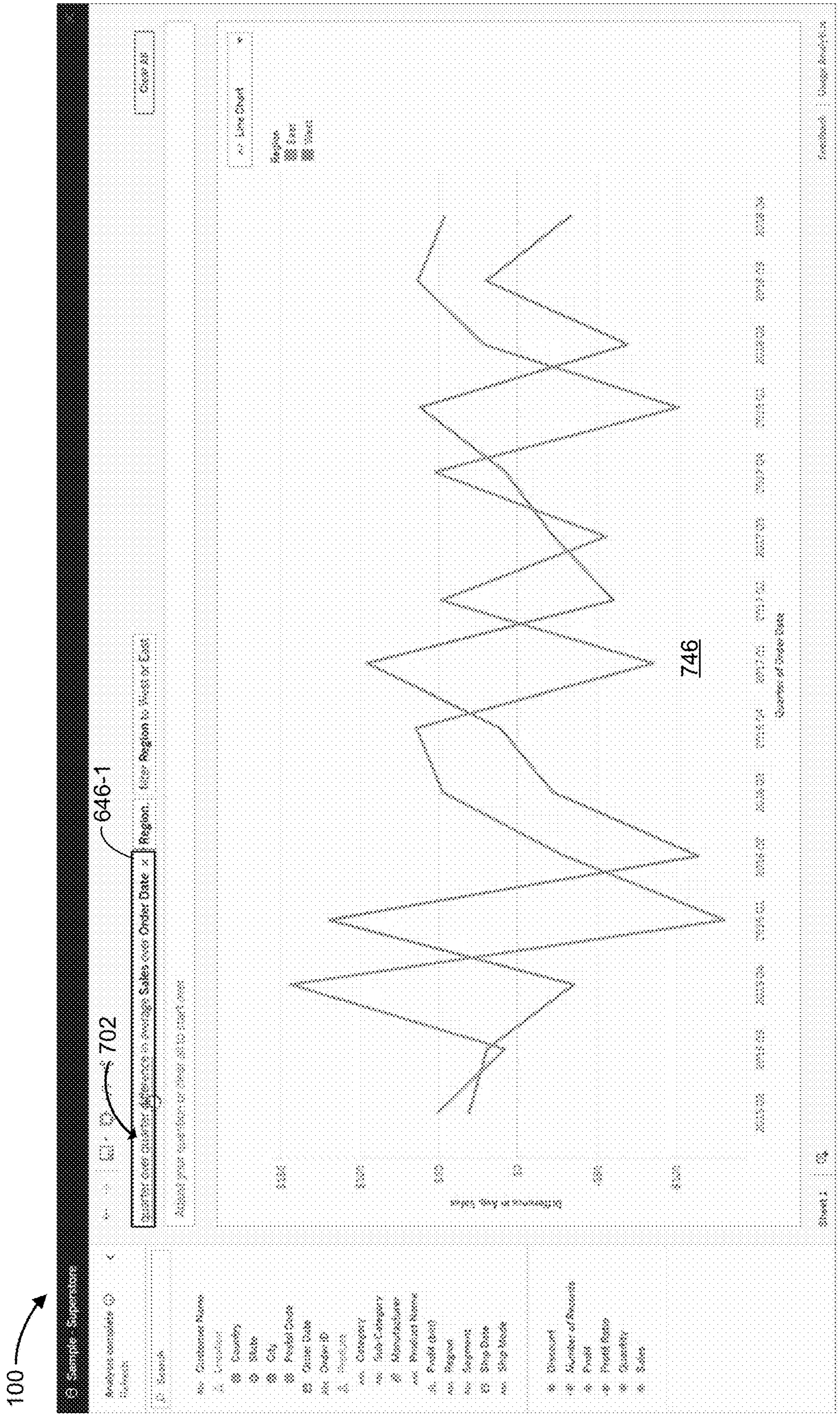
FIGS. 8A-8Q provide a series of screen shots for updating a data visualization using refinement widgets according to some implementations.
Figure 8B:
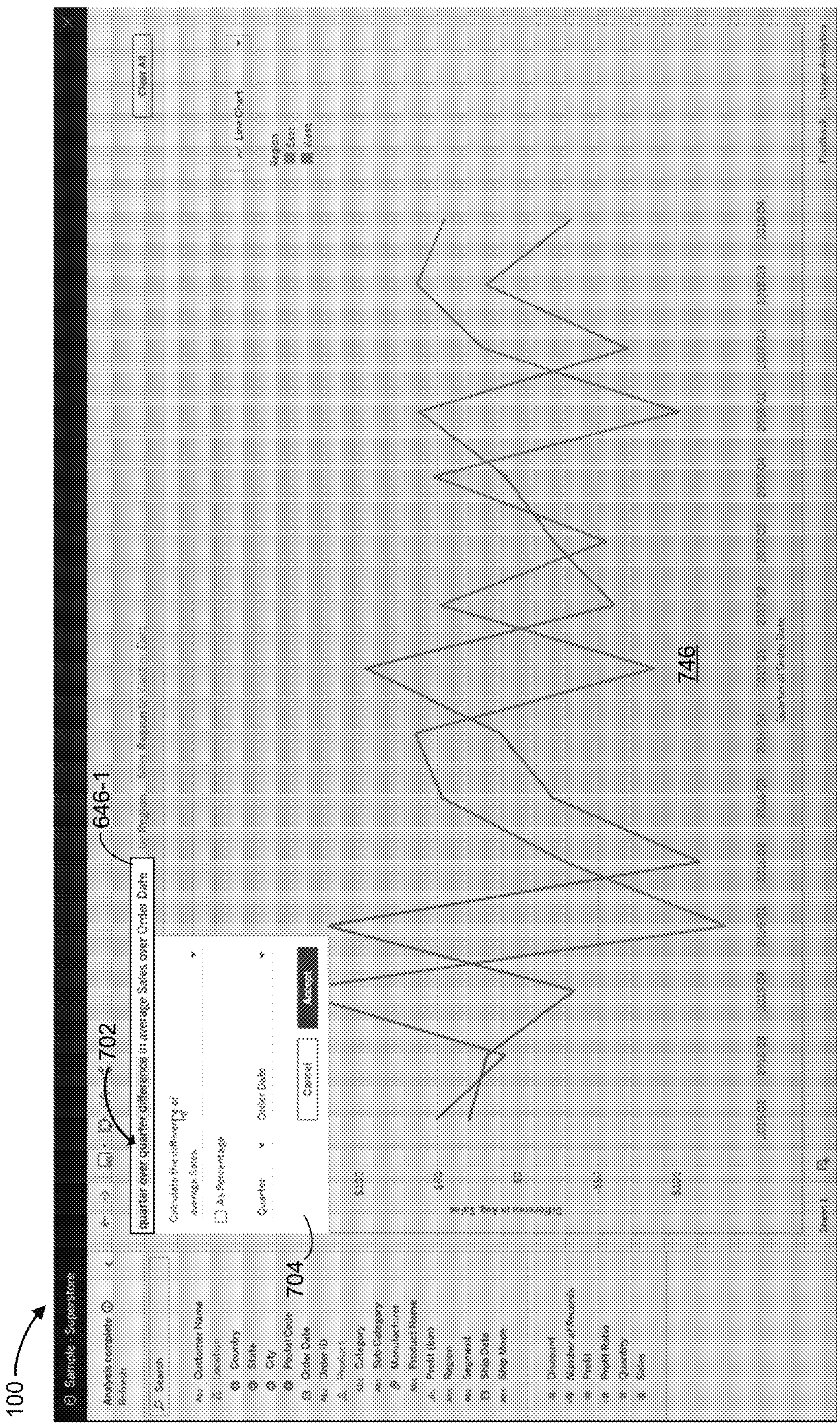
Figure 8C:
Figure 8D:
Figure 8E:
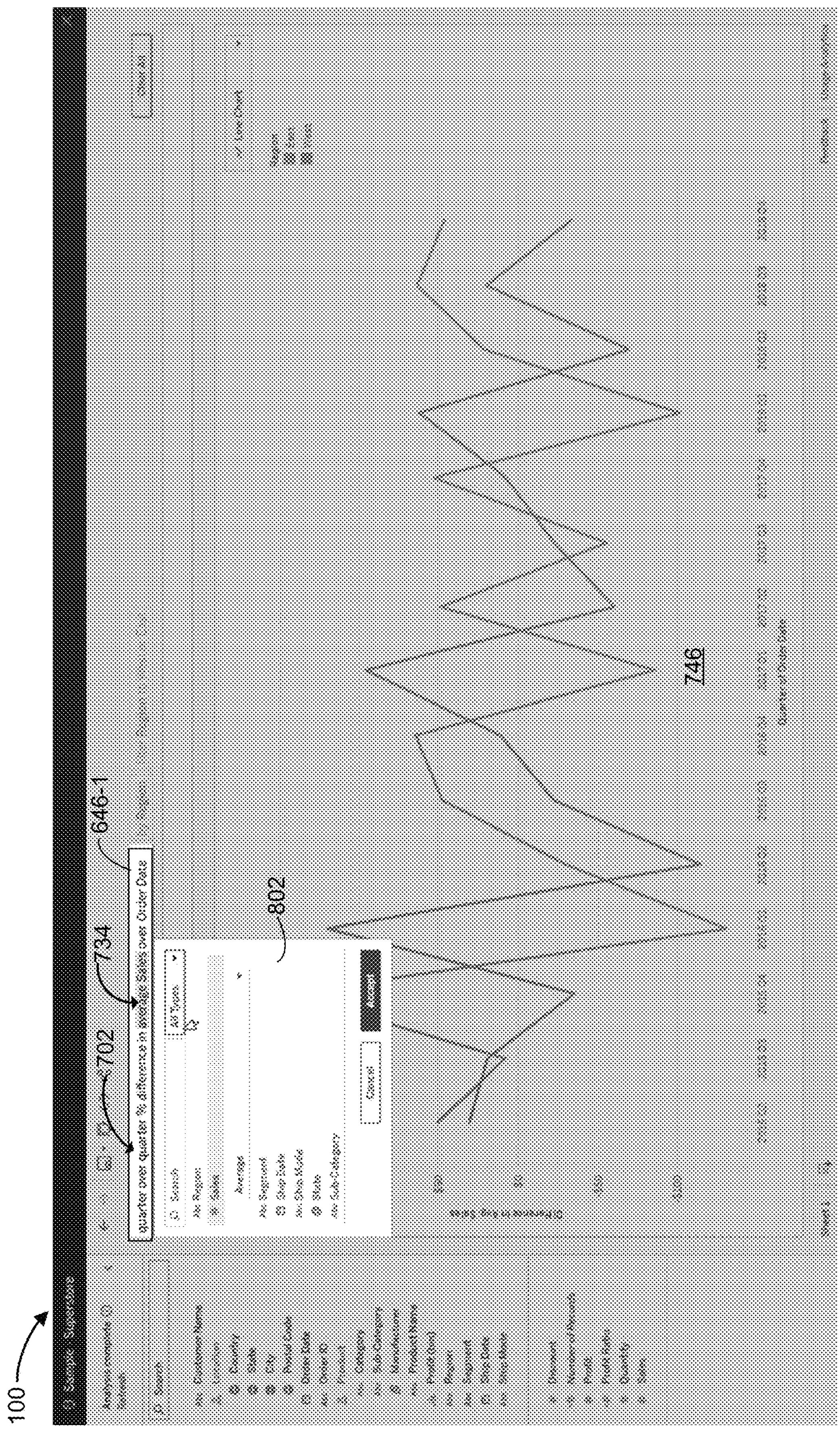
Figure 8F:
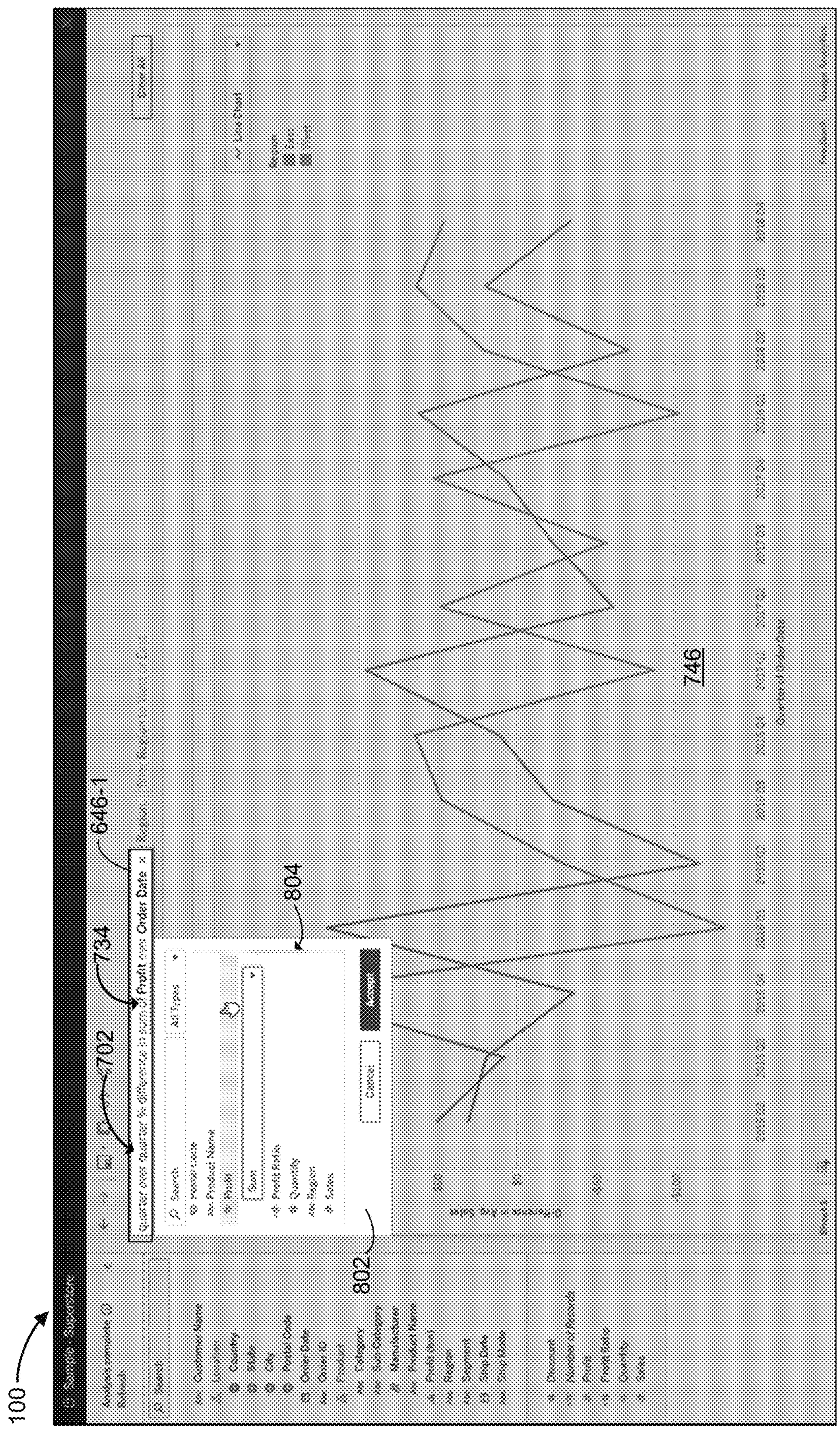
Figure 8G:
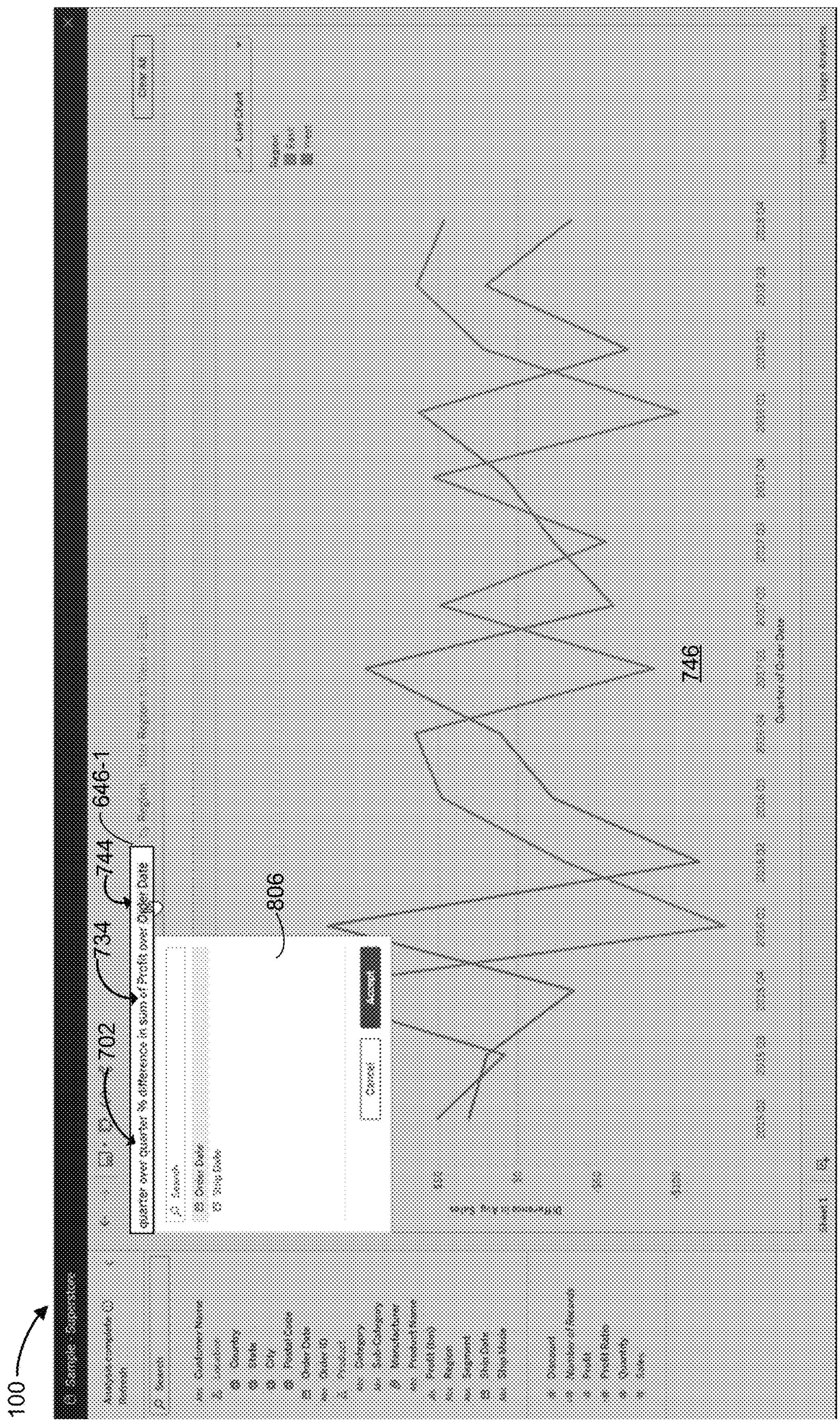
Figure 8H:
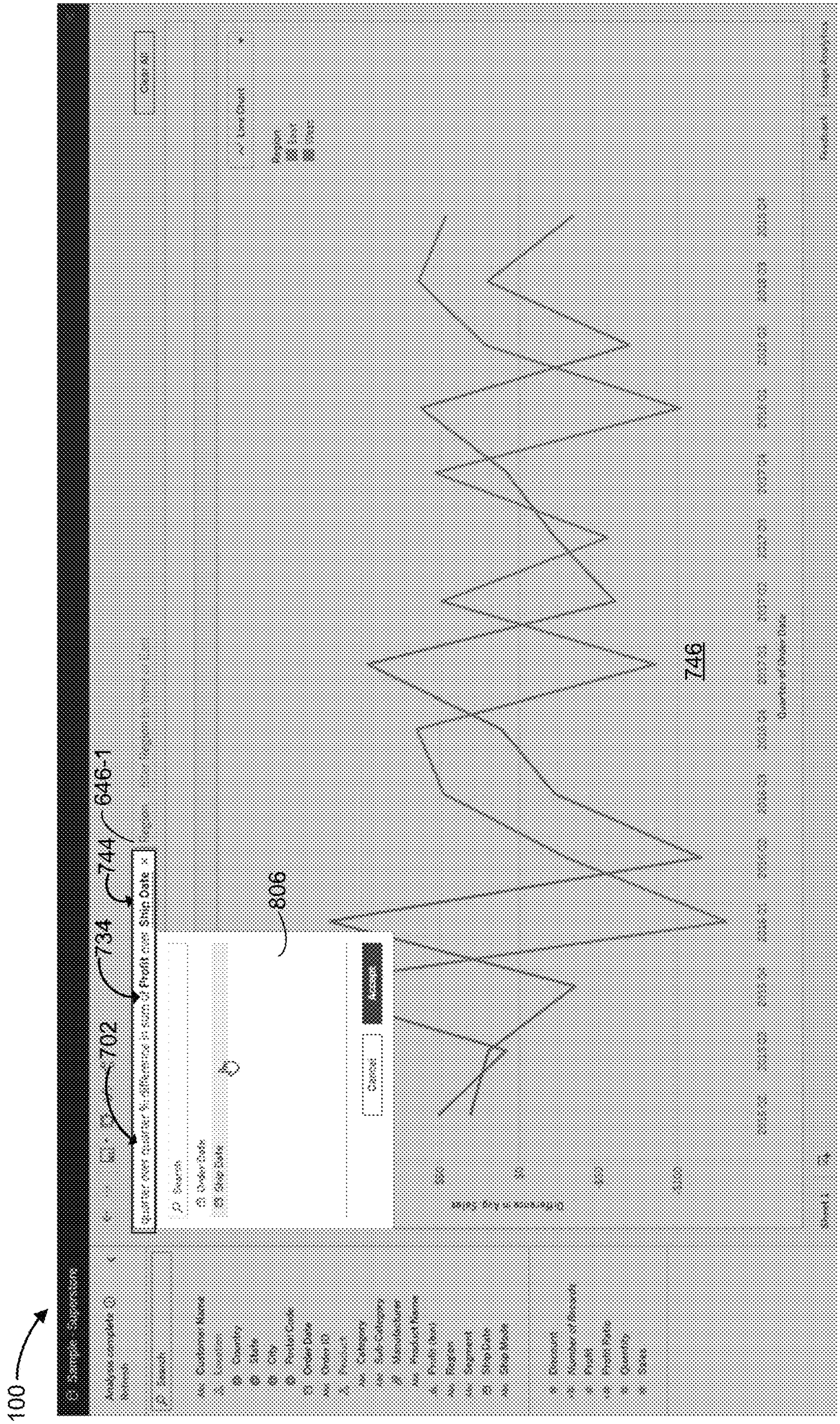
Figure 8I:
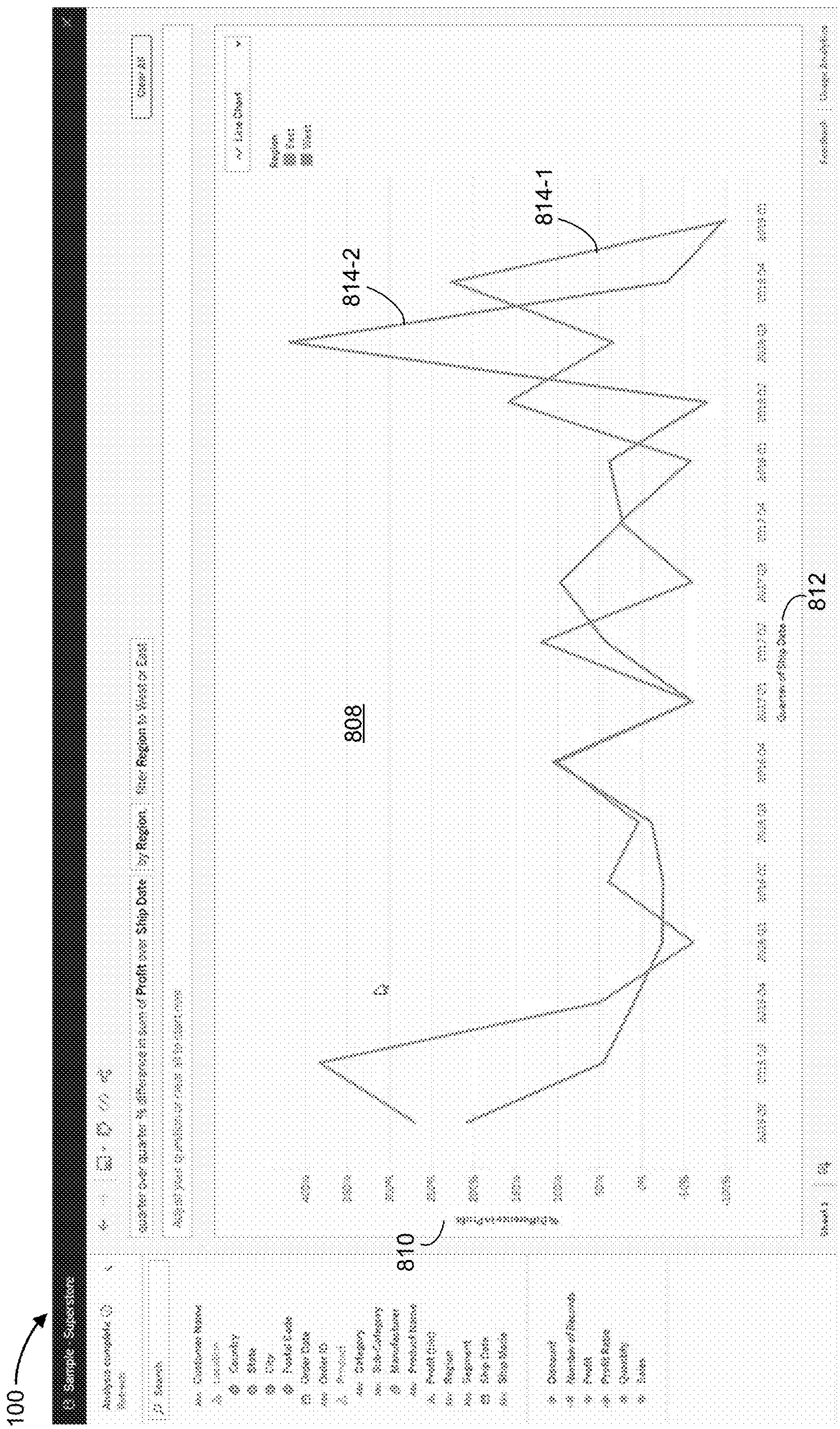
Figure 8J:
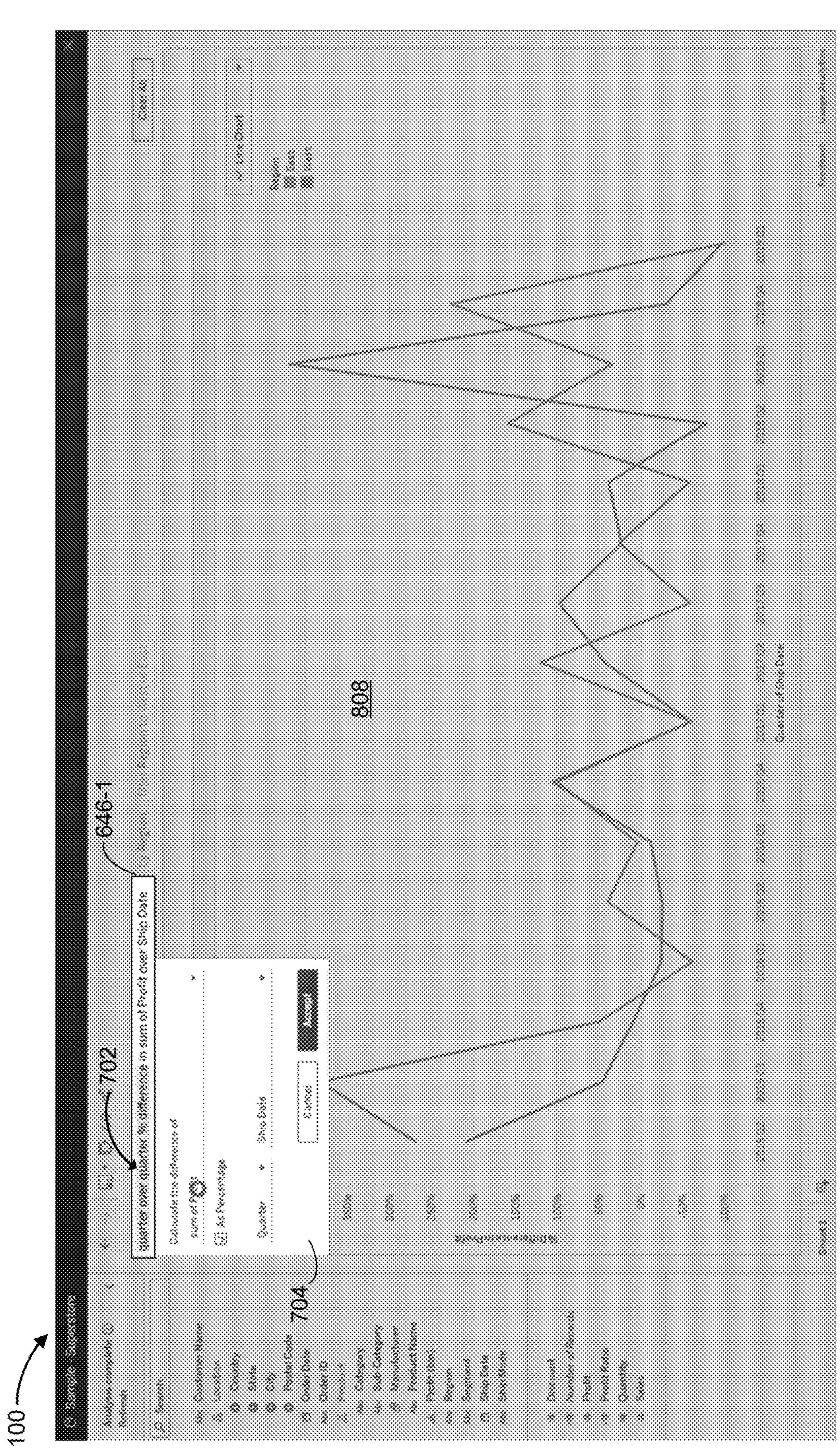
Figure 8K:
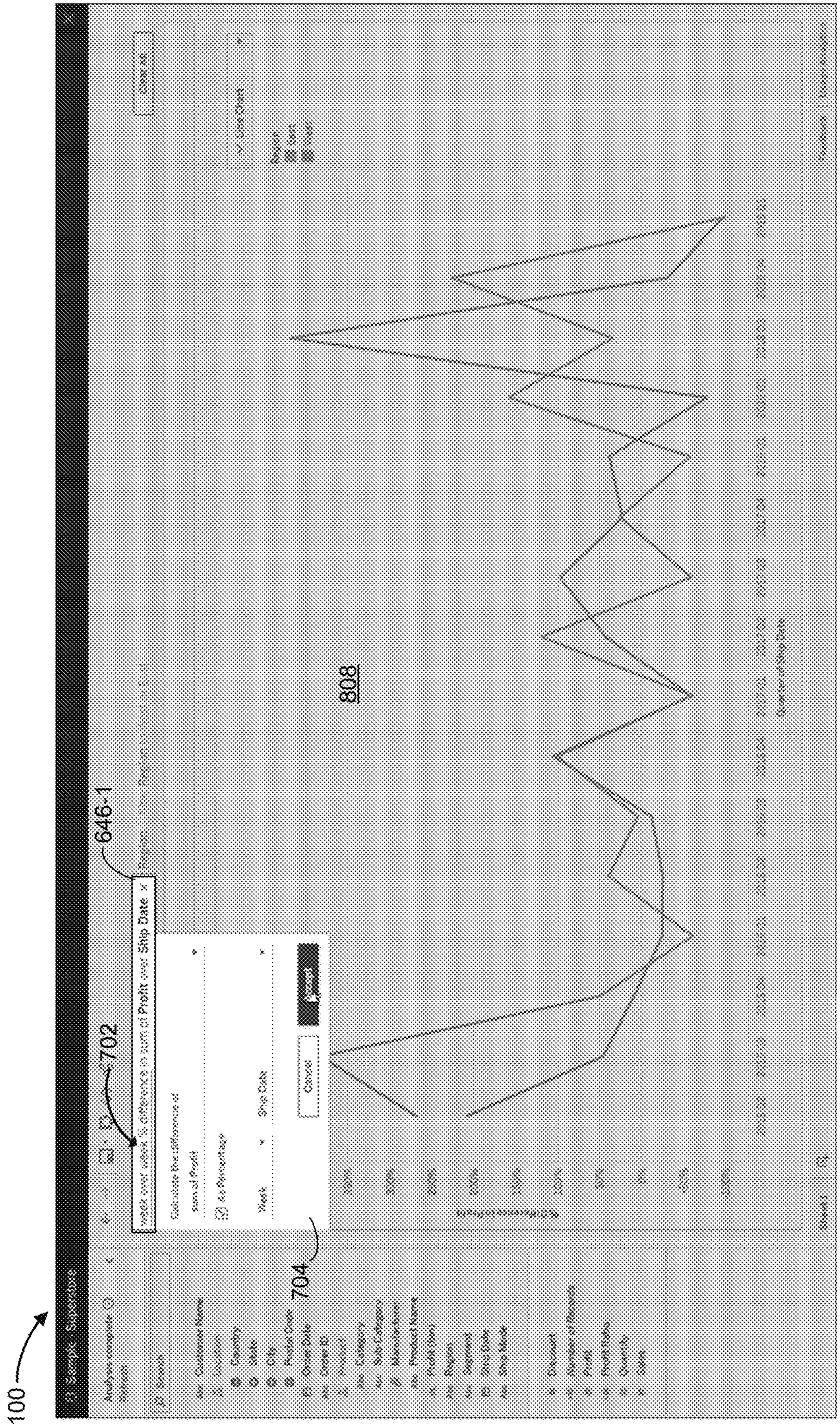
Figure 8L:
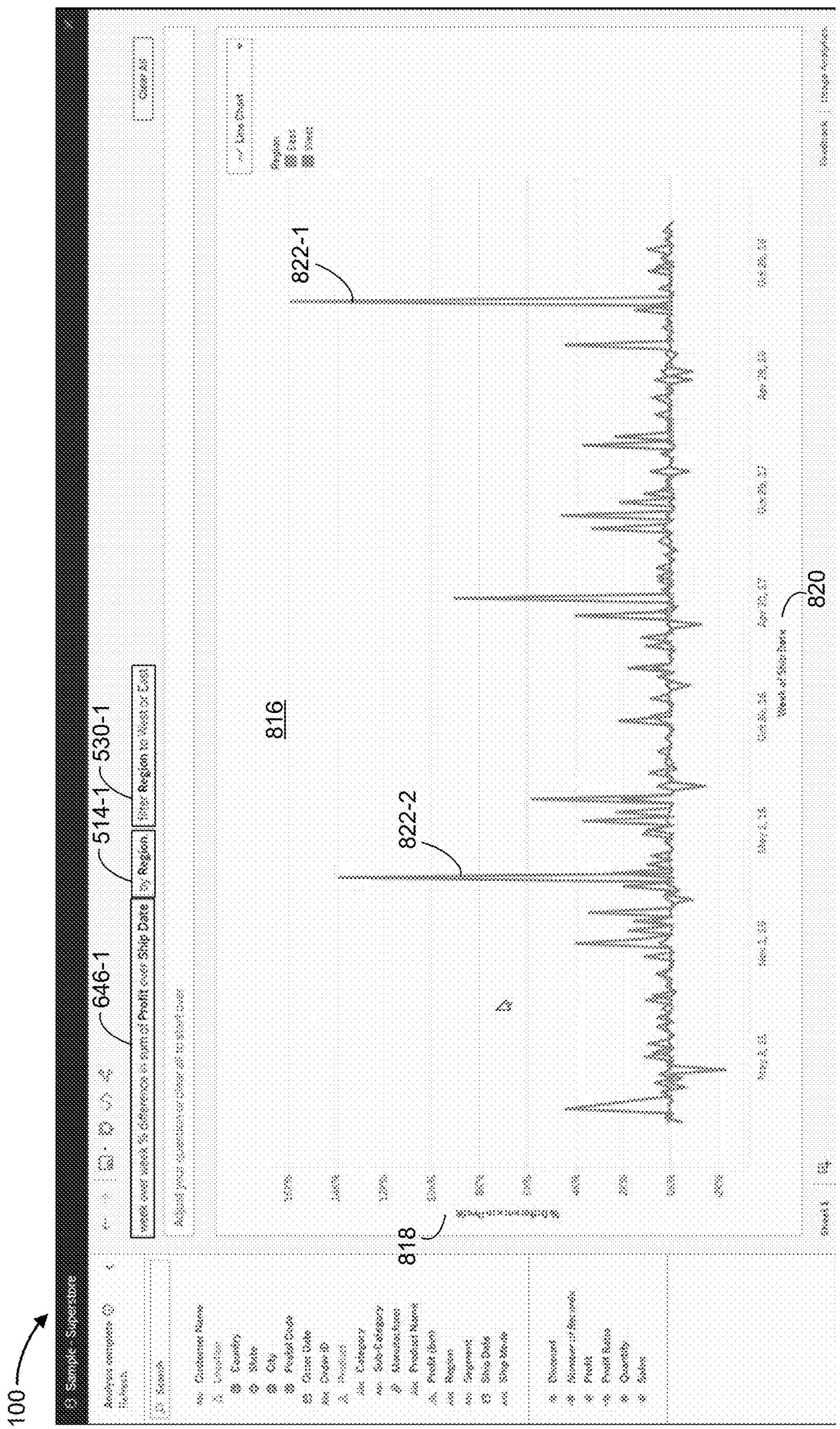
Figure 8M:
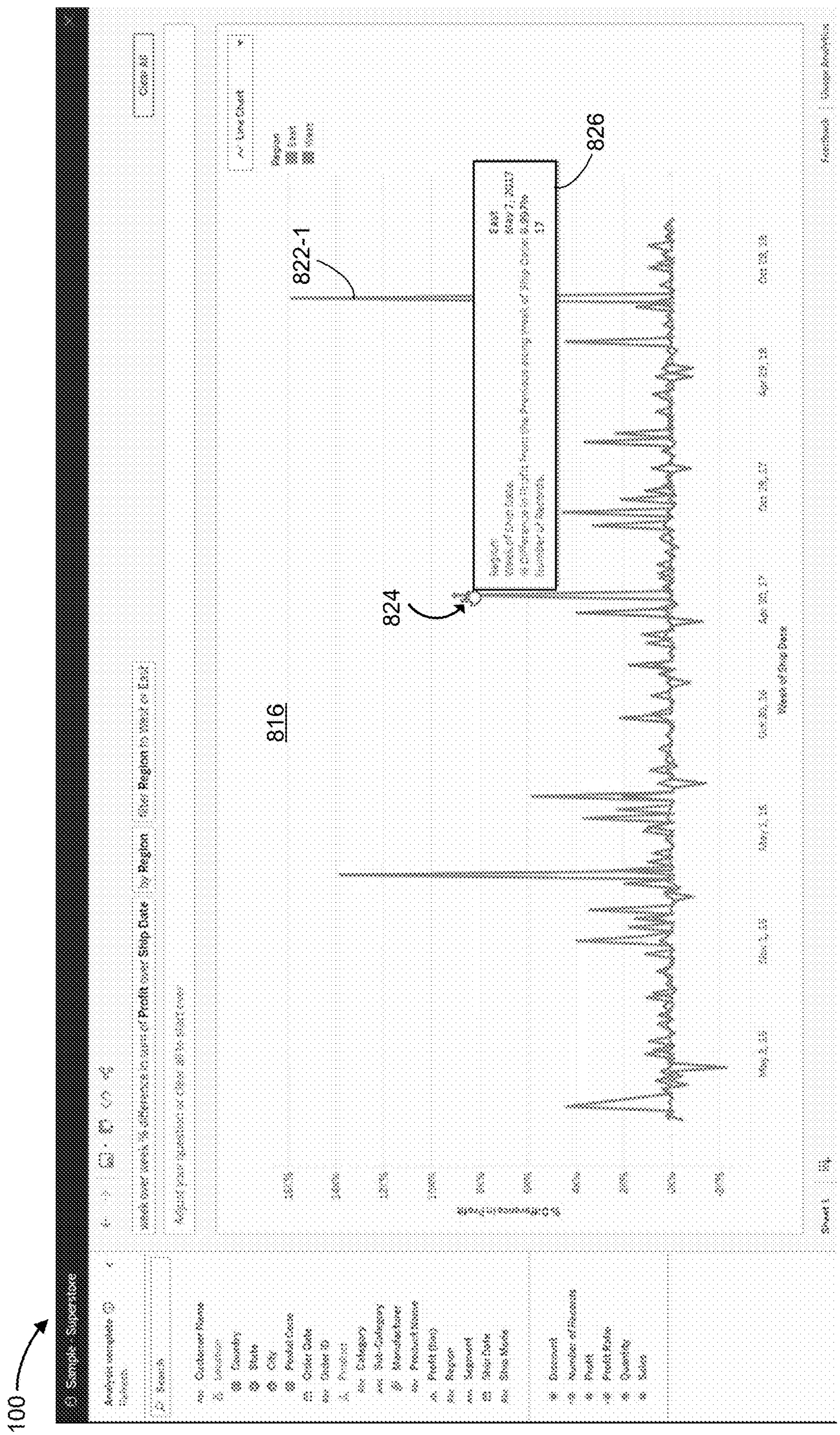
Figure 8N:
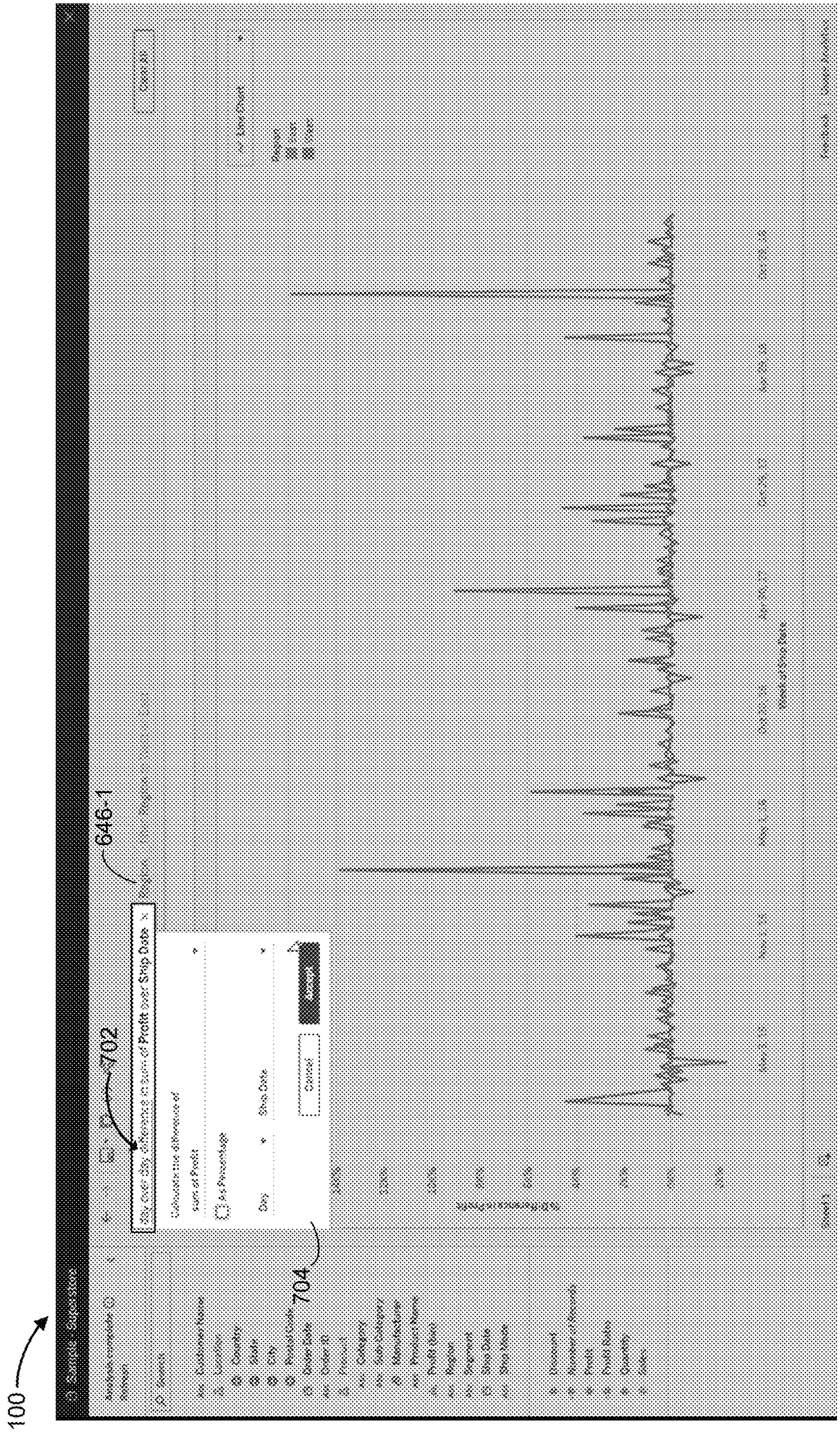
Figure 8O:
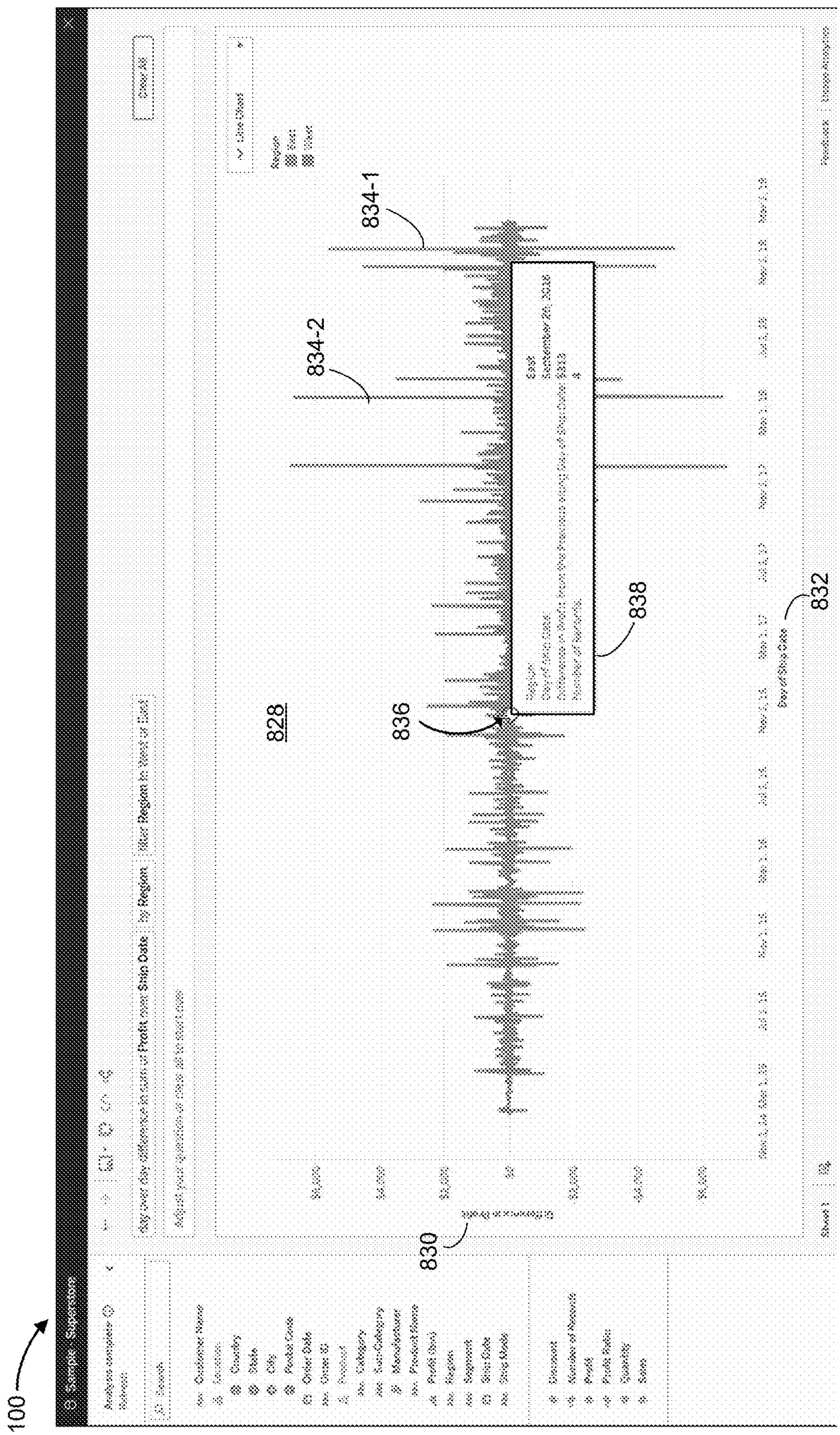
Figure 8P:
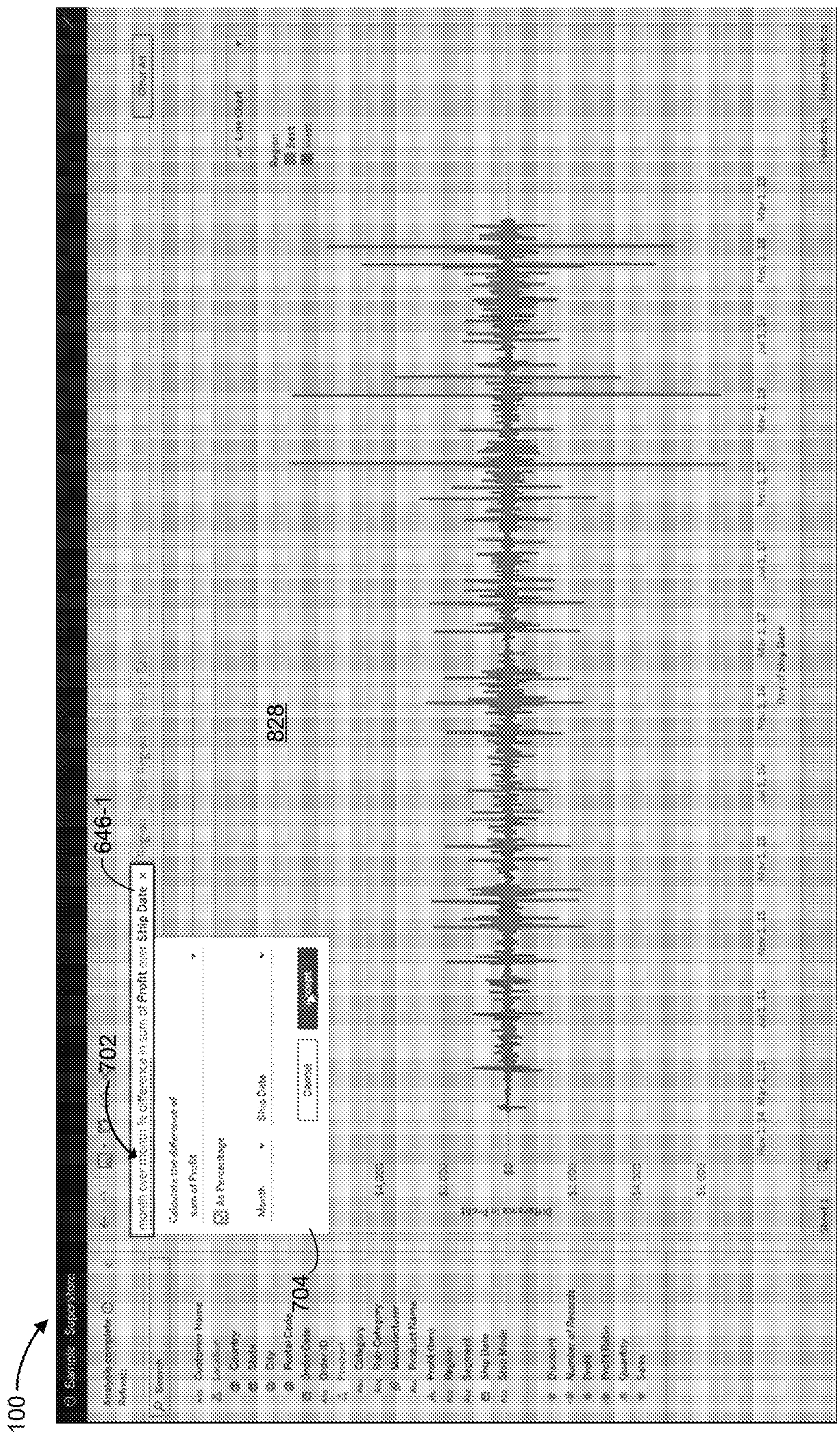
Figure 8Q:

FIGS. 8A-8Q provide a series of screen shots for updating a data visualization using refinement widgets according to some implementations.

FIGS. 8A to 8D illustrate user interactions to update the term 702 (e.g., the calculation type component) from "quarter over quarter difference" to "quarter over quarter % difference", using the widget 704 and the process described in FIGS. 7A-7J.

FIG. 8E illustrates a user interaction with the term 734 "average Sales." In some implementations, in response to user selection of the term 734 in the phrase 646-1, a widget 802 is generated (e.g., using the widget generation module 254) and displayed in the graphical user interface 100, as illustrated in FIG. 8E. The widget 802 displays a partial view of field names from the data source (e.g., "Region," "Sales," "Segment," "Ship Date," "Ship Mode," and "State"). The user may access other fields by scrolling 804 up and/or down the menu (see FIG. 8F). In this example, the field "Sales" that defines the aggregation expression "average Sales" is highlighted in the widget 802. The widget 802 also displays the aggregation type "average" that defines the aggregation expression "average Sales."

FIG. 8F illustrates a user interaction with the widget 802 to change the aggregation field from "Sales" to "Profit". FIG. 8F also illustrates a user interaction to change the aggregation type (e.g., operator) from "average" to "Sum." In response to the user interactions, the computing device automatically updates the term 734 in the phrase 646-1 to "sum of Profit."

FIG. 8G illustrates user selection of the term 744 (e.g., the addressing field) "Order Date" (e.g., by clicking on the term 744) in the phrase 646-1. In response to the user selection, a widget 806 is generated and displayed in the graphical user interface 100. The widget 806 displays a list of date fields (e.g., date/time fields) "Order Date" and "Ship Date" that the user may select as the addressing field.

FIG. 8H illustrates user selection of the field "Ship Date." In response to the user selection, the computing device automatically updates the term 744 in the phrase 646-1 to "Ship Date."

FIG. 8I illustrates an updated data visualization 808 that is automatically generated and displayed in the graphical user interface 100 in response to user selection of the "Accept" button in FIG. 8H. The data visualization 746 comprises, on the y-axis 810, "% Difference in Profit" and comprises, on the x-axis 812, "Quarter of Ship Date." The data visualization 746 includes two line charts 814-1 and 814-2, for the East and West regions respectively. Each of the data marks of the line chart 814-1 represents a respective computed percentage difference in profit in the East region, for a consecutive pair of quarters, over the range of quarters defined by the Ship Date. Each of the data marks of the line chart 752-2 represents a respective computed percentage difference in profit in the West region, for a consecutive pair of quarters, over the range of quarters defined by the Ship Date.

FIGS. 8J to 8K illustrate user modification of the calculation type from "quarter over quarter % difference" to "week over week % difference" using the table calculation widget 704.

FIG. 8L illustrates an updated data visualization 816 that is automatically generated and displayed in the graphical user interface 100 in response to user selection of the "Accept" button in FIG. 8K. The data visualization 816 is defined by the phrase 646-1 "week over week % difference in sum of Profit over Ship Date," the phrase 514-1 "by Region," and the phrase 530-1 "filter Region to West or East." The data visualization 816 comprises, on the y-axis 818, "% Difference in Profit" and comprises, on the x-axis 820, "Week of Ship Date." The data visualization 816 includes two line charts 822-1 and 822-2. Each of the data marks of the line chart 822-1 represents a respective computed percentage difference in profit in the East region, for a consecutive pair of weeks, over the range of weeks defined by the Ship Date. Each of the data marks of the line chart 822-2 represents a respective computed percentage difference in profit in the West region, for a consecutive pair of weeks, over the range of weeks defined by the Ship Date.

FIG. 8M illustrates a user interaction with (e.g., hovering over) a data mark 824 of the line chart 822-1. In response to the user interaction, the graphical user interface 100 displays a data widget 826. The data widget 826 includes information corresponding to the data mark 824, including the region (e.g., "East"), week of ship date (e.g., "May 7, 2017"), percentage difference in profit from the previous along week of ship date (e.g., "8,997%"), and the number of records for the week (e.g., "17").

FIG. 8N illustrates a user interaction to change the calculation type from "week over week % difference" to "day over day difference" using the widget 704.

FIG. 8O illustrates an updated data visualization 828 that is automatically generated and displayed in the graphical user interface 100 in response to user selection of the "Accept" button in FIG. 8N. The data visualization 828 comprises, on the y-axis 830, "Difference in Profit" and comprises, on the x-axis 832, "Day of Ship Date." The data visualization 828 includes two line charts 834-1 and 834-2. Each of the data marks of the line chart 834-1 represents a respective computed difference (e.g., an absolute difference) in profit in the East region, for a consecutive pair of days, over the range of days defined by the Ship Date. Each of the data marks of the line chart 834-2 represents a respective computed difference in profit in the West region, for a consecutive pair of days, over the range of days defined by the Ship Date.

FIG. 8O illustrates another user interaction with (e.g., hovering over) a data mark 836 of the line chart 834-1. In response to the user interaction, the graphical user interface 100 displays a data widget 838 that includes information corresponding to the data mark 836, including the region (e.g., "East"), day of ship date (e.g., "Sep. 26, 2016"), the difference in profit from the previous along day of ship date (e.g., "$313"), and the number of records for the day (e.g., "4").

FIG. 8P illustrates a user interaction to modify the calculation type from "day over day difference" to "month over month % difference" using the table calculation widget 704.

FIG. 8Q illustrates an updated data visualization 840 that is automatically generated and displayed in the graphical user interface 100 in response to user selection of the "Accept" button in FIG. 8P. The data visualization 840 comprises, on the y-axis 842, "% Difference in Profit" and comprises, on the x-axis 844, "Month of Ship Date." The data visualization 840 includes two line charts 846-1 and 846-2. Each of the data marks of the line chart 846-1 represents a respective computed percentage difference in profit in the East region, for a consecutive pair of months, over the range of months defined by the Ship Date. Each of the data marks of the line chart 846-2 represents a respective computed percentage difference in profit in the West region, for a consecutive pair of months, over the range of months defined by the Ship Date.

Figure 9A:
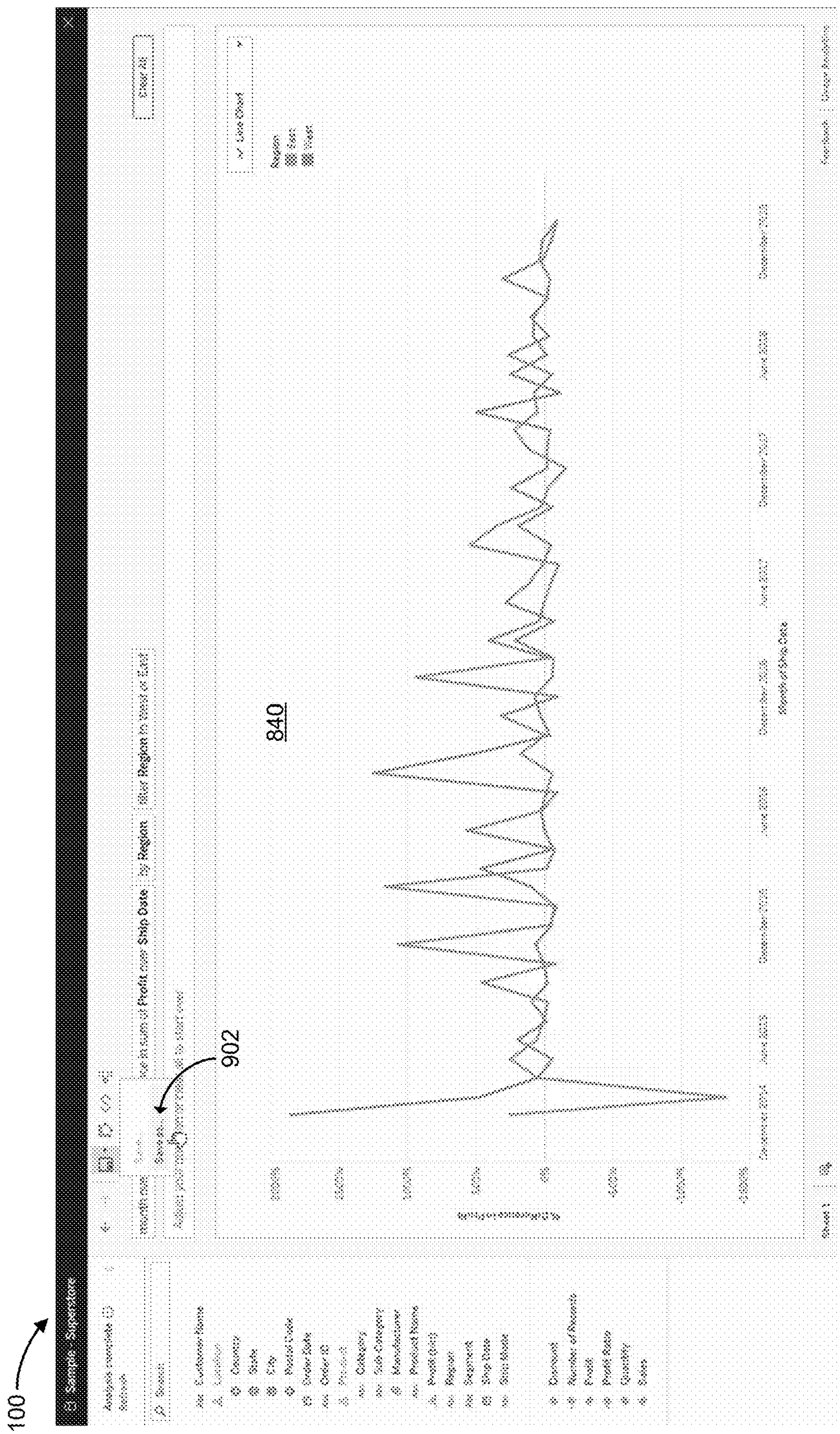
FIGS. 9A-9G provide a series of screen shots for saving and interacting with a data visualization according to some implementations.

FIGS. 9A-9G provide a series of screen shots for saving and interacting with a data visualization according to some implementations FIG. 9A illustrates user selection of the "Save as" button 902 in the graphical user interface 100, to save the data visualization 840 (e.g., as a workbook) that is generated and displayed in the graphical user interface 100.

Figure 9B:
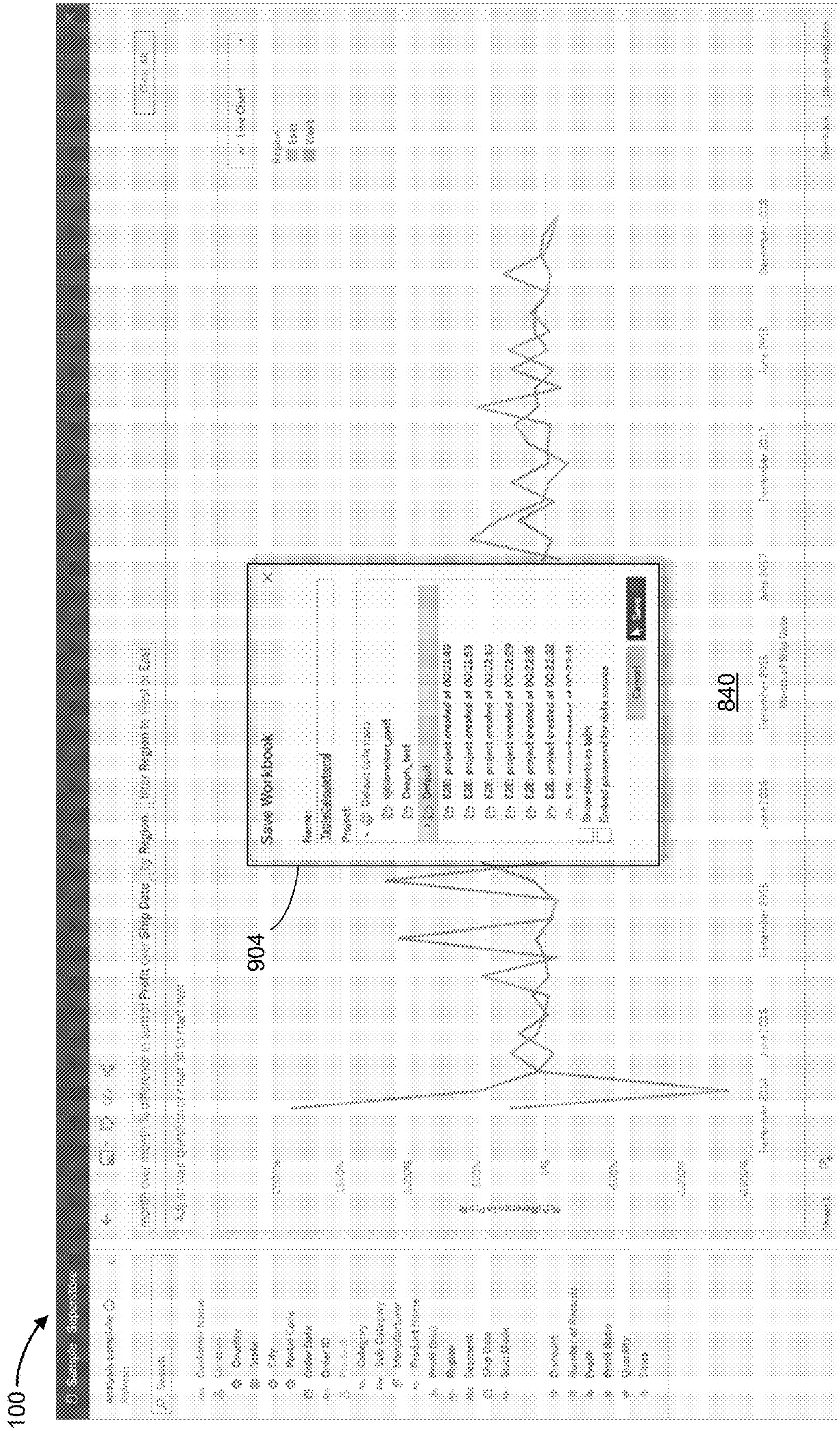

FIG. 9B illustrates a window 904 that is automatically displayed in response to user selection of the "Save as" button 902 in FIG. 9A. In this example, the user saves the data visualization 840 under the workbook name "Table-Calculations."

Figure 9C:
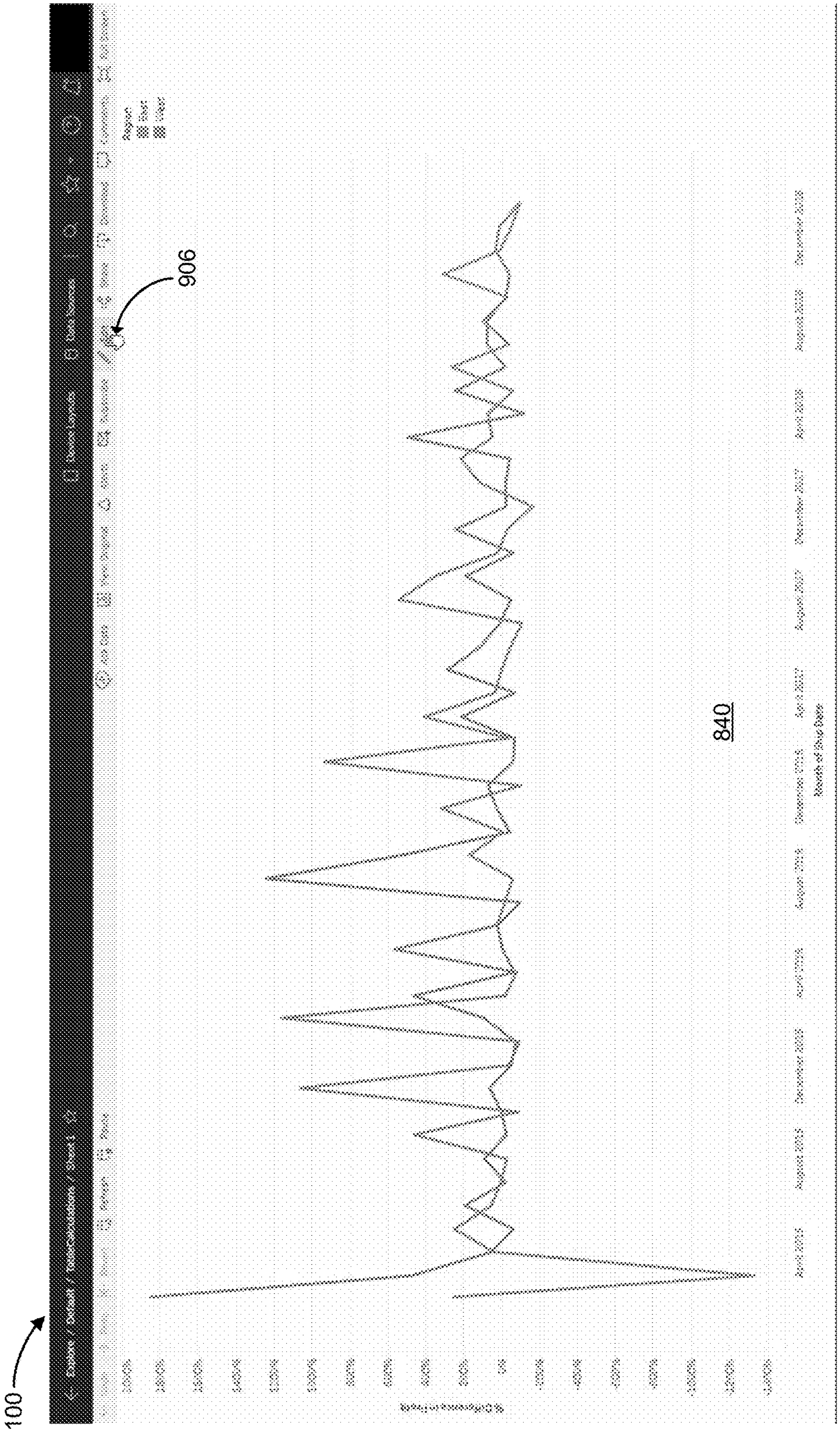

FIG. 9C illustrates a user interaction with (e.g., clicks on) the "Edit" button 906, to modify the data visualization 840.

Figure 9D:
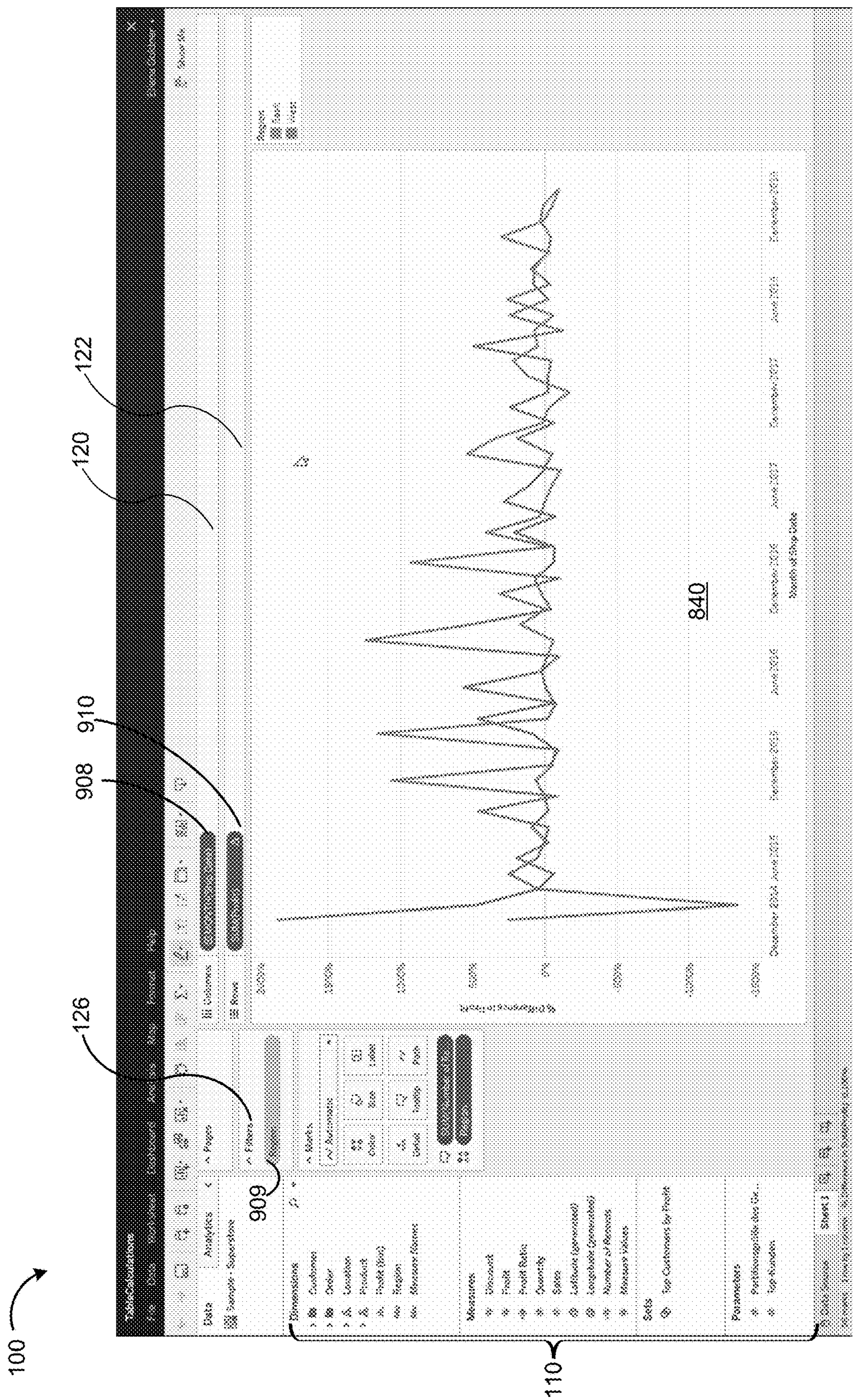

In some implementations, in response to user selection of the "Edit" button 906, the graphical user interface displays 100 displays, in addition to the data visualization 840, the schema information region 110, the column shelf 120, the row shelf 122, and the region 126 for data visualization filters, as illustrated in FIG. 9D.

As further illustrated in FIG. 9D, the column shelf 120 and the row shelf 122 include, respectively, automatically generated fields "MONTH(Ship Date)" 908 and "SUM (Profit)" 910. In other words, the data visualization 840 is a visual representation that comprises month of ship date on one axis (e.g., x-axis) and an aggregation ("sum") of the measure ("Profit") on the other axis (e.g., y-axis). In this example, the dimensionality associated with the data visualization 330 is Level of Detail (LOD) 1. Further details about levels of detail are described in U.S. patent application Ser. No. 16/166,125, filed Oct. 21, 2018, entitled "Determining Levels of Detail for Data Visualizations Using Natural Language Constructs" and in U.S. patent application Ser. No. 14/801,750, filed Jul. 16, 2015, entitled "Systems and Methods for using Multiple Aggregation Levels in a Single Data Visualization," each of which is incorporated by reference herein in its entirety.

As further illustrated in FIG. 9D, the graphical user interface displays 100 displays a pill "Region" 909 in the Filters region, indicating that the line charts are filtered by Region.

Figure 9E:
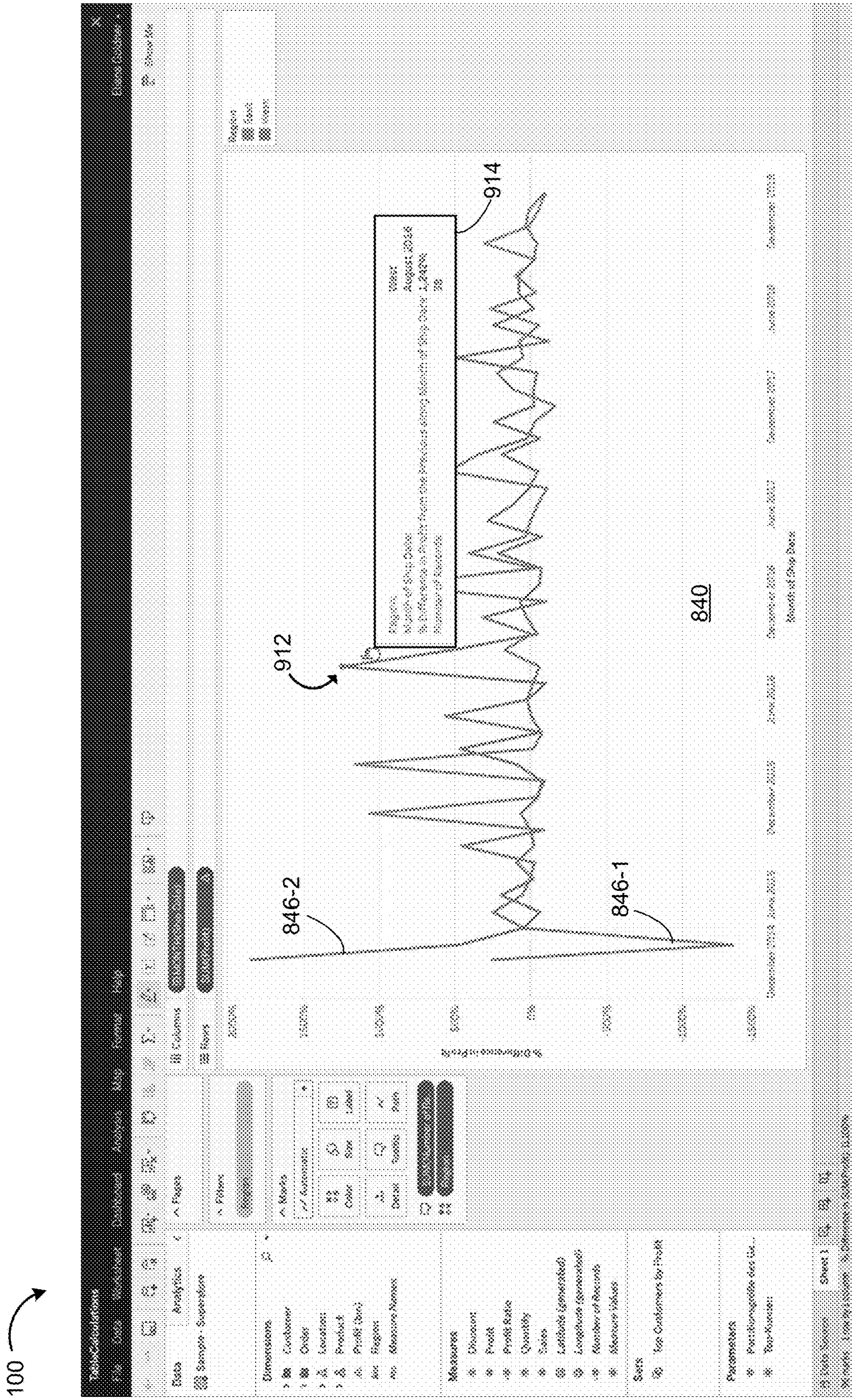

FIG. 9E illustrates a user interaction with (e.g., hovering over) a data mark 912 of the line chart 846-2. In response to the user interaction, the graphical user interface 100 displays a data widget 914 that includes information corresponding to the data mark 912. The data widget 912 includes information about the region (e.g., "West"), month of ship date (e.g., "August 2016"), percentage difference in profit from the previous along month of ship date (e.g., "1,242%"), and the number of records for the month of August 2016 (e.g., "38").

Figure 9F:
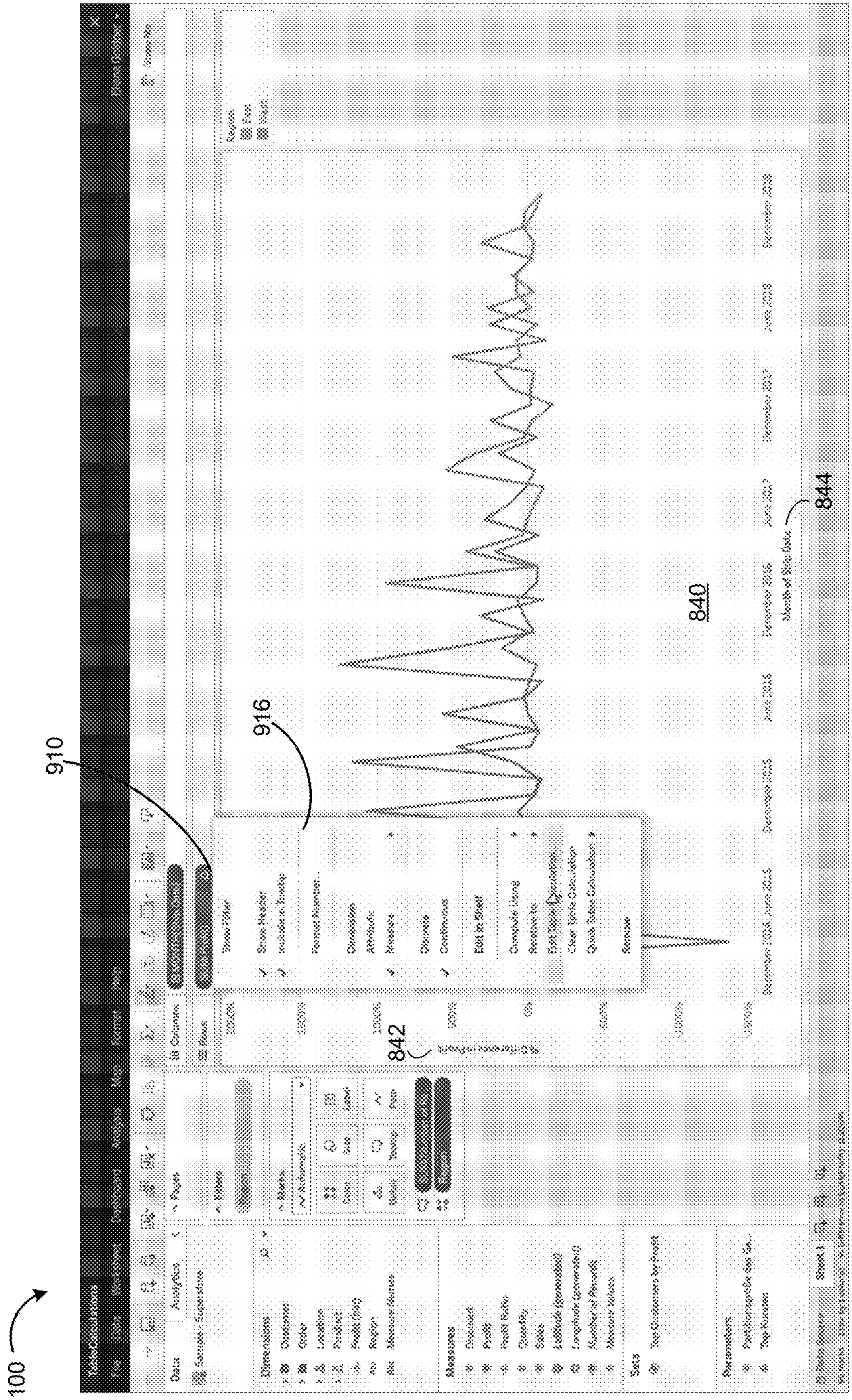

As discussed earlier in FIG. 8Q, the data visualization 840 has the table calculation type "month over month % difference in sum of profit." In some implementations, the table calculation type can be modified via user selection (e.g., by right-clicking) of the pill corresponding to the field "SUM (Profit)" 910, as illustrated in FIG. 9F. In response to the user selection, the graphical user interface 100 displays a window 916 that includes user-selectable options.

Figure 9G:
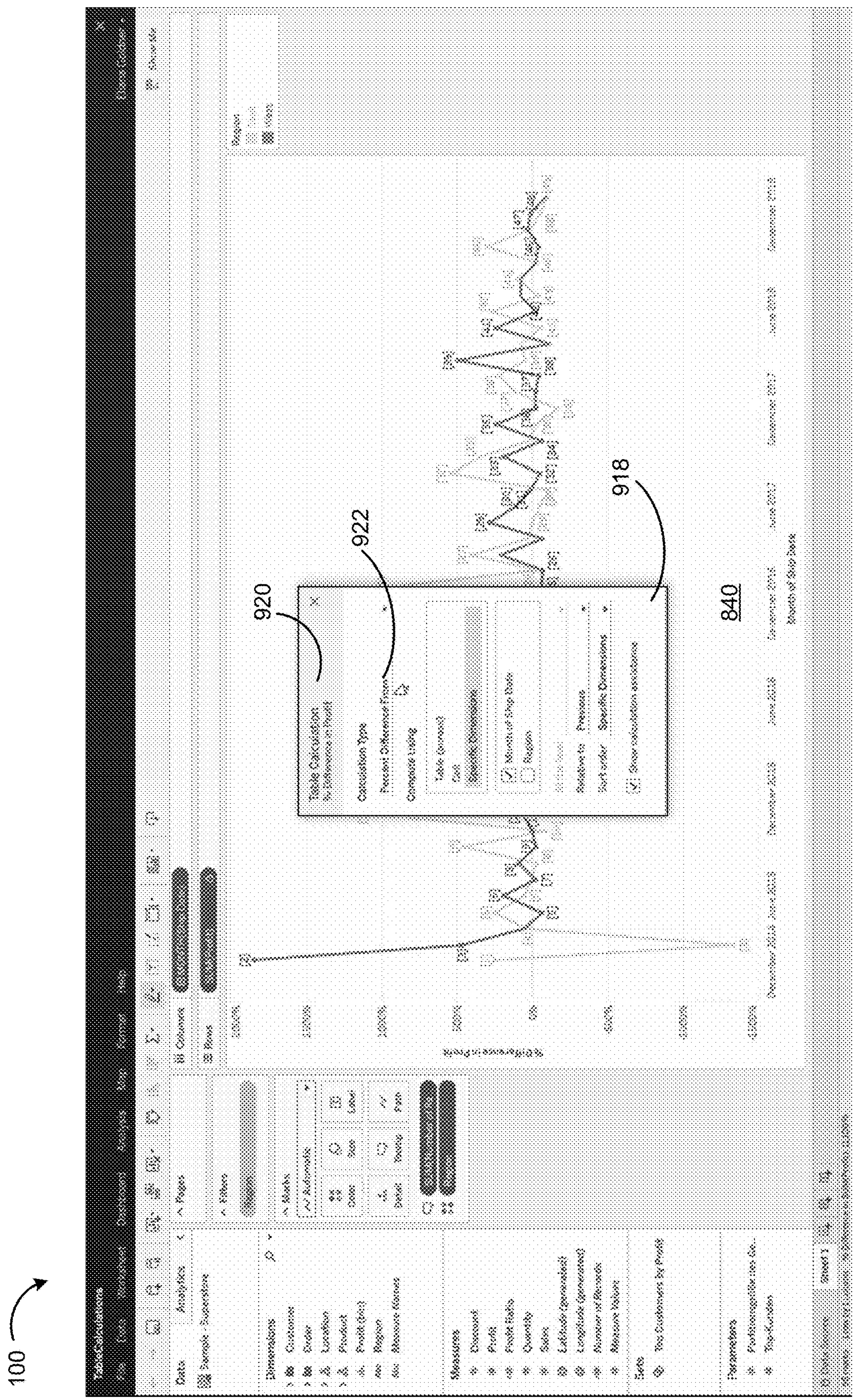
Figure 10A:
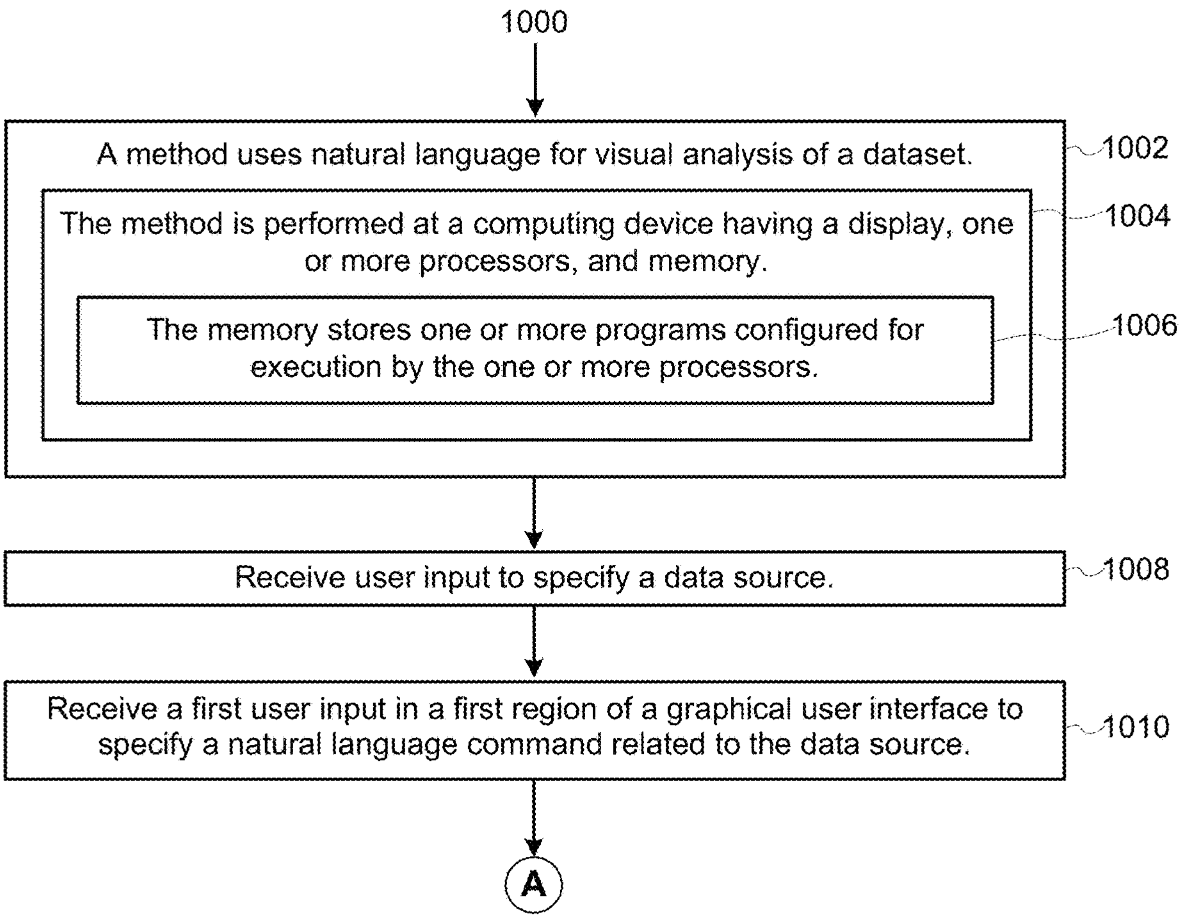
FIGS. 10A-10E provide a flowchart of a method for using natural language for visual analysis of datasets according to some implementations.
Figure 10B:
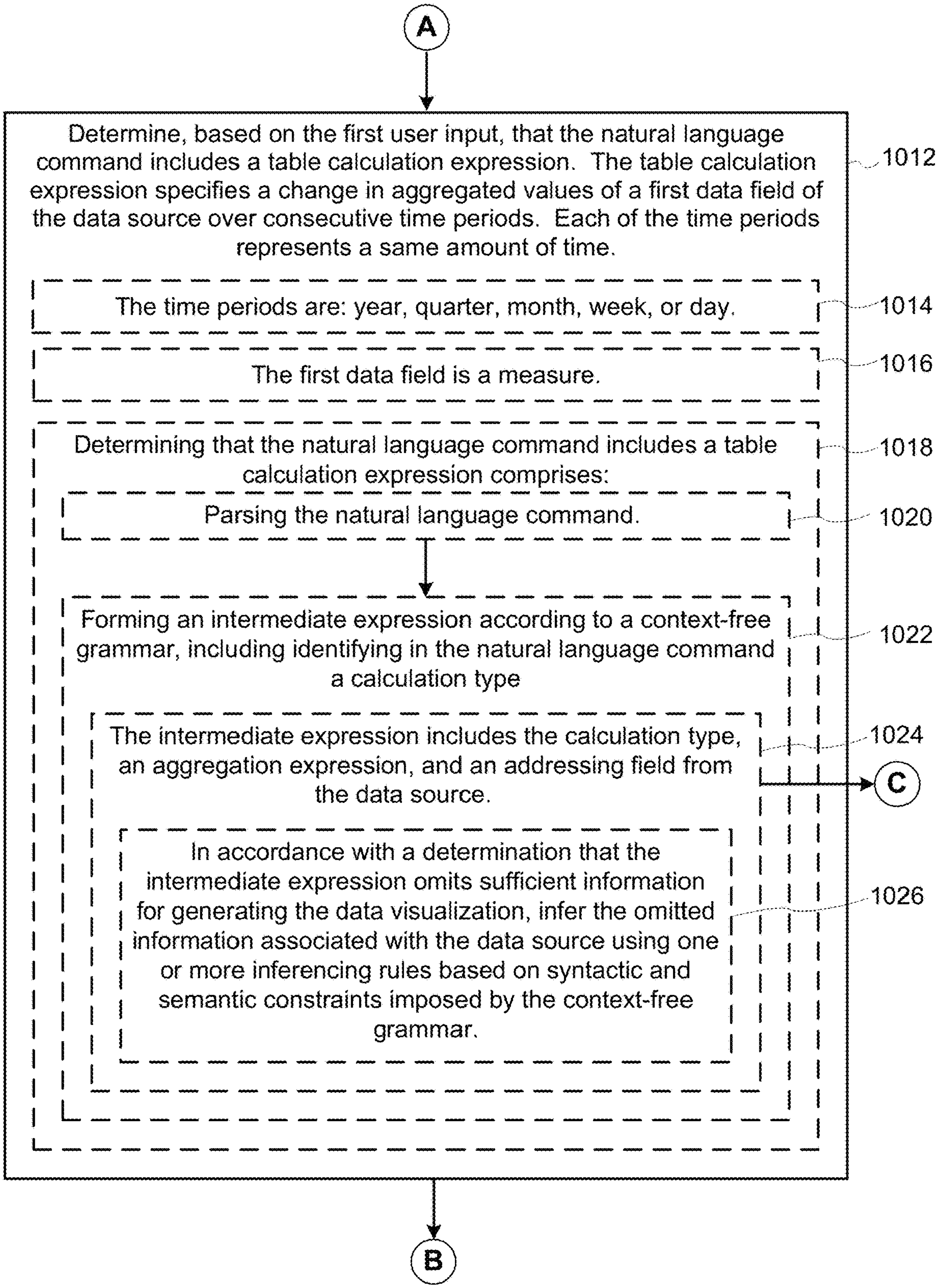
Figure 10C:
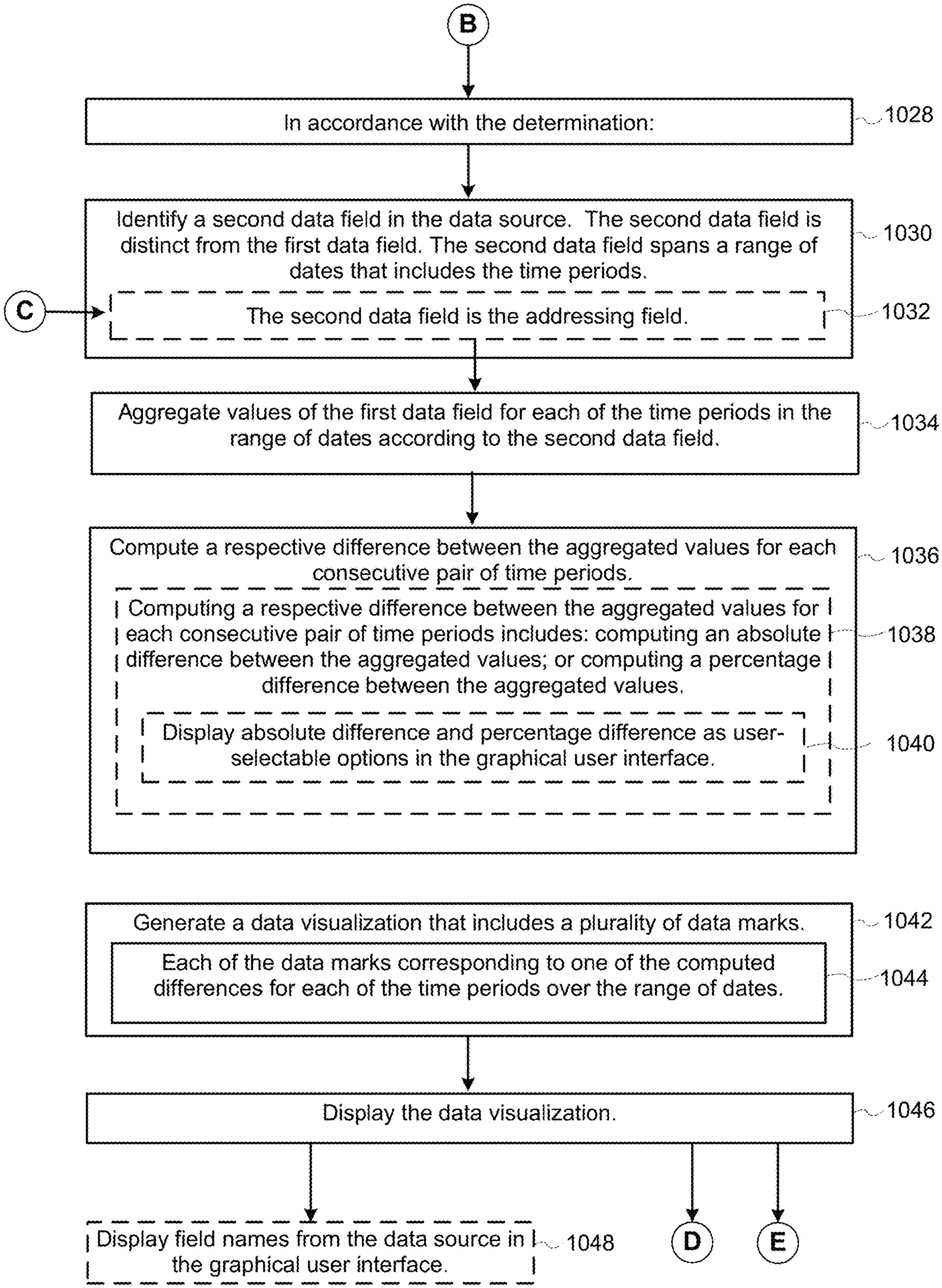
Figure 10D:
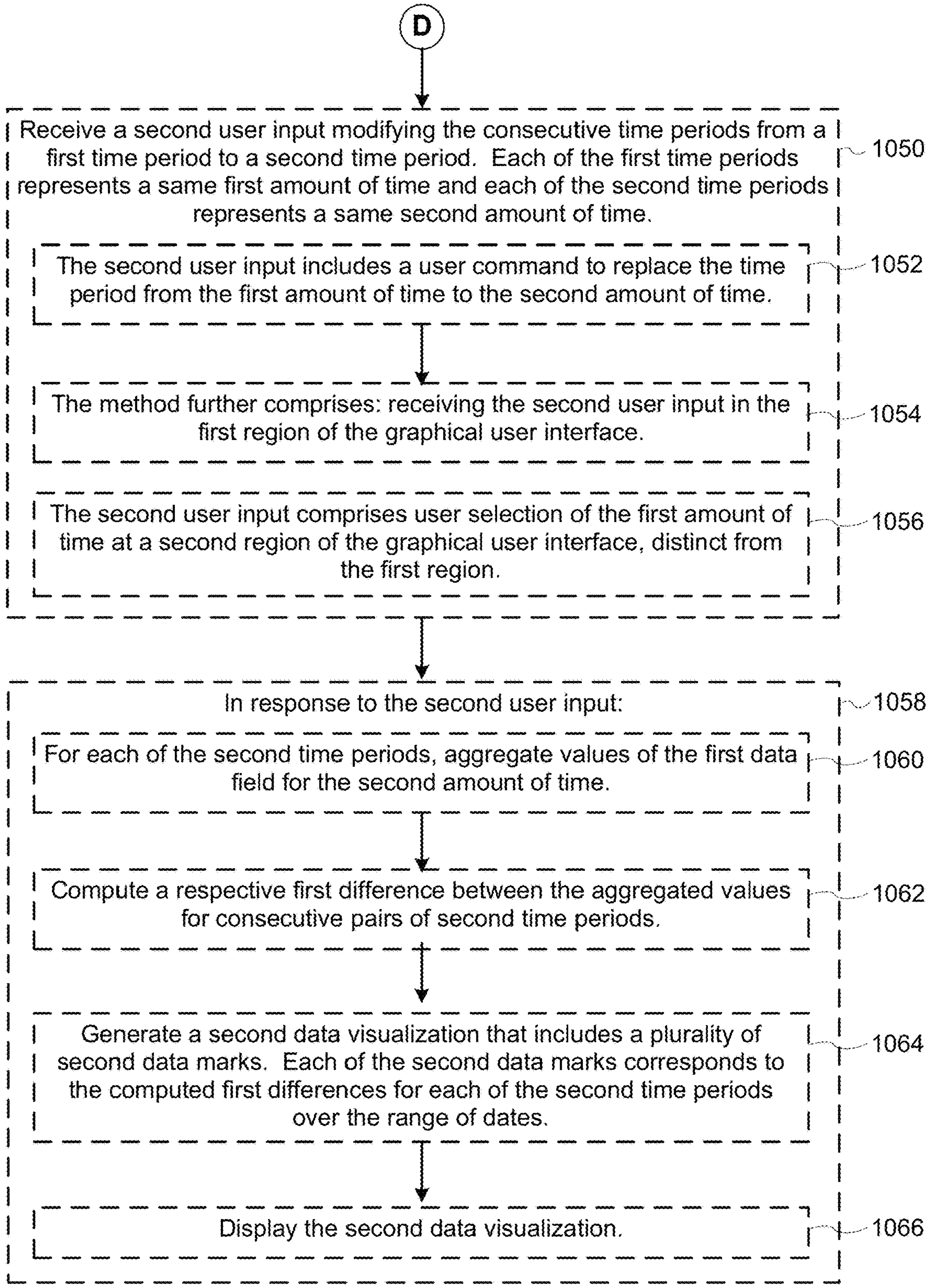
Figure 10E:
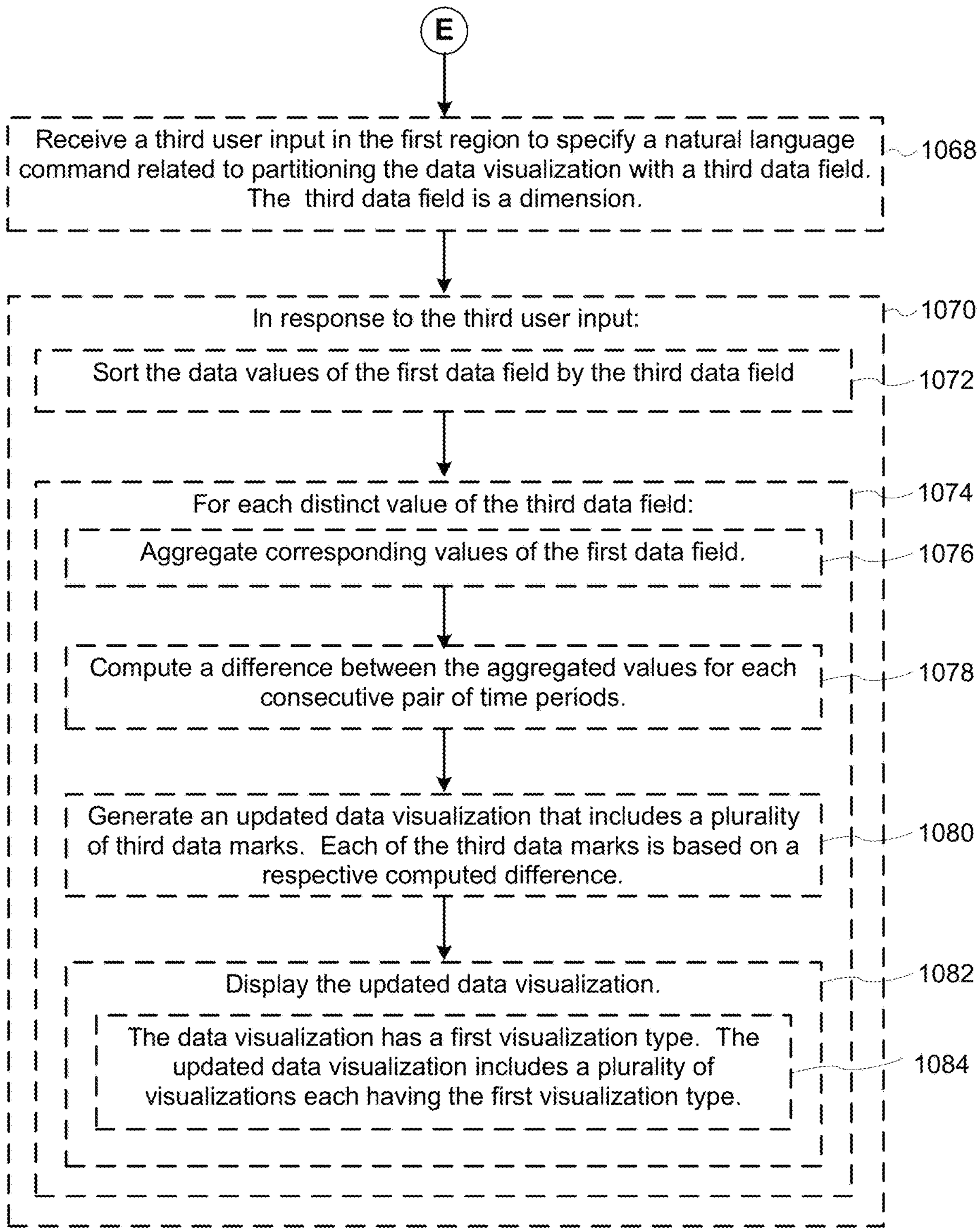

FIG. 9G illustrates a table calculation widget 918 that is generated and displayed in the user interface 100, in response to user selection of the option "Edit Table Calculation" in the window 916 in FIG. 9F. The table calculation widget 918 displays, on the header 920, a current calculation type "% difference in profit" corresponding to the data visualization 840. The user may modify the calculation type by changing the option 922 (e.g., from "Percent Difference from" to "Difference from"). The table calculation widget 918 also includes other user-selectable options, such as a "Compute Using" option, a "Relative to" option, and a "Sort order" option, that the user may modify to refine the data visualization that has been saved as a workbook.

FIGS. 10A-10E provide a flowchart of a method 1000 for using (1002) natural language for visual analysis of datasets according to some implementations. The method 1000 is also called a process.

The method 1000 is performed (1004) at a computing device 200 that has a display 212, one or more processors 202, and memory 206. The memory 206 stores (1006) one or more programs configured for execution by the one or more processors 202. In some implementations, the operations shown in FIGS. 3A to 9G correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 1000 may be combined and/or the order of some operations may be changed.

The computing device 200 receives (1008) user input to specify a data source 258.

The computing device 200 receives (1010) a first user input in a first region of a graphical user interface to specify a natural language command related to the data source. For example, in FIG. 3A, the computing device receives a user input in the command box 124 of the graphical user interface 100 to specify the natural language command 304 "year over year sales" related to the data source.

The computing device 200 determines (1012), based on the first user input, that the natural language command includes a table calculation expression. The table calculation expression specifies a change in aggregated values of a first data field from the data source over consecutive time periods. Each of the time periods represents a same amount of time. For example, in FIG. 3A, the computing device determines based on the term "year over year" in the natural language command 304 that the natural language command 304 includes a table calculation expression. The computing device returns the interpretation 306 "year over year difference in sum of Sales over Order Date," which corresponds to a table calculation expression. The table calculation expression "year over year difference in sum of Sales over Order Date" specifies a change in aggregated values (e.g., "sum") of a first data field "Sales" from the data source over consecutive time periods "Year". Each of the time periods represents a same amount of time (e.g., one year).

In some implementations, the time periods are (1014): year, quarter, month, week, or day. This is illustrated in FIG. 7G.

In some implementations, the first data field is (1016) a measure. For example, in FIG. 3A, the first data field "Sales" is a measure (e.g., numeric quantities).

In some implementations, determining (1018) that the natural language command includes a table calculation expression comprises parsing (1020) the natural language command. The computing device 200 forms (1022) an intermediate expression according to a context-free grammar, including identifying in the natural language command a calculation type. For example, the computing device 200 parses the natural language command 304 "year over year sales" using the natural language processing module 236. As described in U.S. patent application Ser. No. 16/234,470, filed Dec. 27, 2018, entitled "Analyzing Underspecified Natural Language Utterances in a Data Visualization User Interface," which is incorporated by reference herein in its entirety, underspecified (e.g., omitted information) or ambiguous (e.g., vague) natural language utterances (e.g., expressions or commands) that are directed to a data source can be resolved using an intermediate language ArkLang. The natural language processing module 236 may identify, using the canonical form of the table calculation expression 249, that the natural language command includes the calculation type "year over year."

In some instances, the intermediate expression includes (1024) the calculation type, an aggregation expression, and an addressing field from the data source. For example, in FIG. 3A, the interpretation 306 "year over year difference in sum of Sales over Order Date" includes the calculation type "year over year difference", an aggregation expression "sum of Sales", and an addressing field "Order Date."

In some instances, the method 1000 further comprises: in accordance with a determination (1026) that the intermediate expression omits sufficient information for generating the data visualization, inferring the omitted information associated with the data source using one or more inferencing rules based on syntactic and semantic constraints imposed by the context-free grammar. For example, in FIG. 3A, the aggregation expression "sum of Sales" and the addressing field "Order Date" are inferred.

In accordance with (1028) the determination that the natural language command includes a table calculation expression, the computing device 200 identifies (1030) a second data field in the data source. The second data field is distinct from the first data field. The second data field spans a range of dates that includes the time periods.

In some instances, the second data field is (1032) the addressing field.

The computing device 200 aggregates (1034) values of the first data field for each of the time periods in the range of dates according to the second data field. For example, in FIG. 3A, the field "Order Date" is the addressing field.

The computing device 200 computes (1036) a respective difference between the aggregated values for each consecutive pair of time periods.

In some implementations, computing a respective difference between the aggregated values for each consecutive pair of time periods includes (1038) computing an absolute difference between the aggregated values or computing a percentage difference between the aggregated values. This is illustrated in FIGS. 3B, 4B, 5B, 6B, 6D, 6F, and 7J.

In some instances, absolute difference and percentage difference are displayed (1040) as user-selectable options in the graphical user interface. This is illustrated in FIG. 7B (e.g., the widget 704).

The computing device 200 generates (1042) a data visualization that includes a plurality of data marks. Each of the data marks corresponds (1044) to one of the computed differences for each of the time periods over the range of dates. This is illustrated in FIGS. 3B and 4B.

The computing device 200 displays (1046) the data visualization. This is illustrated in FIGS. 3A to 8Q.

In some implementations, the method 1000 further includes displaying (1048) field names from the data source in the graphical user interface. This is illustrated in FIG. 3A (e.g., the schema information region 110).

In some instances, the method 1000 further includes receiving (1050) a second user input modifying the consecutive time periods from a first time period to a second time period. Each of the first time periods represents a same first amount of time and each of the second time periods represents a same second amount of time. For example, in FIG. 4A, the computing device receives the natural language command 402 to modify the consecutive time periods from "year over year" to "month over month". Each of the first time periods represents a same first amount of time (e.g., year) and each of the second time periods represents a same second amount of time (e.g., month).

In some instances, the second user input includes (1052) a user command to replace the time period from the first amount of time to the second amount of time. The method 1000 further includes receiving (1054) the second user input in the first region of the graphical user interface. For example, in FIG. 4A, the user input to modify the consecutive time periods from "year over year" to "month over month" is the natural language command 402. The natural language command is received in the command box 124 of the graphical user interface 100.

In some instances, the second user input comprises (1056) user selection of the first amount of time at a second region of the graphical user interface, distinct from the first region. For example, FIG. 7G to FIG. 7J illustrate user interactions to update the calculation type from "year over year difference" to "quarter over quarter difference" using the widget 704.

In some instances, in response to (1058) the second user input: for each of the second time periods, the computing device 200 aggregates (1060) values of the first data field for the second amount of time. The computing device 200 computes (1062) a respective first difference between the aggregated values for consecutive pairs of second time periods. The computing device 200 generates (1064) a second data visualization that includes a plurality of second data marks. Each of the second data marks corresponds to the computed first differences for each of the second time periods over the range of dates. The computing device 200 displays (1066) the second data visualization. This is illustrated in the transition from FIG. 3B to FIG. 4B.

In some implementations, the method 1000 further includes receiving (1068) a third user input in the first region to specify a natural language command related to partitioning the data visualization with a third data field. The third data field is (1068) a dimension. In response (1070) to the third user input, the computing device 200 sorts (1072) the data values of the first data field by the third data field. For each distinct value of the third data field, the computing device 200 performs (1074) a series of actions. The computing device 200 aggregates (1076) corresponding values of the first data field. The computing device 200 computes (1078) a difference between the aggregated values for each consecutive pair of time periods. The computing device 200 (1080) generates an updated data visualization that includes a plurality of third data marks. Each of the third data marks is (1080) based on a respective computed difference. The computing device 200 displays (1082) the updated data visualization.

For example, in FIG. 5A, the computing device receives the natural language command 502 "by region" in the command box 124. The natural language command 502 is related to partitioning the data visualization 406 according to the data field "Region." The third data field "Region" is a dimension (e.g., categorical data). In response to the natural language command 502, the computing device sorts the data values of the data field "Sales" into the Central, East, South, and West regions. For each distinct value of Region (e.g., "Central," "East," "South," and "West"), the computing device sums values of sales. The computing device computes a difference between the sum of sales for each consecutive pair of months. The computing device generates an updated data visualization 506 that includes a plurality of data marks. Each of the data marks is based on a respective computed difference. The computing device 200 displays the updated data visualization 506, as illustrated in FIG. 5B.

In some instances, the data visualization has a first visualization type. The updated data visualization includes a plurality of visualizations each having the first visualization type. For example, in FIG. 4B, the data visualization 406 is a line chart. The updated data visualization 506 includes four line charts, as illustrated in FIG. 5B.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of using natural language for visual analysis of datasets, comprising:

at a computing device having a display, one or more processors, and memory storing one or more programs configured for execution by the one or more processors:

receiving user input to specify a data source;

receiving a first user input in a first region of a graphical user interface to specify a natural language command related to the data source;

determining, based on the first user input, that the natural language command includes a table calculation expression, wherein the table calculation expression specifies a change in aggregated values of a first data field from the data source over consecutive time periods, and each of the time periods represents a same amount of time;

in accordance with the determination:

identifying a second data field from the data source, wherein the second data field is distinct from the first data field and the second data field spans a range of dates that includes the time periods;

aggregating values of the first data field for each of the time periods in the range of dates according to the second data field;

computing a respective percentage difference between the aggregated values for each consecutive pair of the time periods;

generating a data visualization that includes a plurality of data marks, each of the data marks corresponding to one of the computed percentage differences; and displaying the data visualization.

2. The method of claim 1, wherein the time periods are: year, quarter, month, week, or day.

3. The method of claim 1, further comprising displaying field names from the data source in the graphical user interface.

4. The method of claim 1, wherein the first data field is a measure.

5. The method of claim 1, wherein determining that the natural language command includes a table calculation expression comprises:

parsing the natural language command; and forming an intermediate expression according to a context-free grammar, including identifying in the natural language command a calculation type.

6. The method of claim 5, wherein the intermediate expression includes the calculation type, an aggregation expression, and an addressing field from the data source.

7. The method of claim 6, further comprising:

in accordance with a determination that the intermediate expression omits sufficient information for generating the data visualization, inferring the omitted information associated with the data source using one or more inferencing rules based on syntactic and semantic constraints imposed by the context-free grammar.

8. The method of claim 6, wherein the second data field is the addressing field.

9. The method of claim 1, further comprising:

receiving a second user input replacing the consecutive time periods with a set of second time periods, wherein each of the second time periods represents a same second amount of time; and in response to the second user input:

for each of the second time periods, aggregating values of the first data field for the second amount of time;

computing a respective first percentage difference between the aggregated values for consecutive pairs of the second time periods;

generating a second data visualization that includes a plurality of second data marks, each of the second data marks corresponding to a respective computed first percentage difference; and displaying the second data visualization.

10. The method of claim 9, wherein:

the second user input includes a user command to replace a first amount of time, for the consecutive time periods, with the second amount of time; and the second user input is received in the first region of the graphical user interface.

11. The method of claim 9, wherein the second user input comprises user specification of the second amount of time at a second region of the graphical user interface, distinct from the first region.

12. The method of claim 1, further comprising:

receiving a third user input in the first region to specify a natural language command related to partitioning the data visualization with a third data field, wherein the third data field is a dimension; and in response to the third user input:

sorting data values of the first data field by the third data field;

for each distinct value of the third data field:

aggregating corresponding values of the first data field; and computing a respective first percentage difference between the aggregated values for each consecutive pair of the time periods;

generating an updated data visualization that includes a plurality of third data marks, each of the third data marks corresponding to a respective computed first percentage difference; and displaying the updated data visualization.

13. The method of claim 12, wherein the data visualization has a first visualization type, and the updated data visualization includes a plurality of visualizations each having the first visualization type.

14. A computing device, comprising:

one or more processors;

memory coupled to the one or more processors;

a display; and one or more programs stored in the memory and configured for execution by the one or more processors, the one or more programs comprising instructions for:

receiving user input to specify a data source;

receiving a first user input in a first region of a graphical user interface to specify a natural language command related to the data source;

determining, based on the first user input, that the natural language command includes a table calculation expression, wherein the table calculation expression specifies a change in aggregated values of a first data field from the data source over consecutive time periods, and each of the time periods represents a same amount of time;

in accordance with the determination:

identifying a second data field from the data source, wherein the second data field is distinct from the first data field and the second data field spans a range of dates that includes the time periods;

aggregating values of the first data field for each of the time periods in the range of dates according to the second data field;

computing a respective percentage difference between the aggregated values for each consecutive pair of the time periods;

generating a data visualization that includes a plurality of data marks, each of the data marks corresponding to one of the computed percentage differences; and displaying the data visualization.

15. The computing device of claim 14, wherein the one or more programs further comprise instructions for displaying field names from the data source in the graphical user interface.

16. The computing device of claim 14, wherein the instructions for determining that the natural language command includes a table calculation expression include instructions for:

parsing the natural language command; and forming an intermediate expression according to a context-free grammar, including identifying in the natural language command a calculation type.

17. A non-transitory computer readable storage medium storing one or more programs configured for execution by a computing device having one or more processors, memory, and a display, the one or more programs comprising instructions for:

receiving user input to specify a data source;

receiving a first user input in a first region of a graphical user interface to specify a natural language command related to the data source;

determining, based on the first user input, that the natural language command includes a table calculation expression, wherein the table calculation expression specifies a change in aggregated values of a first data field from the data source over consecutive time periods, and each of the time periods represents a same amount of time;

in accordance with the determination:

identifying a second data field from the data source, wherein the second data field is distinct from the first data field and the second data field spans a range of dates that includes the time periods;

aggregating values of the first data field for each of the time periods in the range of dates according to the second data field;

computing a respective percentage difference between the aggregated values for each consecutive pair of the time periods;

generating a data visualization that includes a plurality of data marks, each of the data marks corresponding to one of the computed percentage differences; and displaying the data visualization.

* * * * *